United States Patent
Yoshizumi

(10) Patent No.: US 8,605,158 B2
(45) Date of Patent: Dec. 10, 2013

(54) IMAGE PICKUP CONTROL APPARATUS, IMAGE PICKUP CONTROL METHOD AND COMPUTER READABLE MEDIUM FOR CHANGING AN IMAGE PICKUP MODE

(75) Inventor: Shingo Yoshizumi, Tokyo (JP)

(73) Assignee: Sony Corporation, Tokyo (JP)

( * ) Notice: Subject to any disclaimer, the term of this patent is extended or adjusted under 35 U.S.C. 154(b) by 449 days.

(21) Appl. No.: 12/951,544

(22) Filed: Nov. 22, 2010

(65) Prior Publication Data
US 2011/0157397 A1 Jun. 30, 2011

(30) Foreign Application Priority Data

Dec. 28, 2009 (JP) .................................. 2009-297171
Dec. 28, 2009 (JP) .................................. 2009-297173

(51) Int. Cl.
*H04N 5/225* (2006.01)

(52) U.S. Cl.
USPC ....................................................... 348/207.1

(58) Field of Classification Search
None
See application file for complete search history.

(56) References Cited

U.S. PATENT DOCUMENTS

| | | | | |
|---|---|---|---|---|
| 2006/0279253 | A1* | 12/2006 | Kawai | 320/114 |
| 2007/0040894 | A1* | 2/2007 | Kikugawa | 348/14.01 |
| 2007/0070240 | A1* | 3/2007 | Oya | 348/375 |
| 2009/0103778 | A1 | 4/2009 | Yoshizumi et al. | |
| 2009/0175501 | A1* | 7/2009 | Tahara | 382/103 |
| 2009/0268943 | A1* | 10/2009 | Yoshizumi | 382/103 |
| 2010/0157075 | A1* | 6/2010 | Yoshizumi | 348/211.9 |
| 2011/0019012 | A1* | 1/2011 | Yoshizumi | 348/207.99 |
| 2011/0019021 | A1* | 1/2011 | Yoshizumi | 348/222.1 |
| 2011/0025854 | A1* | 2/2011 | Yoshizumi | 348/169 |
| 2011/0157394 | A1* | 6/2011 | Yoshizumi | 348/222.1 |

FOREIGN PATENT DOCUMENTS

JP 2009-100300 5/2009

OTHER PUBLICATIONS

U.S. Appl. No. 13/383,450, filed Jan. 11, 2012, Yoshizumi.
U.S. Appl. No. 13/384,898, filed Jan. 19, 2012, Yoshizumi.
U.S. Appl. No. 13/384,686, filed Jan. 18, 2012, Yoshizumi.

* cited by examiner

*Primary Examiner* — Justin P Misleh
(74) *Attorney, Agent, or Firm* — Oblon, Spivak, McClelland, Maier & Neustadt, L.L.P.

(57) ABSTRACT

An image pickup control apparatus, includes: a trigger acceptance section adapted to accept a predetermined trigger input as a changeover input from an automatic image pickup mode to a request responding image pickup mode; and a request responding image pickup control section adapted to establish, when the trigger input is accepted by the trigger acceptance section while an image pickup apparatus is carrying out still picture image pickup operation with an image pickup visual field of the image pickup apparatus changed in the automatic image pickup mode, the request responding image pickup mode and control the image pickup apparatus to execute a process for determining an image pickup visual field in accordance with an image pickup request and then execute still picture image pickup operation after the determination of the image pickup visual field.

20 Claims, 35 Drawing Sheets

F I G . 2
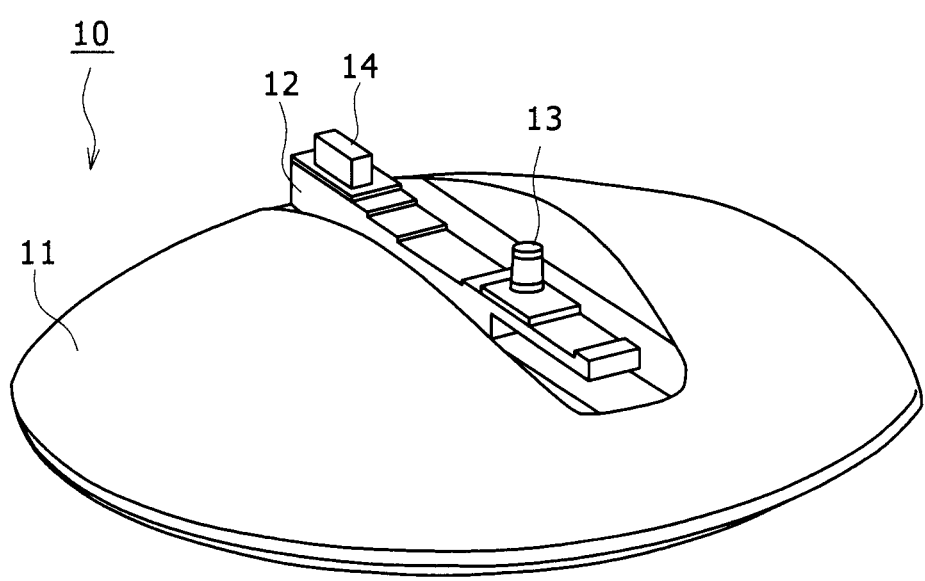

[PAN REFERENCE POSITION]

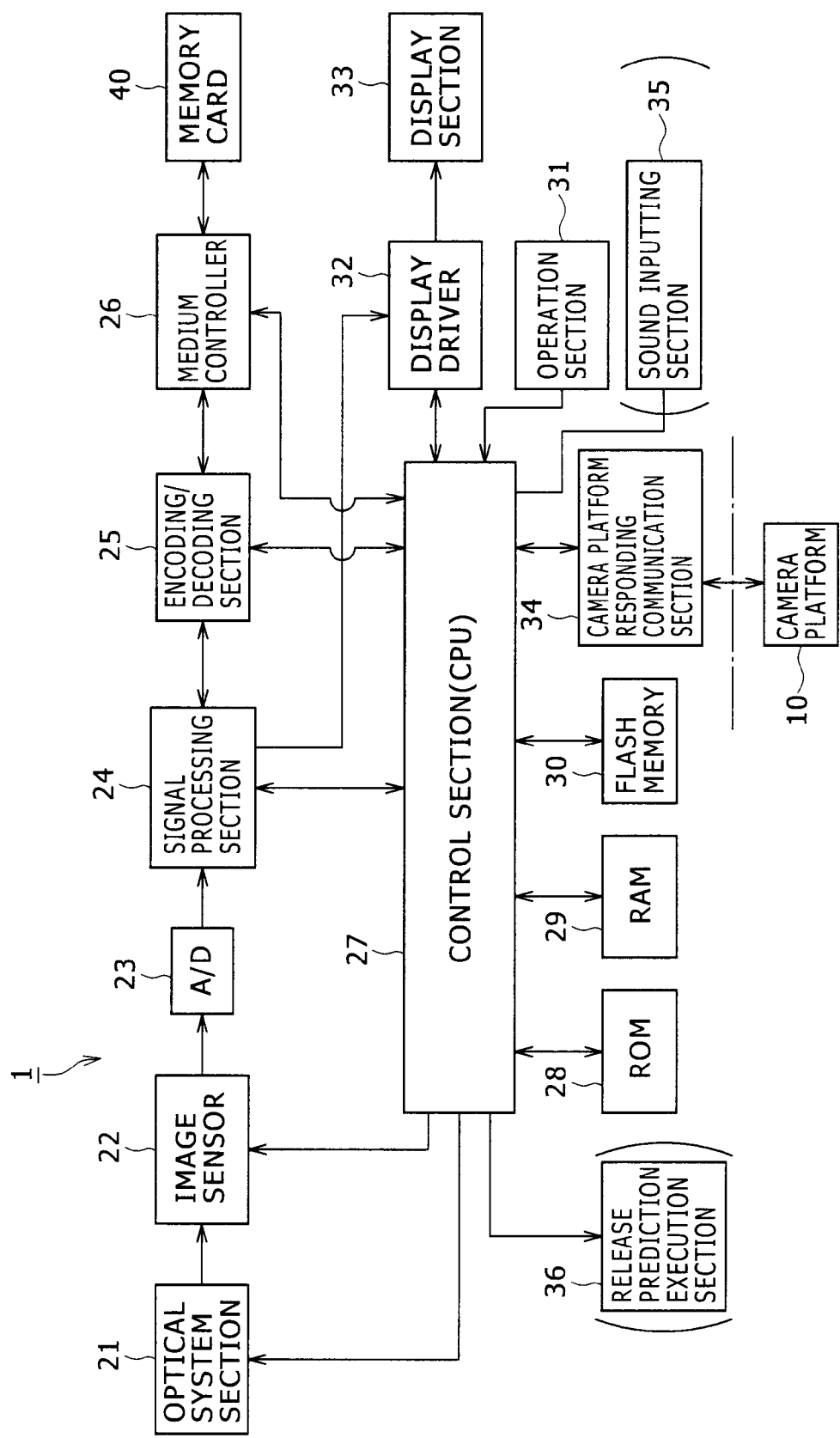

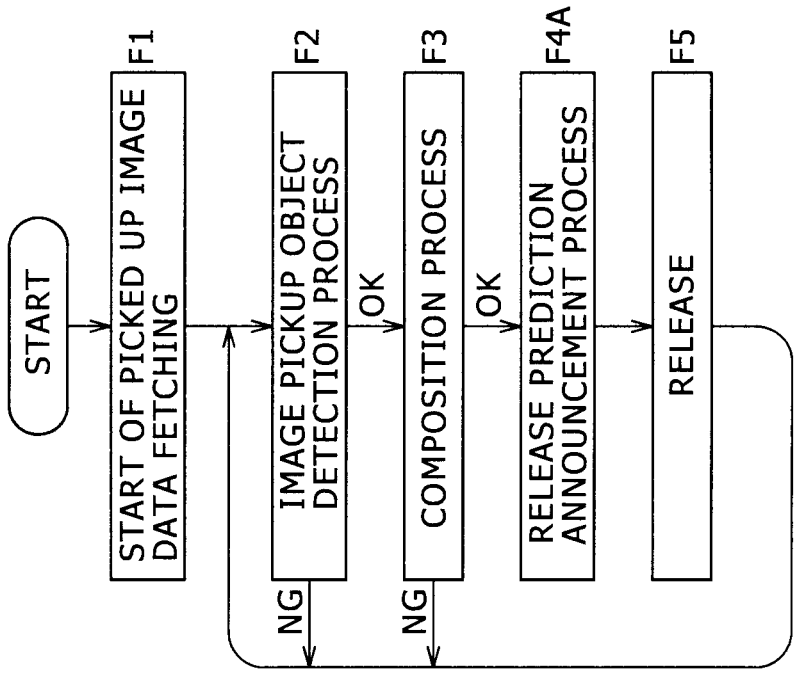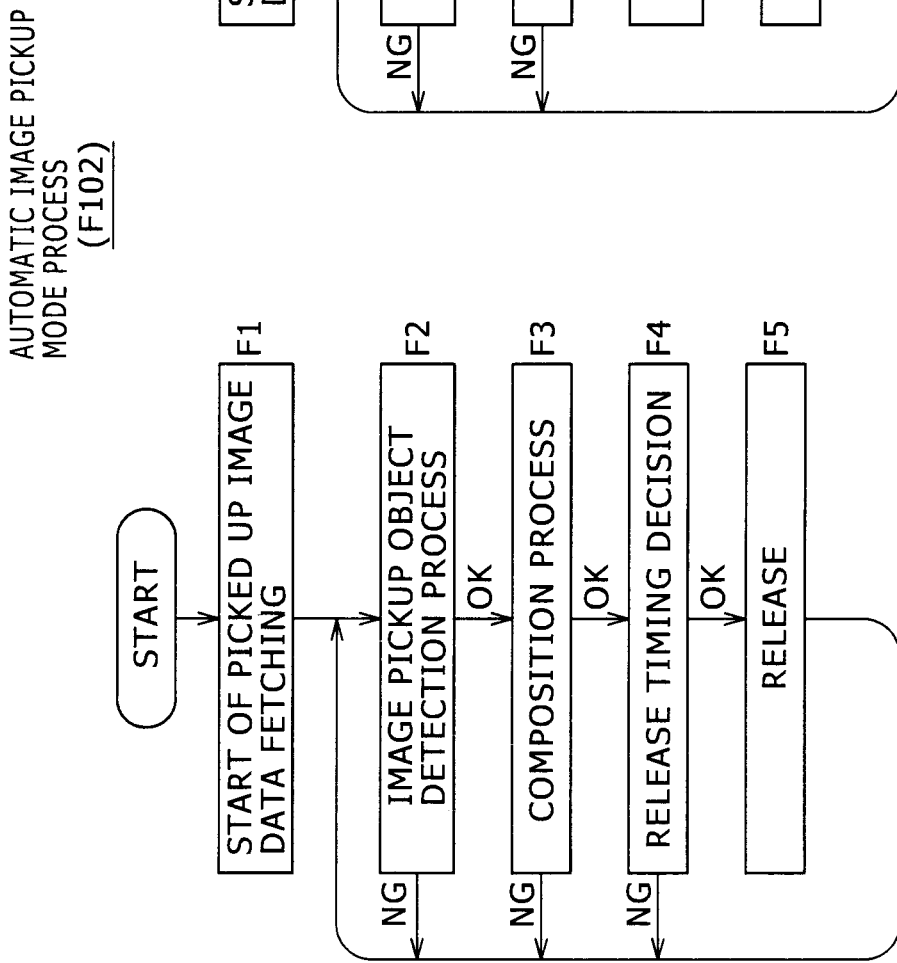

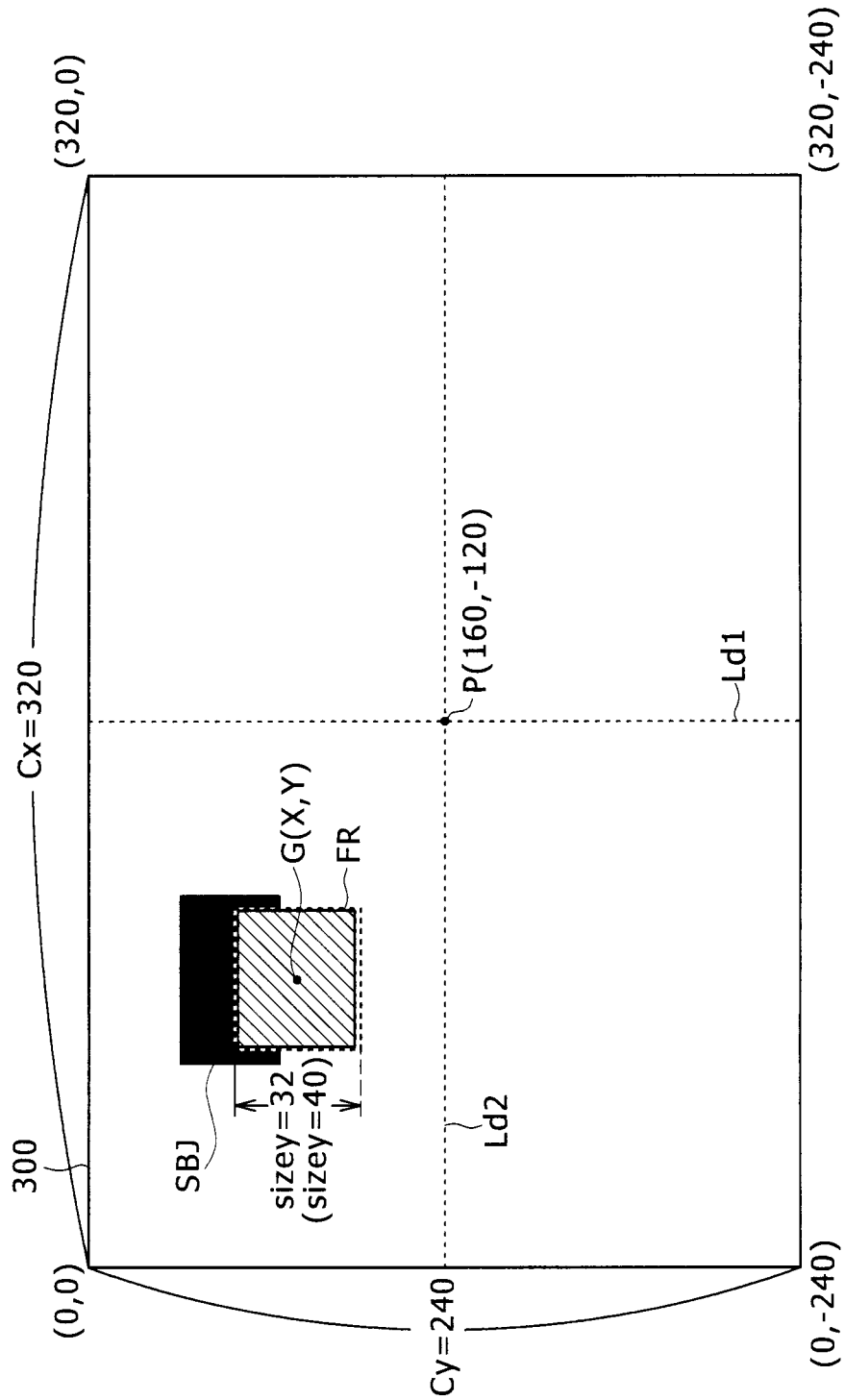

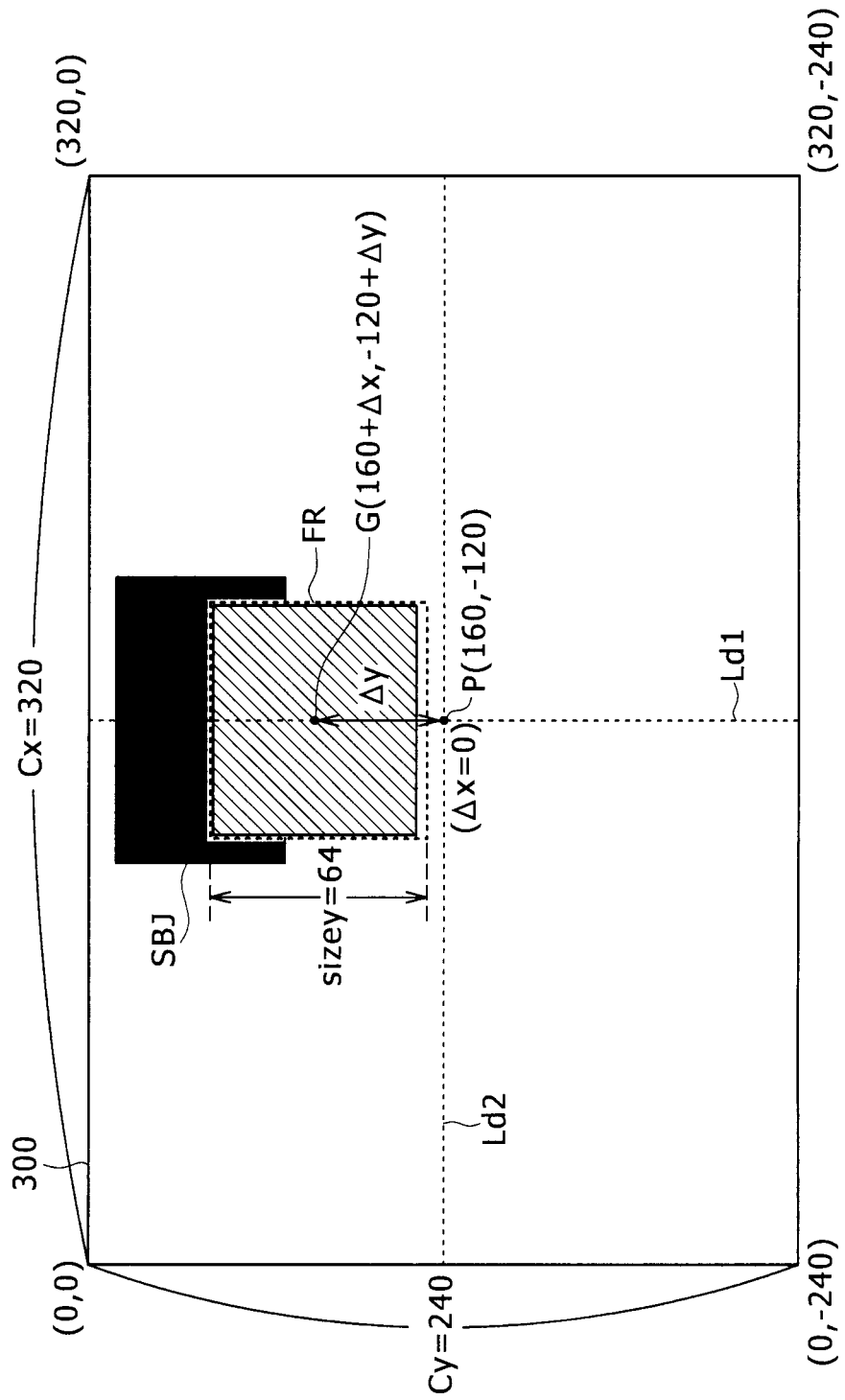

IMAGE PICKUP CONTROL APPARATUS, IMAGE PICKUP CONTROL METHOD AND COMPUTER READABLE MEDIUM FOR CHANGING AN IMAGE PICKUP MODE

BACKGROUND OF THE INVENTION

1. Field of the Invention

This invention relates to an image pickup control apparatus and an image pickup control method for an image pickup apparatus and an image pickup system wherein the image pickup visual field is automatically varied to carry out image pickup. The present invention relates also to a program for implementing the image pickup control apparatus and the image pickup control method.

2. Description of the Related Art

An image pickup system is already known which includes a digital still camera and a camera platform which electrically varies the pan-tilt directions of the digital still camera. Further, a technique of carrying out automatic composition adjustment and automatic recording of a picked up image obtained by the composition adjustment is known and disclosed in Japanese Patent Laid-Open No. 2009-100300 (hereinafter referred to as Patent Document 1).

According to the technique disclosed in Patent Document 1, for example, a face detection technique is used to carry out search for an image pickup object as a person. In particular, while the digital still camera is rotated in the pan direction by the camera platform, detection of an image pickup object, that is, of the face of a person, reflected in a picture range is carried out.

Then, if an image pickup object is detected in the picture range as a result of such search for an image pickup object, then decision of an optimum composition in accordance with a detection form of the image pickup object such as, for example, the number, position, size and so forth of image pickup objects, within the picture range at the point of time is carried out (optimum composition decision). In short, angles for pan, tilt and zoom operations which are estimated to be optimum are determined.

Further, after the optimum angles for pan, tilt and zoom operations are determined by the optimum composition decision in this manner, adjustment of the pan, tilt and zoom angles is carried out using the determined angles as target angles (composition adjustment).

After completion of the composition adjustment, automatic recording of a picked up image is carried out.

With automatic image pickup operation by such automatic composition adjustment, that is, with picked up image automatic recording by such automatic composition adjustment, the necessity for any manual operation for image pickup by the user is eliminated, and recording of a picked up image of an optimum composition can be carried out automatically.

SUMMARY OF THE INVENTION

Incidentally, automatic image pickup which does not demand a cameraman is advantageous in that, since a user is not conscious of a cameraman, for example, in a party, an image of a natural expression or form can be picked up. On the other hand, some user may desire to be photographed in a conscious expression or form thereof. For example, a user may desire to be photographed in a commemorative photograph, in a form when it takes a pose to the camera or in an expression in which it is conscious of the image pickup.

Usually, where a cameraman holds a camera to pick up a still picture, users who want to have a photograph of them taken will call a cameraman, ask the cameraman to take a photograph of them and gather together or take a pose.

However, only if such automatic image pickup as described above is carried out, photographing or still picture image pickup which satisfies such a demand of a user or users cannot be carried out.

Therefore, it is desirable to provide an image pickup system which carries out automatic image pickup and can readily implement still picture image pickup in accordance with a demand of a user.

According to an embodiment of the present invention, there is provided an image pickup control apparatus including a trigger acceptance section adapted to accept a predetermined trigger input as a changeover input from an automatic image pickup mode to a request responding image pickup mode, and a request responding image pickup control section adapted to establish, when the trigger input is accepted by the trigger acceptance section while an image pickup apparatus is carrying out still picture image pickup operation with an image pickup visual field of the image pickup apparatus changed in the automatic image pickup mode, the request responding image pickup mode and control the image pickup apparatus to execute a process for determining an image pickup visual field in accordance with an image pickup request and then execute still picture image pickup operation after the determination of the image pickup visual field.

Preferably the image pickup control apparatus further includes a picked up image recording control section adapted to control the still picture image pickup operation of the image pickup apparatus which carries out image pickup of an image pickup object and recording of picked up image data on or into a recording medium, an image pickup visual field variation section adapted to change the image pickup visual field of the image pickup apparatus, an image pickup visual field variation control section adapted to control the image pickup visual field variation section, and an image pickup preparation processing section adapted to carry out a process of determining an image pickup visual field for still picture image pickup, the request responding image pickup control section being operable to control, when the trigger input is accepted by the trigger acceptance section while the image pickup apparatus is carrying out still picture image pickup under the control of the picked up image recording control section while the image pickup visual field variation control section controls the image pickup visual field variation section in the automatic image pickup mode, the image pickup preparation processing section to execute a process of determining an image pickup visual field in accordance with the image pickup request in the request responding image pickup mode and cause a still picture image pickup operation to be executed under the control of the picked up image recording control section after the determination of the image pickup visual field.

Further preferably, the image pickup control apparatus further includes an image pickup prediction operation control section adapted to control execution of a prediction operation for predicting that still picture image pickup will be carried out, the request responding image pickup control section being operable to control the image pickup preparation processing section to execute a process for determining an image pickup visual field for a request responding image pickup operation in the request responding image pickup mode, control, after the determination of the image pickup visual field, the prediction operation to be executed under the control of the image pickup prediction operation control section and then cause the still picture image pickup operation to be executed under the control of the picked up image recording control section.

The trigger acceptance section may accept a particular operation input by a user, for example, touch operation by the user to the touch sensor section, a particular sound input as the trigger input or that a particular image pickup object state is decided from a picked up image as the trigger input.

In the request responding image pickup mode, the image pickup preparation processing section may carry out an image pickup object detection process for moving an image pickup object in accordance with the image pickup request into the image pickup visual field while the image pickup visual field variation control section controls the image pickup visual field variation section.

Or, in the request responding image pickup mode, the image pickup preparation processing section may carry out a composition process of adjusting the arrangement of an image pickup object image in the image pickup visual field while the image pickup visual field variation control section controls the image pickup visual field variation section. In this instance, the composition process may include a process of further moving, when one or more image pickup objects are detected in the image pickup visual field, the image pickup visual field to confirm presence of some other image pickup object in accordance with the image pickup request.

Or, the image pickup preparation processing section may carry out the composition process also in the automatic image pickup mode but carry out, in the request responding image pickup mode, the composition process in a processing procedure or with a processing parameter different from that in the automatic image pickup mode.

According to another embodiment of the present invention, there is provided an image pickup control method for an image pickup apparatus or an image pickup system which includes a still picture image pickup section for carrying out image pickup of an image pickup object and recording of picked up image data on or into a recording medium, and an image pickup visual field variation section for an image pickup visual field of the still picture image pickup section, including the steps of causing the still picture image pickup section to execute a still picture image pickup operation while the image pickup visual field variation section is controlled in an automatic image pickup mode, accepting a predetermined trigger input as a changeover input from the automatic image pickup mode to a request responding image pickup mode, determining an image pickup visual field in accordance with an image pickup request in the request responding image pickup mode, and causing a still picture image pickup operation to be executed by the still picture image pickup section after the determination of the image pickup visual field.

According to a further embodiment of the present invention, there is provided a program for causing a processor to control the image pickup apparatus or image pickup system described above, which includes steps same as those of the image pickup control method.

In the image pickup control apparatus, image pickup control method and program, while the image pickup apparatus or image pickup system automatically controls the image pickup visual field variation section to vary the image pickup visual field, it executes still picture image pickup operation. The operation in the automatic image pickup mode is executed independently of the will or demand of the user. The user can request image pickup by carrying out a predetermined trigger input during the operation in the automatic image pickup mode. The image pickup operation in accordance with the trigger input is operation in the request responding image pickup mode.

In the request responding image pickup mode, an image pickup visual field in accordance with the image pickup request is determined. For example, operation wherein the user who has carries out the trigger input is determined as an image pickup object is carried out. Then, after such determination of an image pickup visual field, still picture image pickup operation is executed automatically. At this time, if a prediction operation predicting that still picture image pickup will be carried out is carried out, then the user can easily make an expression or take a pose.

In short, according to the image pickup operation, "image pickup based on a will of a cameraman" in an ordinary case in which a cameraman picks up an image and "image pickup based on a demand from a user" can be executed in the automatic image pickup mode and the request responding image pickup mode, respectively.

With the image pickup control apparatus, image pickup control method and program, by image pickup in the automatic image pickup mode, an image of a natural expression, form, scene and so forth can be picked up. In addition, by image pickup in the request responding image pickup mode, image pickup in accordance with a demand of the user can be carried out. Consequently, while no cameraman is demanded, various manners of image pickup equivalent to those where a cameraman carries out image pickup can be achieved.

BRIEF DESCRIPTION OF THE DRAWINGS

FIG. 2 is a perspective view of a camera platform which is another component of the image pickup system;

FIG. 8 is a block diagram showing an example of an internal configuration of the digital still camera;

FIGS. 11A and 11B are flow charts illustrating different automatic image pickup processes of the image pickup system;

FIGS. 18 and 19 are diagrammatic views illustrating a basic composition process;

DETAILED DESCRIPTION OF THE PREFERRED EMBODIMENTS

Figure 1A:
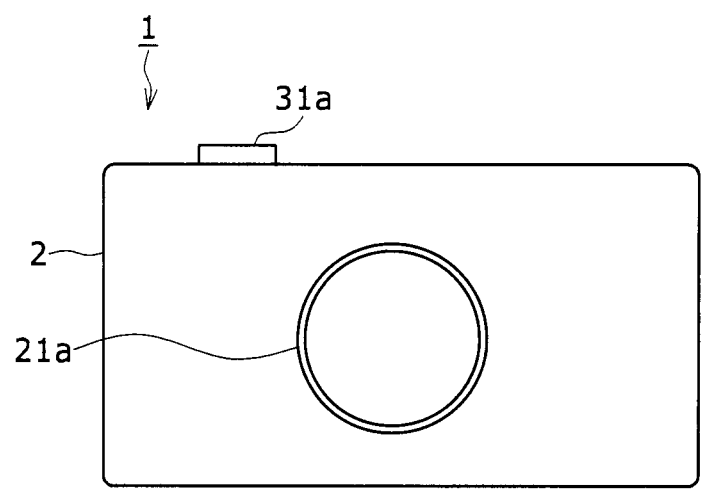
FIGS. 1A and 1B are a front elevational view and a rear elevational view, respectively, of a digital still camera which is a component of an image pickup system to which the present embodiment is applied.

In the following, preferred embodiments of the present invention are described in detail in the following order. In the embodiments, the present invention is applied to an image pickup apparatus or image pickup system which includes a digital still camera and a camera platform.
1. Configuration of the Image Pickup System
   1-1. General Configuration
   1-2. Digital Still Camera
   1-3. Camera Platform
2. Example of the Functional Configuration
3. Automatic Image Pickup Process
4. Image Pickup Operation of the First Embodiment
5. Modifications to the First Embodiment
   5-1. Trigger to the Request Responding Image Pickup Mode
   5-2. Pan-Tilt to the Requested Direction
   5-3. Example Wherein Image Pickup Object Detection is Not Executed in the Request Responding Image Pickup Mode
   5-4. Example Wherein a Composition Process is Not Executed in the Request Responding Image Pickup Mode
   5-5. Picked Up Image Presentation in the Request Responding Image Pickup Mode
   5-6. Tentative Composition Process
   5-7. Control Method in a Different Request Responding Image Pickup Mode
6. Image Pickup Operation of the Second Embodiment
7. Image Pickup Operation of the Third Embodiment
8. Image Pickup Operation of the Fourth Embodiment
9. Modifications to the Functional Configuration
10. Program It is to be noted that, while the terms "picture range," "view angle," "image pickup visual field" and "composition" are used in the present specification, they are individually defined in the following manner.

The term "picture range" is a range of a region corresponding to one screen in which, for example, an image looks fitted, and generally has an outer frame shape of a vertically or horizontally elongated rectangle.

The "view angle" is normally called zoom angle or the like and is a representation by an angle of a range included in the picture range which depends upon the position of a zoom lens in an optical system of an image pickup apparatus. Although it is generally considered that the view angle depends upon the focal distance of the image pickup optical system and the size of an image surface, that is, an image sensor or a film, a factor which can vary in response to the focal distance is referred to herein as view angle.

The term "image pickup visual field" represents a visual field by an image pickup optical system. In other words, the image pickup visual field is a range of a peripheral sight of the image pickup apparatus within which the peripheral sight is held as an image pickup object within the picture range. The image pickup visual field depends upon a swinging angle in the pan direction, that is, in the horizontal direction and an angle in the tilt direction, that is, in the vertical direction, or in other words, defined by an elevation angle and a depression angle.

The term "composition" is referred to also as framing and represents an arrangement state of an image pickup object in the picture range, which depends, for example, upon the image pickup visual field, including size settings of the image pickup object.

1. Configuration of the Image Pickup System 1-1. General Configuration

Figure 1B:
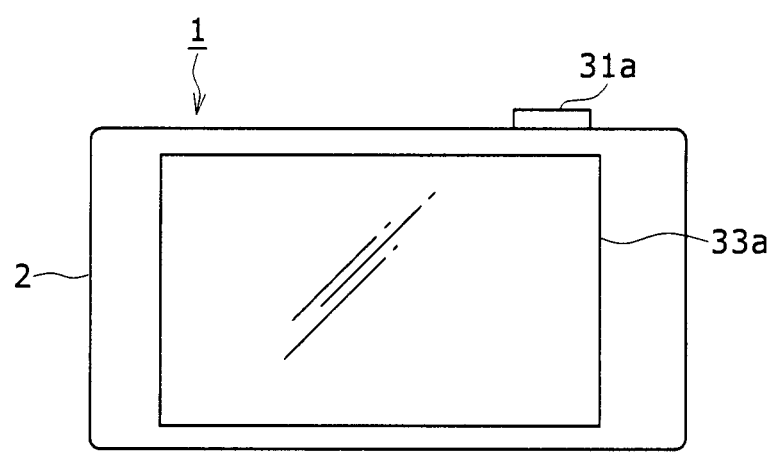

Referring first to FIGS. 1A and 1B, there is shown an image pickup system to which the present invention is applied. The image pickup system includes a digital still camera 1 and a camera platform 10 removably attached to the digital still camera 1.

An appearance of the digital still camera 1 is shown in FIGS. 1A and 1B. Particularly, a front elevation and a rear elevation of the digital still camera 1 are shown in FIGS. 1A and 1B, respectively.

The digital still camera 1 includes a lens section 21a provided on the front side of a main body section 2 as seen in FIG. 1A. The lens section 21a is an element of an optical system for image pickup which is exposed to the outer side of the main body section 2.

A release button 31a is provided on an upper face of the main body section 2. In the image pickup mode, an image picked up by the lens section 21a, that is, a picked up image, is generated as an image signal. In the image pickup mode, picked up image data for each frame are obtained at a predetermined frame rate by an image sensor hereinafter described.

If an operation for the release button 31a is carried out, that is, if a release operation/shutter operation is carried out, then a picked up image, that is, a frame image, at this timing is recorded as image data of a still image into a recording medium. In other words, still image pickup normally called photographing is carried out.

The digital still camera 1 further has a display screen section 33a on the rear face side thereof as shown in FIG. 1B.

In the image pickup mode, an image called through-picture or the like which is an image being currently picked up by the lens section 21a is displayed on the display screen section 33a. The through-picture is a moving picture based on frame images obtained by the image sensor and is an image representing an image pickup object at the time as it is.

On the other hand, in a reproduction mode, image data recorded in the recoding medium are reproduced and displayed.

Further, in response to an operation carried out for the digital still camera 1 by a user, an operation image as a GUI (Graphical User Interface) is displayed on the display screen section 33a.

Further, if a touch panel is combined with the display screen section 33a, then the user can carry out necessary operation by touching the display screen section 33a with a finger thereof.

It is to be noted that, though not shown, the digital still camera 1 may include various operation elements such as keys and dials in addition to the release button 31a.

Further, the digital still camera 1 may include a sound collecting element as a sound inputting section 35 hereinafter described, an LED light emitting section as a release prediction execution section 36, a speaker section and so forth.

Figure 3:
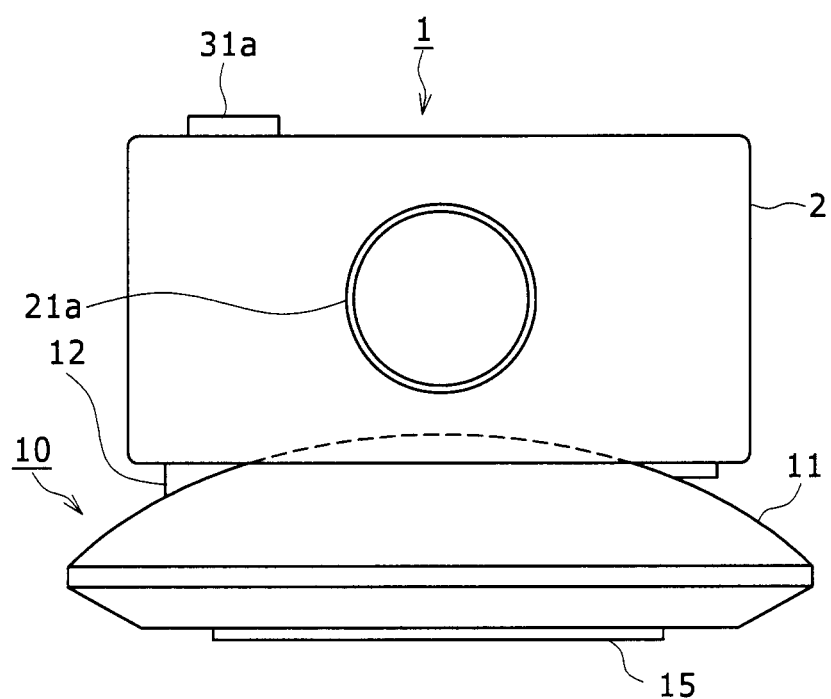
FIG. 3 is a front elevational view showing the digital still camera attached to the camera platform.
Figure 4:
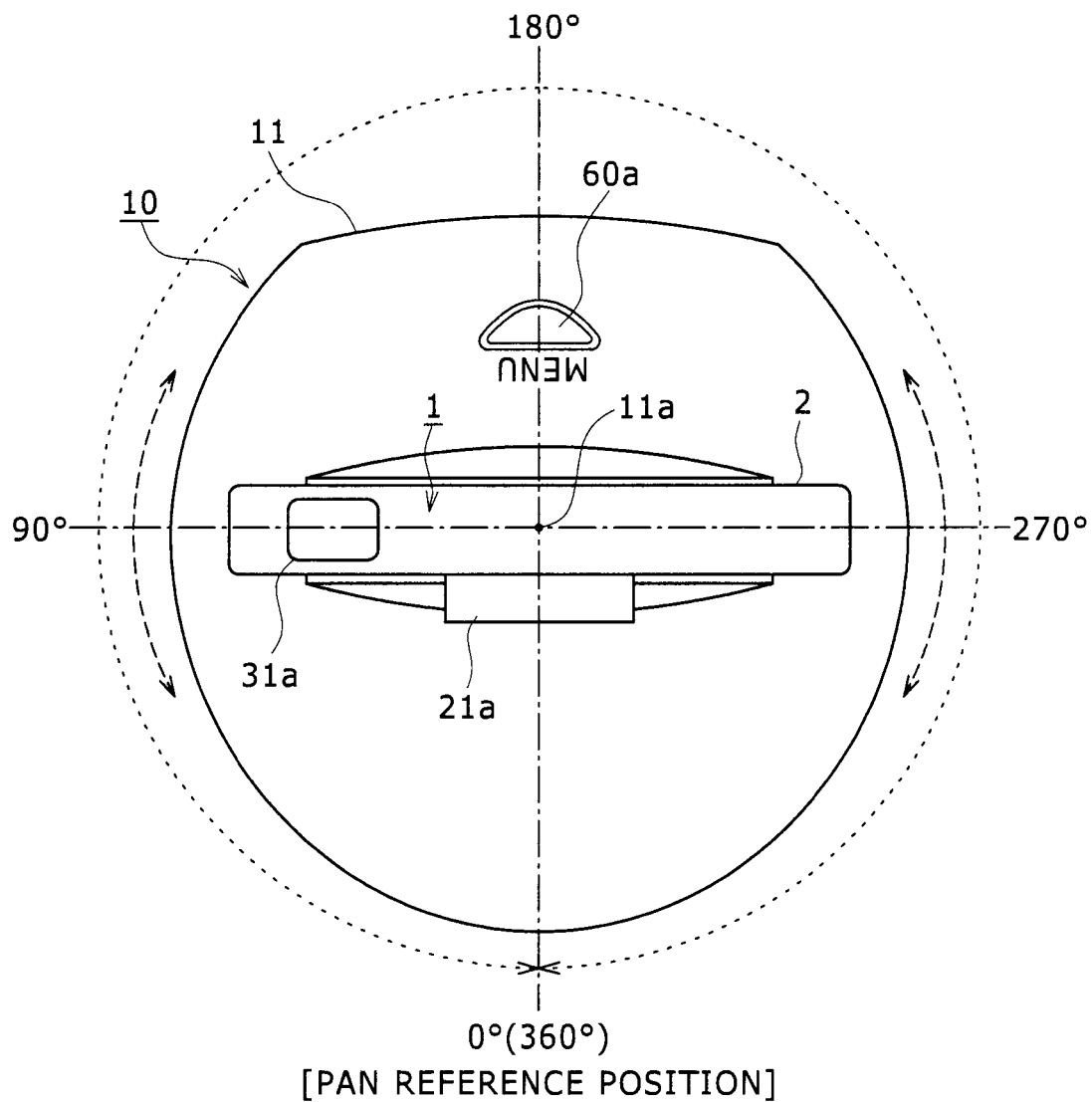
FIG. 4 is a schematic top plan view illustrating a movement in the pan direction in the state in which the digital still camera is attached to the camera platform.
Figure 5A:
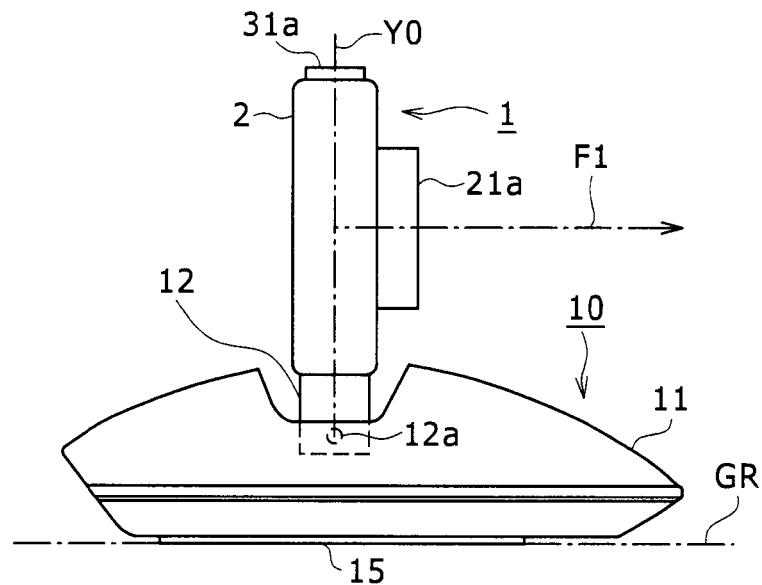
FIGS. 5A and 5B are side elevational views illustrating a movement in the tilt direction in the state in which the digital still camera is attached to the camera platform.
Figure 5B:
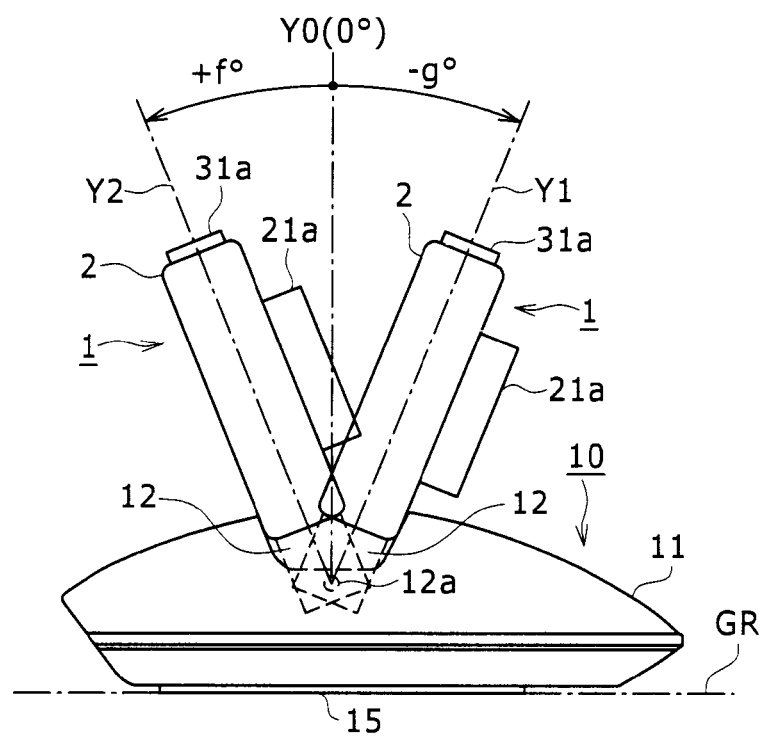

FIG. 2 shows an appearance of the camera platform 10. Further, FIGS. 3 to 5B show, as an appearance of the image pickup system, the digital still camera 1 placed in an appropriate state on the camera platform 10. FIG. 3 shows a front elevational view, FIG. 4 shows a top plan view, and FIGS. 5A and 5B show side elevational views, particularly, FIG. 5B illustrates a range of movement of the digital still camera 1 by a tilt mechanism hereinafter described.

Referring to FIGS. 2 to 5B, the camera platform 10 is roughly structured such that a main body portion 11 is combined with and provided on a ground stand portion 15 and a camera pedestal portion 12 is attached to the main body portion 11.

In order to attach the digital still camera 1 to the camera platform 10, the digital still camera 1 is placed at the bottom face side thereof on the upper face side of the camera pedestal portion 12.

Referring particularly to FIG. 2, a projection 13 and a connector 14 are provided on the upper face of the camera pedestal portion 12. Though not shown, a hole for engaging with the projection 13 is formed on the lower face of the main body section 2 of the digital still camera 1. In a state wherein the digital still camera 1 is placed appropriately on the camera pedestal portion 12, the hole and the projection 13 are engaged with each other. In this state, when ordinary pan and tilt movements of the camera platform 10 are carried out, such a situation that the digital still camera 1 is displaced on or removed from the camera platform 10 does not occur.

Further, in the digital still camera 1, a connector is provided also at a predetermined position of the lower face thereof. In the state in which the digital still camera 1 is attached appropriately to the camera pedestal portion 12 as described above, the connector of the digital still camera 1 and the connector 14 of the camera platform 10 are connected to each other thereby to allow communication at least between the digital still camera 1 and the camera platform 10.

It is to be noted that, for example, the connector 14 and the projection 13 actually can change or move the positions thereof within a certain range on the camera pedestal portion 12. For example, if an adapter compatible with the shape of the bottom face of the digital still camera 1 or a like element is used additionally, then different types of digital still cameras can be attached to the camera pedestal portion 12 for communication with the camera platform 10.

Now, basic movements of the digital still camera 1 in pan and tilt directions by the camera platform 10 are described.

First, basic movements of the digital still camera 1 in the pan direction are described.

In a state in which the camera platform 10 is placed, for example, on a table or on the floor, the bottom face of the ground stand portion 15 contacts with the table or the floor. In this state, the main body portion 11 side can rotate in the clockwise direction and the counterclockwise direction around a rotation axis 11a as seen in FIG. 4. Consequently, the image pickup visual field in the horizontal direction, that is, in the leftward and rightward direction, of the digital still camera 1 attached to the camera platform 10 can be carried out thereby. In other words, panning can be carried out.

It is to be noted that the pan mechanism of the camera platform 10 in this instance is structured such that rotation by more than 360° can be carried out freely without any limitation with regard to both of the clockwise direction and the counterclockwise direction.

Further, the pan mechanism of the camera platform 10 has a reference position determined with regard to the pan direction.

It is assumed here that the pan reference position is represented by 0° or 360° and the rotational position of the main body portion 11 along the pan direction, that is, the pan position or pan angle, is represented by 0° to 360°.

Basic movements of the camera platform 10 in the tilt direction are carried out in the following manner.

A movement of the camera platform 10 in the tilt direction is obtained by swinging the angular position of the camera pedestal portion 12 in the opposite directions to an elevation angle and a depression angle around a pivot axis 12a as seen in FIGS. 5A and 5B.

FIG. 5A particularly shows the camera pedestal portion 12 at a tilt reference position Y0 which is 0°. In this state, an image pickup direction F1 which coincides with an image pickup optical axis of the lens section 21a of the optical system section and a ground face portion GR with which the ground stand portion 15 contacts extend in parallel to each other.

From this state, the camera pedestal portion 12 can move, toward the elevation angle direction, within a range of a predetermined maximum rotational angle +f° from the tilt reference position Y0 of 0° around the pivot axis 12a as seen in FIG. 5B. On the other hand, also toward the depression angle direction, the camera pedestal portion 12 can move within a range of a predetermined maximum rotational angle −g° from the tilt reference position Y0 of 0°.

Since the camera pedestal portion 12 moves within the range from the maximum rotational angle +f° to the maximum rotational angle −g° with reference to the tilt reference position Y0 of 0° in this manner, the image pickup visual field in the tilt direction, that is, in the upward and downward direction, of the digital still camera 1 attached to the camera platform 10, that is, to the camera pedestal portion 12, can be varied. In other words, a tilt movement is obtained.

Figure 6:
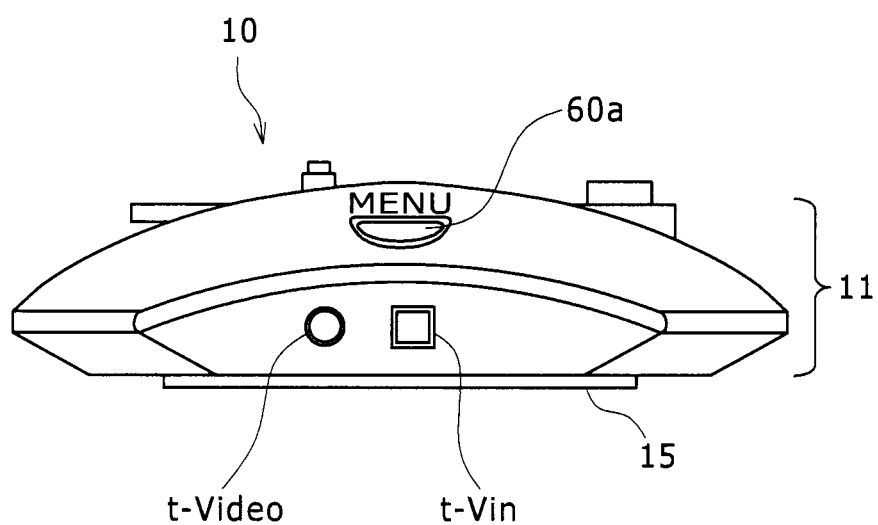
FIG. 6 is a rear elevational view of the camera platform.

FIG. 6 shows a rear face of the camera platform 10.

Referring to FIG. 6, the camera platform 10 has a power supply terminal section t-Vin and a video terminal section t-Video formed on a rear face of the main body portion 11 thereof. To the power supply terminal section t-Vin, a power supply cable is removably connected, and to the video terminal section t-Video, a video cable is removably connected.

The camera platform 10 supplies electric power input thereto through the power supply terminal section t-Vin to the digital still camera 1 attached to the camera pedestal section 12 described hereinabove to charge the digital still camera 1.

In short, the camera platform 10 functions also as a cradle or dock for charging the digital still camera 1.

Further, the camera platform 10 is configured such that, when an image signal, for example, based on a picked up image is transmitted from the digital still camera 1 side, the camera platform 10 outputs the image signal to the outside through the video terminal section t-Video.

Further, as shown also in FIG. 6 and FIG. 4, a menu button 60a is provided on the rear face of the main body portion 11 of the camera platform 10. If the menu button 60a is operated, then a menu screen image is displayed, for example, on the display screen section 33a side of the digital still camera 1 through communication between the camera platform 10 and the digital still camera 1. Through the menu screen image, the user can carry out demanded operation.

Incidentally, in a form of the image pickup system, a touch operation of a user is adopted as one of triggers for triggering operation of a request responding image pickup mode hereinafter described.

Figure 7A:
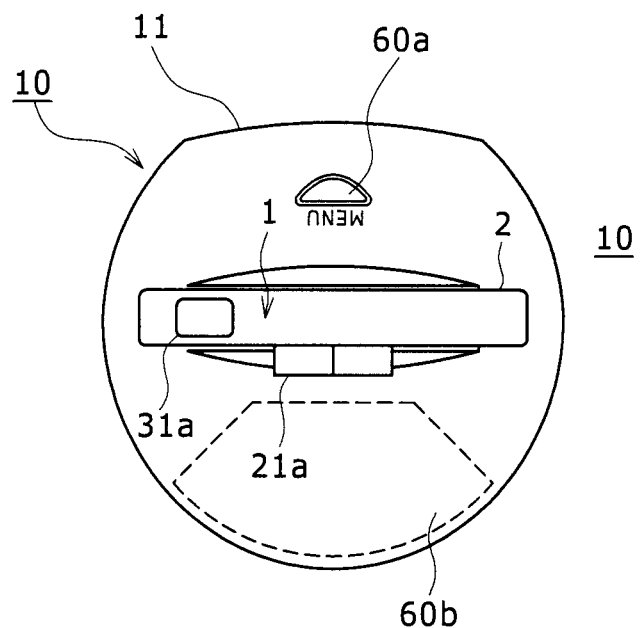
FIGS. 7A and 7B are top plan views showing different touch sensor sections of the camera platform.

In particular, the user would carry out an operation of touching the camera platform 10. To this end, a touch region 60b is formed on the upper face of the main body portion 11, for example, as shown in FIG. 7A. When the user touches the touch region 60b, a touch sensor provided on the camera platform 10 detects the touch operation.

It is to be noted that, while a region of the front face side indicated by a broken line is determined as the touch region 60b, for example, the overall area of the upper face of the main body portion 11 may otherwise be determined as the touch region 60b.

Figure 7B:
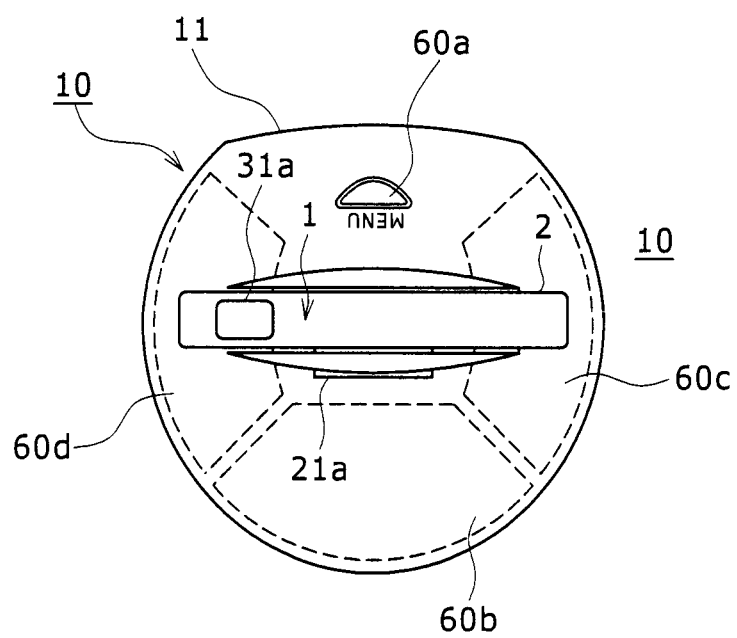

FIG. 7B shows an example of the upper face of the main body portion 11 of the camera platform 10 on which touch regions 60b, 60c and 60d are provided at a front side portion, a right side portion and a left side portion, respectively. For example, three touch sensors may be provided in the camera platform 10 such that touching operations with the touch regions 60b, 60c and 60d may be detected by the corresponding touch sensors.

In this instance, depending upon by which one of the touch sensors a touch operation is detected, the image pickup system side including the digital still camera 1 and the camera platform 10 can decide from which one of the forward, rightward and leftward directions the touch operation is carried out by the user.

While the arrangement wherein three touch regions 60b to 60d are provided is shown as an example in FIG. 7B, naturally a greater number of touch sensors may be provided in a greater number of regions so that the direction in which a touching operation is carried out can be decided more finely.

Further, though not shown, the camera platform 10 may additionally include a sound inputting section having a microphone and a sound inputting circuit system like a sound inputting section 62 hereinafter described.

Further, the camera platform 10 may include an image pickup section including an image pickup lens, an image sensor, a picked up image signal processing system and so forth like an image pickup section 63 hereinafter described.

Furthermore, the camera platform 10 may include a light emitting indication section of an LED or the like, a display section in the form of a liquid crystal panel, a sound outputting section including a speaker, a sound outputting circuit and so forth like a release prediction execution section 64 hereinafter described.

Such various sections mentioned are hereinafter described one by one.

1-2. Digital Still Camera

FIG. 8 shows an example of an internal configuration of the digital still camera 1.

Referring to FIG. 8, an optical system section 21 includes a predetermined number of lens groups for image pickup including, for example, a zoom lens and a focusing lens, a diaphragm and so forth. The optical system section 21 forms an image of light incident thereto as image pickup light on a light receiving face of an image sensor 22.

The optical system section 21 further includes driving mechanical units for driving the zoom lens, focusing lens and diaphragm described above and associated elements. Operation of the driving mechanical units is controlled by camera control such as zoom or view angle control, automatic focusing control and automatic exposure control which are executed, for example, by a control section 27.

The image sensor 22 carries out photoelectric conversion of converting image pickup light obtained by the optical system section 21 into an electric signal. To this end, the image sensor 22 receives the image pickup light from the optical system section 21 by means of the light receiving face of a photoelectric conversion element and successively outputs signal charge accumulated in response to the intensity of the received light at predetermined timings. Consequently, an electric signal corresponding to the image pickup light, that is, a picked up image signal, is output.

It is to be noted that, although the photoelectric conversion element or image pickup element adopted as the image sensor 22 is not limited particularly, under the existing circumstances, for example, CMOS (Complementary Metal Oxide Semiconductor) sensors, CCD (Charge Coupled Device) sensors and like sensors are available. Where a CMOS sensor is adopted, a device or part which corresponds to the image sensor 22 may be structured including an analog-digital converter which corresponds to an A/D converter 23 described below.

The picked up image signal output from the image sensor 22 is input to the A/D converter 23, by which it is converted into a digital signal. The digital signal is input to a signal processing section 24.

The signal processing section 24 is configured, for example, from a DSP (Digital Signal Processor) and carries out predetermined signal processing in accordance with a program for the digital picked up image signal output from the A/D converter 23.

The signal processing section 24 fetches the digital picked up image signal output from the A/D converter 23 in a unit corresponding to one still picture, that is, one frame image. Then, the signal processing section 24 carries out predetermined signal processing for the picked up image signal fetched in a unit of a still picture to generate picked up image data or picked up still image data which are image signal data corresponding to one still picture.

Further, the signal processing section 24 sometimes utilizes the picked up image data acquired in this manner to execute an image analysis process for an image pickup object detection process or a composition process hereinafter described.

In order to record the picked up image data generated by the signal processing section 24 in such a manner as described above as image information into a memory card 40 as a recording medium, the picked up image data corresponding, for example, to one still picture are output from the signal processing section 24 to an encoding/decoding section 25.

The encoding/decoding section 25 executes, for the picked up image data in a unit of a still picture output from the signal processing section 24, compression encoding in accordance with a predetermined still picture compression encoding method and then adds a header and so forth to the resulting picked up image data, for example, under the control of a control section 27 to convert the picked up image data into image data of a predetermined compressed form. Then, the image data produced in this manner are transferred to a medium controller 26.

The medium controller 26 writes and records the image data transferred thereto into the memory card 40 under the control of the control section 27. The memory card 40 in this instance is a recording medium configured such that it has an outer profile of a card type formed, for example, in compliance with predetermined standards and internally has a nonvolatile semiconductor storage device such as a flash memory.

It is to be noted that the recording medium for recording image data may be different in type, form and so forth from the memory card described above. It is possible to adopt various recording media such as, for example, an optical disk, a hard disk, a semiconductor memory chip such as a flash memory chip attached against removal, and a hologram memory.

Further, the digital still camera 1 may be configured such that a display section 33 executes image display making use of picked up image data obtained by the signal processing section 24 to display a through-picture which is an image which is being currently picked up.

For example, while the signal processing section 24 fetches a picked up image signal output from the A/D converter 23 to generate picked up image signal corresponding to a single still picture as described hereinabove, it successively carries out the operation to successively generate picked up image data corresponding to frame images of a dynamic picture. Then, the picked up image data generated successively in this manner are transferred to a display driver 32 under the control of the control section 27.

The display driver 32 generates a driving signal for driving the display section 33 based on the picked up image data input thereto from the signal processing section 24 as described above and outputs the driving signal to the display section 33. Consequently, the display section 33 successively displays images based on the picked up image data in a unit of a still picture.

If user see this, the image that is picked up is at the time is displayed on the display section 33 in a moving image. That is, a through-picture is displayed.

Further, the digital still camera 1 can reproduce image data recorded in the memory card 40 and causes the display section 33 to display an image of the image data.

To this end, the control section 27 designates image data and issues an instruction to the medium controller 26 to read out data from the memory card 40. In accordance with the instruction, the medium controller 26 accesses an address on the memory card 40 on which the designated image data are recorded to execute data reading and transfers the read out data to the encoding/decoding section 25.

The encoding/decoding section 25 extracts entity data as compressed still picture data from within the picked up image data transferred thereto from the medium controller 26, for example, under the control of the control section 27 and then executes a decoding process corresponding to the compression coding for the compressed still picture data to obtain picked up image data corresponding to one still picture. Then, the encoding/decoding section 25 transfers the picked up image data to the display driver 32. Consequently, an image of the picked up image data recorded on the memory card 40 is reproduced and displayed on the display section 33.

The display section 33 can display not only such a through-picture of a reproduced image of image data but also a user interface image or operation image.

In this instance, the control section 27 generates displaying image data as a necessary user interface image, for example, in response to an operation state then and outputs the generated displaying image data to the display driver 32. Consequently, a user interface image is displayed on the display section 33.

It is to be noted that the user interface image can be displayed on a display screen of the display section 33 separately from a monitor image or a reproduction image of picked up image data, for example, like a particular menu screen image, or can be displayed in a superposed or combined image at part of the monitor screen or the reproduction image of picked up image data.

The control section 27 includes a CPU (Central Processing Unit) and configures a microcomputer together with a ROM 28, a RAM 29 and so forth.

The ROM 28 stores, for example, programs to be executed by the CPU as the control section 27 and various kinds of setting information relating to operation of the digital still camera 1.

The RAM 29 serves as a main storage device for the CPU.

Further, a flash memory 30 in this instance is provided as a nonvolatile storage area to be used to store various kinds of setting information whose alteration or rewriting is demanded, for example, in response to a user operation or an operation history.

It is to be noted that, where a nonvolatile memory such as, for example, a flash memory is adopted as the ROM 28, a partial storage area of the ROM 28 may be used in place of the flash memory 30.

In the digital still camera 1, the control section 27 carries out various image pickup preparation processes for automatic image pickup.

First, the control section 27 executes, or controls the signal processing section 24 to execute, as an image pickup object detection process, a process of executing image pickup object detection from frame images obtained by the signal processing section 24 while the image pickup visual field is varied and then searching for an image pickup object around the digital still camera 1.

Further, as a composition process, the control section 27 carries out optimum composition decision of deciding a composition, which is considered optimum in response to a mode of the image pickup object detected by the image pickup object detection and composition comparison using the composition determined optimum by the optimum composition determination as a target composition.

After such image pickup preparation processes, the control section 27 carries out control and processing for executing automatic recording of a picked up image.

Further, prior to image pickup execution, that is, prior to shutter release, the control section 27 carries out also control for a prediction operation of presenting to the user that still picture image pickup will be carried out.

Such control processes are hereinafter described.

An operation section 31 includes various operation elements provided on the digital still camera 1 and operation information signal outputting elements for generating operation information signals responsive to operation carried out for the operation elements and outputting the operation information signals to the control section 27.

The operation elements include the release button 31*a* and a power supply button, a mode button, a zoom operation button, an operation dial and so forth whose illustration is omitted in FIG. 1.

Where the display section 33 is formed as a touch panel, also the touch sensor section of the display section 33 is included in the operation section 31.

Also a reception section for receiving a command signal from a remote controller may be included in the operation section 31.

The control section 27 executes predetermined processing in response to an operation information signal input thereto from the operation section 31. Consequently, operation of the digital still camera 1 in accordance with the user operation is executed.

It is to be noted that, while the touch sensor in the foregoing description is provided on the camera platform 10, as a possible configuration, the touch sensor may be provided in a housing of the digital still camera 1. Also the touch sensor in this instance is included in the operation section 31 shown in FIG. 8.

A camera platform responding communication section 34 executes communication between the camera platform 10 side and the digital still camera 1 side in accordance with a predetermined communication method.

The camera platform responding communication section 34 has a physical layer configuration for allowing transmission and reception of a communication signal with a communication section on the camera platform 10 side, for example, in a state wherein the digital still camera 1 is attached to the camera platform 10 and a configuration for implementing a communication process corresponding to a predetermined layer which is an upper layer with respect to the physical layer. As the physical layer configuration, the connector to be connected to the connector 14 in FIG. 2 is included.

Further, in order to make charging from the camera platform 10 side possible, each of the connectors mentioned includes not only terminals for transferring a communication signal but also terminals for transmission of charging power. Though not shown, the digital still camera 1 includes a battery receiving section for removably receiving a battery, and a battery received in the battery receiving section is charged based on electric power sent from the camera platform 10 side.

The digital still camera 1 sometimes includes a sound inputting section 35. The sound inputting section 35 is used to detect an input of, for example, voice of a particular word or of particular sound such as, for example, sound by clapping of hands as a trigger input to a request responding image pickup mode hereinafter described.

The sound inputting section 35 includes a sound signal processing circuit including a microphone and a microphone amplifier, a sound analysis section for deciding particular sound, and so forth. It is to be noted that sound analysis may otherwise be executed by the control section 27.

Also where an input of voice of a particular word or of particular sound is to be decided for decision of a shutter release timing, the sound inputting section 35 is provided.

Further, the digital still camera 1 sometimes includes a release prediction execution section 36. The release prediction execution section 36 executes a release prediction operation hereinafter described.

The release prediction execution section 36 may be any apparatus section which can present to a user by indication or sound that still picture image pickup will be carried out.

For example, the release prediction execution section 36 may be configured as a light emission operation section including a light emitting element such as an LED and a light emission driving circuit for the light emitting element in order to carry out prediction, for example, with a predetermined light emission pattern.

Or, the release prediction execution section 36 may be a display section which is provided as a liquid crystal display section or the like provided on the front face side of the housing of the digital still camera 1 and carries out previous prediction through particular character display, color display, pattern display or the like.

Or else, the release prediction execution section 36 may be formed as a sound outputting section which carries out prediction through electronic sound, beep sound, message voice or the like and includes a sound signal generation section, an amplifier, a speaker and so forth.

Or else, the release prediction execution section 36 may be formed as a suitable combination of the sections described above.

1-3. Camera Platform

Figure 9:
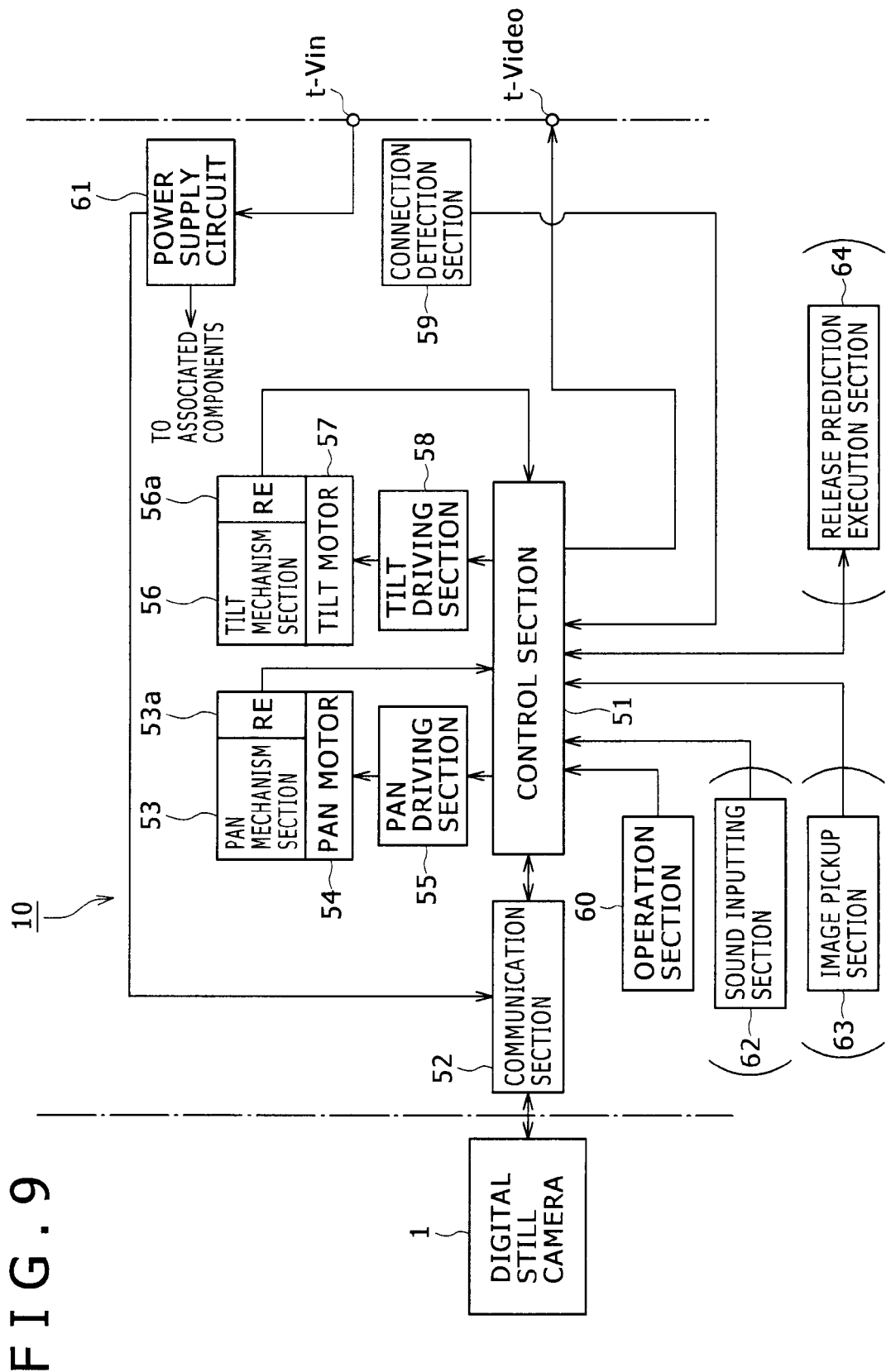
FIG. 9 is a block diagram showing an example of an internal configuration of the camera platform.

FIG. 9 shows an example of an internal configuration of the camera platform 10.

Referring to FIG. 9, the camera platform 10 includes a power supply terminal section t-Vin and a video terminal section t-Video as described hereinabove with reference to FIG. 6.

Electric power input through the power supply terminal section t-Vin is supplied as operation power necessary for the components of the camera platform 10 through a power supply circuit 61. The power supply circuit 61 further generates charging electric power for the digital still camera 1 and supplies the charging electric power to the digital still camera 1 side through a communication section 52 and associated connectors.

Meanwhile, to the video terminal section t-Video, an image signal transmitted from the digital still camera 1 side is supplied through the communication section 52 and a control section 51.

It is to be noted that, while it is described above that the operation electric power for the components of the camera platform 10 is supplied only through the power supply terminal section t-Vin, actually the camera platform 10 has a receiving section for a cell such that operation electric power for the components can be supplied from a cell received in the receiving section.

The camera platform 10 further includes a connection detection section 59 for detecting whether or not a cable is connected to each of the power supply terminal section t-Vin and the video terminal section t-Video. As a particular configuration of the detection mechanism for cable connection, for example, a switch may be used for on/off switching by connection/disconnection of a cable. However, the connection detection section 59 may have any configuration only if it outputs a detection signal for identification of connection/disconnection of a cable, and the particular configuration of the same is not limited particularly.

A detection signal of the connection detection section 59 is supplied to the control section 51. More particularly, a detection signal regarding the power supply terminal section t-Vin and a detection signal regarding the video terminal section t-Video are supplied to the control section 51.

Further, as described hereinabove, the camera platform 10 includes a pan-tilt mechanism. More particularly, as the pan-tilt mechanism, the camera platform 10 includes a pan mechanism section 53, a pan motor 54, a tilt mechanism section 56 and a tilt motor 57 as shown in FIG. 9.

The pan mechanism section 53 is configured including a mechanism for providing a movement in the pan direction illustrated in FIG. 4, that is, in the horizontal direction or leftward or rightward direction to the digital still camera 1 attached to the camera platform 10. The movement of the mechanism is obtained by rotation of the pan motor 54 in the forward direction or the reverse direction.

Similarly, the tilt mechanism section 56 is configured including a mechanism for providing a movement in the tilt direction illustrated in FIGS. 5A and 5B, that is, in the vertical direction or upward or downward direction to the digital still camera 1 attached to the camera platform 10. The movement of the mechanism is obtained by rotation of the tilt motor 57 in the forward direction or the reverse direction.

The control section 51 is configured, for example, as a microcomputer formed from a combination of a CPU, a ROM, a RAM and so forth and controls the movement of the pan mechanism section 53 and the tilt mechanism section 56.

For example, when the control section 51 is to control the movement of the pan mechanism section 53, it outputs a signal indicative of a direction of the movement and a moving speed to the pan driving section 55. The pan driving section 55 generates a motor driving signal corresponding to the signal input thereto and outputs the motor driving signal to the pan motor 54. If the pan motor 54 is, for example, a stepping motor, then the motor driving signal is a pulse signal for PWM control.

In response to the motor driving signal, the pan motor 54 rotates, for example, at a demanded speed in a demanded direction. As a result, also the pan mechanism section 53 is driven to move at a corresponding speed in a corresponding direction.

Similarly, when the control section 51 is to control the movement of the tilt mechanism section 56, it outputs a signal indicative of a moving direction and a moving speed necessary for the tilt mechanism section 56 to a tilt driving section 58. The tilt driving section 58 generates and outputs a motor driving signal corresponding to the signal input thereto to the tilt motor 57. In response to the motor driving signal, the tilt motor 57 rotates, for example, at a demanded speed in a demanded direction, and consequently, also the tilt mechanism section 56 is driven to move at a corresponding speed in a corresponding speed.

The pan mechanism section 53 includes a rotary encoder or rotation detector 53a. The rotary encoder 53a outputs, in response to a rotational movement of the pan mechanism section 53, a detection signal representative of an angle of the rotation to the control section 51. Meanwhile, the tilt mechanism section 56 includes a rotary encoder 56a. Also the rotary encoder 56a outputs, in response to rotational movement of the tilt mechanism section 56, a detection signal representative of an angle of the rotation to the control section 51.

Consequently, the control section 51 can acquire or monitor information of the rotational angular amounts of the pan mechanism section 53 and the tilt mechanism section 56 being driven on the real time basis.

The communication section 52 executes communication with the camera platform responding communication section 34 in the digital still camera 1 attached to the camera platform 10 in accordance with a predetermined communication method.

The communication section 52 has a physical layer configuration for allowing transmission and reception of a communication signal with an opposite side communication section by wireless or wired communication and a configuration for implementing a communication process corresponding to a predetermined layer which is an upper layer with respect to the physical layer similarly to the camera platform responding communication section 34. As the physical layer configuration, the connector 14 of the camera pedestal portion 12 in FIG. 2 is included.

An operation section 60 includes an operation element as the menu button 60a shown in FIG. 4 or 6, and an operation information signal outputting block for generating an operation information signal corresponding to an operation carried out for the operation element and outputting the operation information signal to the control section 51. The control section 51 executes a predetermined process in response to the operation information signal input thereto from the operation section 60.

It is to be noted that, while it is described with reference to FIG. 7 that the camera platform 10 may include a touch sensor, also the touch sensor is included in the operation section 60. In this instance, a detection signal of a touch operation by the touch sensor is supplied to the control section 51.

Further, where a remote controller is prepared for the camera platform 10, also a reception section for a command signal from the remote controller is included in the operation section 60.

The camera platform 10 may include a sound inputting section 62. The sound inputting section 62 is provided in order to detect an input of, for example, sound of a particular word or particular sound such as, for example, sound by clapping of hands as a trigger input to a request responding image pickup mode hereinafter described.

The sound inputting section 62 includes a sound signal processing circuit including a microphone and a microphone amplifier, a sound analysis section for deciding particular sound and so forth. It is to be noted that the sound analysis may otherwise be executed by the control section 51.

Further, the sound inputting section 62 may be provided on the camera platform 10 side so as to be ready for a case in which an input of voice of a particular word or particular sound is decided as a decision of a release timing for the digital still camera 1.

Further, the camera platform 10 may include an image pickup section 63. The image pickup section 63 is provided in order to detect a particular state of an image pickup object such as, for example, a particular pause or the eyes of a user on the image pickup object side as a trigger input to a request responding image pickup mode.

The image pickup section 63 includes an optical system section, an image sensor, an A/D converter, a signal processing section, an image analysis section and so forth. It is to be noted that the image analysis may otherwise be executed by the control section 51.

Further, where a particular image pickup object state is decided for a decision of a release timing in the digital still camera 1, the image pickup section 63 may be provided on the camera platform 10 side.

Further, the camera platform 10 may include a release prediction execution section 64. The release prediction execution section 64 executes a release prediction operation hereinafter described.

The release prediction execution section 64 may be any apparatus section only if it can present to the user by an indication or sound that still picture image pickup will be carried out.

For example, the release prediction execution section 64 may be configured as a light emission operation section including a light emitting element such as an LED and a light emission driving circuit for the light emitting element in order to carry out prediction, for example, with a predetermined light emission pattern or in a predetermined light emission period.

Or, the release prediction execution section 64 may be a display section which is provided as a liquid crystal display section or the like provided on the front face side of the housing of the digital still camera 1 and carries out prediction through particular character display, color display, pattern display or the like.

Or else, the release prediction execution section 64 may be formed as a sound outputting section which carries out prediction through electronic sound, beep sound, message voice or the like and includes a sound signal generation section, an amplifier, a speaker and so forth.

Or else, the release prediction execution section 64 may be formed as a suitable combination of the sections described.

It is to be noted that the release prediction operation may be predetermined operation of a combination of pan and tilt movements. In this instance, the pan mechanism section 53 and the tilt mechanism section 56 carry out actual operation as the release prediction execution section 64.

2. Example of the Functional Configuration

Now, an example of a functional configuration implemented by hardware and software (program) regarding the digital still camera 1 and the camera platform 10 which configure the image pickup system is described.

Figure 10:
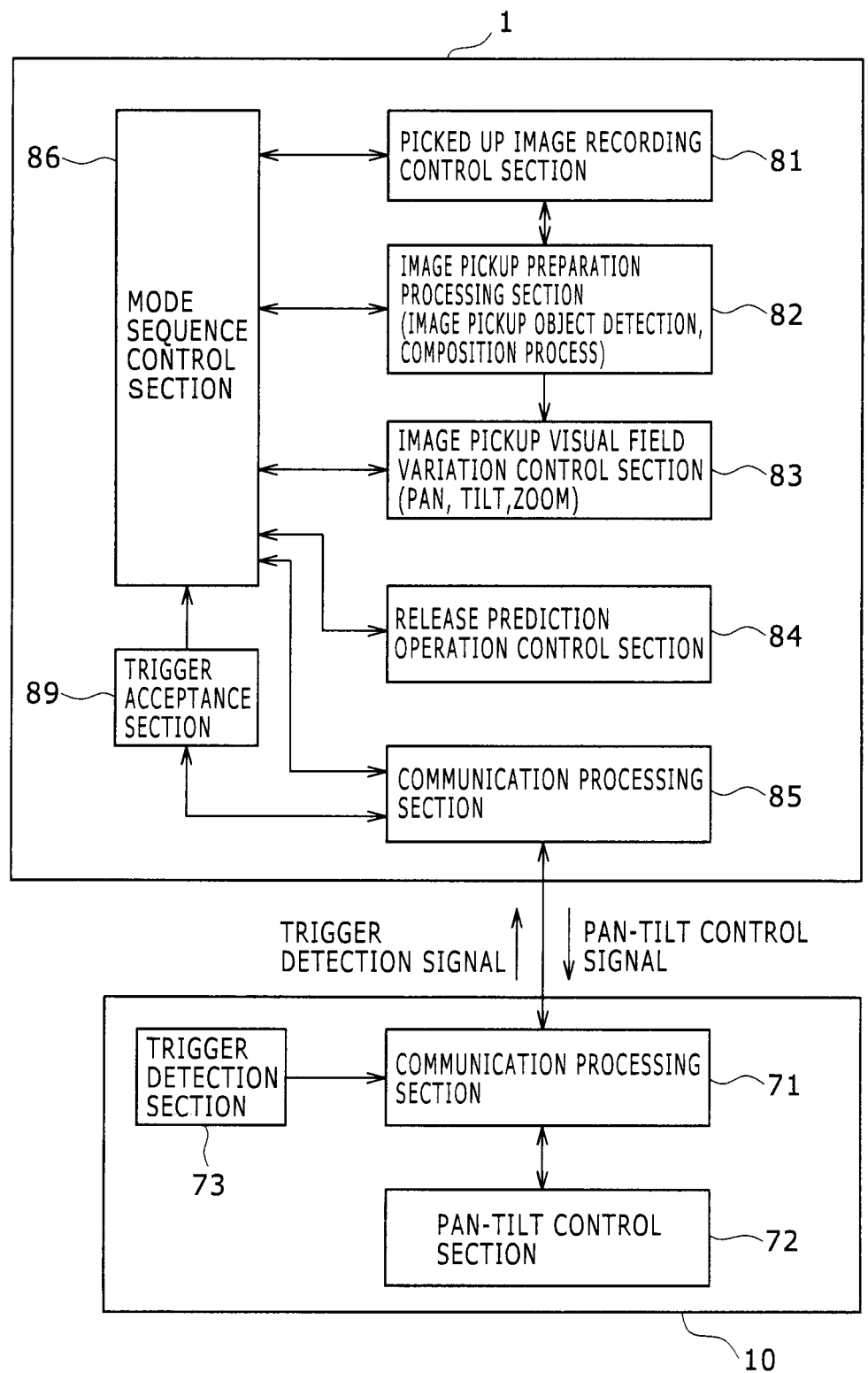
FIG. 10 is a block diagram showing a configuration of control functions of the digital still camera and the camera platform.

The present functional configuration example is configured so as to implement an image pickup control apparatus for carrying out image pickup operation control of the image pickup system. The functional configuration example includes hardware configurations principally including the control section 27 of the digital still camera 1, the control section 51 of the camera platform 10 and so forth, and controlling processing functions formed by association of software modules started by the hardware configurations. In FIG. 10, control functions necessary for processing in an automatic image pickup mode and a request responding image pickup mode hereinafter described are individually shown as blocks.

Figure 31:
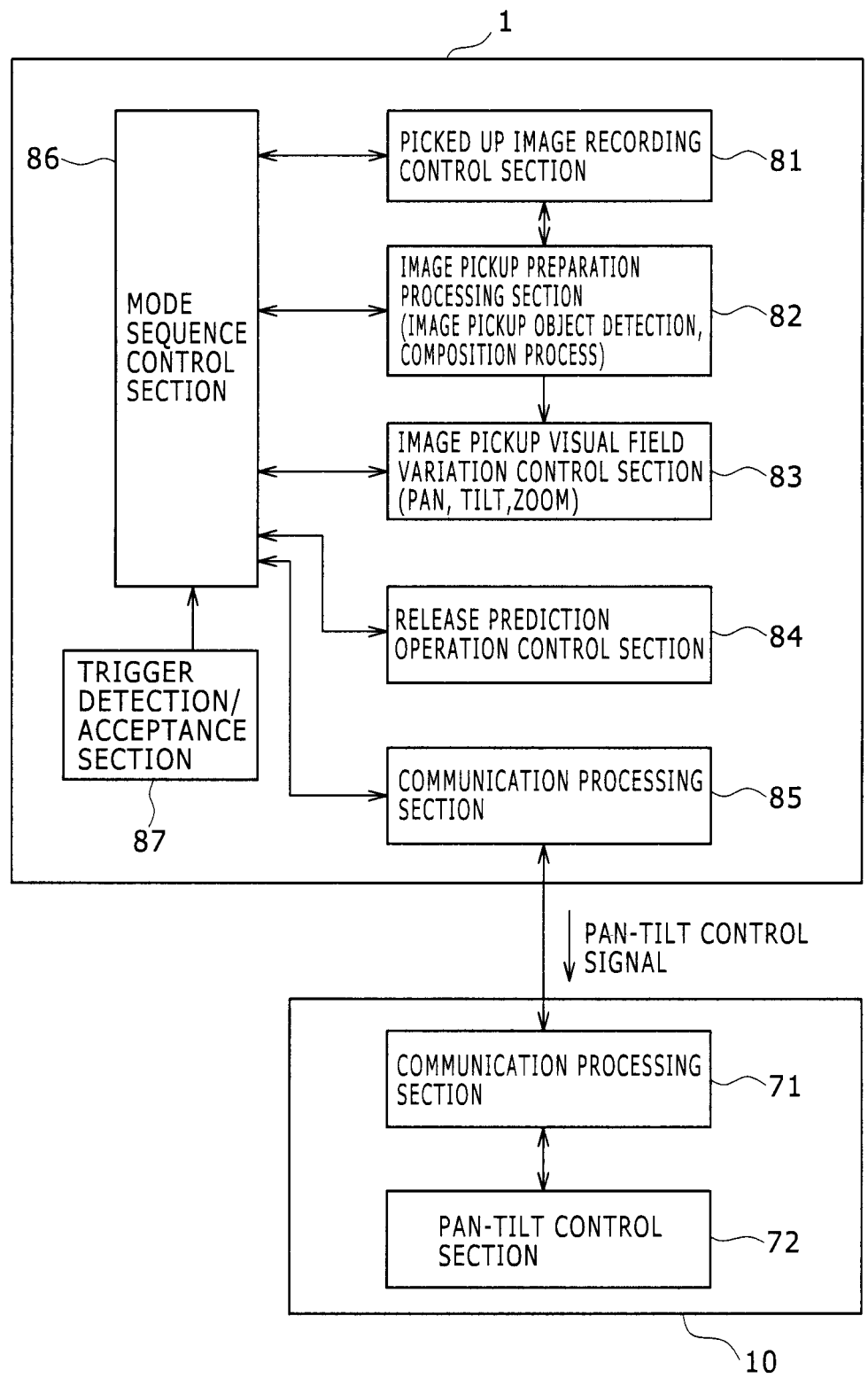
FIGS. 31 to 34 are block diagrams showing different configurations of control functions of the digital still camera and the camera platform.

It is to be noted that, while various functional configuration examples may be possible, FIG. 10 shows one of such functional configuration examples and some other examples are shown in FIG. 31 and so forth.

Referring to FIG. 10, the digital still camera 1, particularly the control section 27, includes an picked up image recording control section 81, an image pickup preparation processing section 82, an image pickup visual field variation control section 83, a release prediction operation control section 84, a communication processing section 85, a mode sequence control section 86 and a trigger acceptance section 89.

Meanwhile, the camera platform 10, particularly the control section 51, includes, for example, a communication processing section 71, a pan-tilt control section 72 and a trigger detection section 73.

First, on the digital still camera 1 side, the picked up image recording control section 81 acquires an image obtained by image pickup as data of an image signal, that is, as picked up image data, and executes a control process for storing the picked up image data into a recording medium. The picked up image recording control section 81 carries out control also for reproduction or displaying operation of the recorded still picture data, for displaying operation of a through-picture upon image pickup and so forth.

The picked up image recording control section 81 carries out control of the optical system section 21, image sensor 22, A/D converter 23, signal processing section 24, encoding/decoding section 25, medium controller 26, display driver 32 and so forth of FIG. 8. In other words, the picked up image recording control section 81 controls basic operation of the digital still camera 1 by issuing instructions for lens driving control of the optical system section 21, image pickup operation of the image sensor 22, image signal processing, recording and reproduction processing and so forth so that still picture image pickup and so forth are executed.

The image pickup preparation processing section 82 carries out an image pickup preparation process in the automatic image pickup mode and the request responding image pickup mode, that is, when image pickup of a still picture which does not rely upon a release operation of a user is to be executed.

The image pickup preparation process includes an image pickup object detection process. In the image pickup object detection process, while the camera platform 10 executes pan and tilt movements, frame images obtained by the signal processing section 24 are successively confirmed and processed so that an image pickup object such as, for example, the face of a person may be included in the image pickup visual field. To this end, the image pickup preparation processing section 82 carries out such processes as decision of necessary pan and tilt movements of the camera platform 10, person detection by image analysis of frame image data, face detection and so forth.

The image pickup preparation process further includes a composition process. In the composition process, it is decided whether or not the arrangement of an image pickup object image in the image pickup visual field is in an optimum state (composition decision), and then the composition is adjusted (composition adjustment). For this adjustment of the composition, the image pickup preparation processing section 82 carries out decision of necessary panning and tilt movements of the camera platform 10, decision of zoom lens driving of the optical system section 21 and so forth.

It is to be noted that the processing function of carrying out image analysis for the image pickup object detection process and the composition process may be executed not by the control section 27 but by a DSP (Digital Signal Processor) serving as the signal processing section 24. Accordingly, the processing section as the image pickup preparation processing section 82 can be implemented by a program and instructions to be provided to one or both of the control section 27 and the DSP as the signal processing section 24.

The image pickup visual field variation control section 83 controls operation of actually varying the image pickup visual field. The variation of the image pickup visual field is carried out by pan-tilt movements of the camera platform 10 or by zoom operation of the optical system section 21. Accordingly, the image pickup visual field variation control section 83 is a functional block of carrying out pan-tilt control and/or zoom control.

Where a cameraman uses the digital still camera 1 to manually carry out image pickup, the image pickup visual field variation control section 83 controls zoom lens driving, for example, in response to a zoom operation of the cameraman.

On the other hand, in the automatic image pickup mode or the request responding image pickup mode hereinafter described, the image pickup visual field variation control section 83 carries out zoom driving control, pan driving control and tilt driving control in response to a decision or instruction of the image pickup preparation processing section 82. For the pan driving control and the tilt driving control, the image pickup visual field variation control section 83 transmits a pan-tilt control signal to the camera platform 10 side through the communication processing section 85.

Particularly upon execution of composition adjustment or the like, the image pickup visual field variation control section 83 outputs, in response to pan-tilt movement amounts decided by the image pickup preparation processing section 82, a pan-tilt control signal instructive of the movement amounts to the camera platform 10.

Further, the image pickup visual field variation control section 83 drives and controls the zoom movement of the optical system section 21 in response to a zoom magnification decided by the image pickup preparation processing section 82.

The release prediction operation control section 84 controls execution action of release prediction hereinafter described.

As described hereinabove, for example, with reference to FIGS. 8 and 9, the release prediction execution section 36 or 64 is sometimes provided in one or both of the digital still camera 1 and the camera platform 10. The release prediction operation control section 84 carries out control of causing the release prediction execution section 36 or 64 to carry out sound outputting, light emission outputting and displaying outputting.

Where the release prediction action is executed by a behavior of the digital still camera 1, a pan-tilt control signal is supplied to the camera platform 10 side in order to implement the behavior.

The communication processing section 85 executes communication in accordance with a predetermined communication protocol with the communication processing section 71 provided on the camera platform 10 side.

The pan-tilt control signal generated by the image pickup visual field variation control section 83 is transmitted to the communication processing section 71 of the camera platform 10 by communication of the communication processing section 85.

The mode sequence control section 86 controls, where automatic still picture image pickup which does not originate from a release operation of the user is carried out in the automatic image pickup mode and the request responding image pickup mode, the sequence of the mode actions.

In particular, in each of the automatic image pickup mode and the request responding image pickup mode, control processes by the picked up image recording control section 81, image pickup preparation processing section 82, image pickup visual field variation control section 83 and release prediction operation control section 84 are executed suitably in a predetermined procedure to implement the still picture image pickup action in the modes.

The mode sequence control section 86 includes a function as a "request responding image pickup control section."

The trigger acceptance section 89 recognizes a trigger input detected, for example, by the trigger detection section 73 on the camera platform 10 side through communication by the communication processing sections 71 and 85 and accepts the trigger input as a changeover input from the automatic image pickup mode to the request responding image pickup mode. The trigger acceptance section 89 notifies the mode sequence control section 86 of the trigger acceptance. It is to be noted that the function of the trigger acceptance section 89 may be regarded as a function of the mode sequence control section 86.

Further, on the camera platform 10 side, the communication processing section 71 executes communication with the communication processing section 85 on the digital still camera 1 side.

Where the pan-tilt control signal described hereinabove is received, the communication processing section 71 outputs the pan-tilt control signal to the pan-tilt control section 72.

The pan-tilt control section 72 executes processing regarding pan-tilt control from among the control processes executed by the control section 51 on the camera platform 10 side, for example, shown in FIG. 9.

The pan-tilt control section 72 controls the pan driving section 55 and the tilt driving section 58 shown in FIG. 9 in accordance with the pan-tile control signal input thereto. Consequently, pan and tilt movements, for example, for an image pickup object detection process or panning, tilting and so forth for obtaining an optimum horizontal view angle and an optimum vertical view angle by the composition process are carried out.

The trigger detection section 73 detects a trigger input for changing over from the automatic image pickup mode to the request responding image pickup mode.

As an example, if the trigger input is a touching operation with the touch region 60b provided on the camera platform 10 as shown in FIG. 7, then the trigger detection section 73 detects an input to the touch sensor.

Further, where a trigger input from the sound inputting section 62 and/or the image pickup section 63 of FIG. 9 is detected in addition to a touch input, the trigger detection section 73 carries out a process of supervising and detecting such trigger inputs.

If a trigger input is detected, then the trigger detection section 73 transmits a trigger detection signal from the communication processing section 71 to the mode sequence control section 86 of the digital still camera 1.

3. Automatic Image Pickup Process

Before an operation sequence is described, an image pickup process in the automatic image pickup mode is described with reference to FIG. 11A.

In the automatic image pickup mode, the image pickup system carries out automatic composition adjustment operation in which a composition decided to be optimum in response to a mode of an image pickup object detected by image pickup object detection by the operations of image pickup object detection or search, optimum composition decision and composition adjustment is set as a target composition. Then, release processing is automatically carried out at the predetermined condition. This makes operation of cameraman unnecessary, and appropriate still image pickup is carried out.

FIG. 11A illustrates a procedure of predetermined processes carried out by the functional blocks in accordance with instructions of the mode sequence control section 86 of FIG. 10 as automatic image pickup mode operation.

After image pickup operation in the automatic image pickup mode is started, fetching of picked up image data is started at step F1 of FIG. 11A.

In particular, the picked up image recording control section 81 controls the image sensor 22 and the signal processing section 24 to start fetching of picked up image data for each frame.

An image pickup object detection process is carried out at step F2, and a composition process is carried out at step F3.

The image pickup object detection process and the composition process which includes optimum composition decision and composition adjustment are carried out by functions of the image pickup preparation processing section 82, particularly by processing of the control section 27 and/or the signal processing section 24.

After the fetching of picked up image data is started at step F1, the signal processing section 24 successively acquires frame image data corresponding to one still picture as picked up image data by the image sensor 22.

The image pickup preparation processing section 82 carries out, as the image pickup object detection process, processing of detecting an image portion corresponding to the face of a person from within the frame image data of each frame.

It is to be noted that the image pickup object detection process may be executed for all frames or frames at a predetermined number of frame intervals.

In the image pickup object detection process in the present example, for example, a face detection technique is utilized to set, for each image pickup object detected from within an image, a face range corresponding to the region of the image portion of the face of the image pickup object. Then, from information of the number, size, position and so forth of such face regions, information of the number of image pickup objects in the frame range, the size of each image pickup object, and the position of each image pickup object in the respective picture range is obtained.

It is to be noted that, although several techniques for detection of the face are known, which one of the detection techniques should be adopted is not limited particularly, but a suitable technique may be adopted taking the detection accuracy, the degree of difficulty in design and so forth into consideration.

As the image pickup object detection process at step F2, search for image pickup objects existing around the digital still camera 1 is carried out first.

In particular, the search for image pickup objects is carried out such that, while the control section 27 of the digital still camera 1, particularly the image pickup preparation processing section 82 and the image pickup visual field variation control section 83, carry out pan-tilt control for the camera platform 10 and zoom control for the optical system section 21 to vary the image pickup visual field, image pickup object detection by image analysis is executed, for example, by the signal processing section 24 or the control section 27.

Such image pickup object search is executed until after an image pickup object is detected in a frame image as picked up image data. Then, when the situation, in which the image pickup object (face) is present in the frame image, that is, in the image pickup visual field at the point of time, is obtained, image pickup object search is ended.

After the image pickup object detection process comes to an end, the control section 27, particularly the image pickup preparation processing section 82, carries out a composition process at step F3.

In particular, in the composition process, it is decided whether or not the composition at the point of time is in an optimum state. In this instance, decision of a picture structure, in this instance, decision of the number of image pickup objects in the picture range, the size of the image pickup objects and the position of the image pickup objects, based on a result of the image pickup object detection is carried out first. Then, based on the information of the picture structure decided by the picture structure decision, a composition estimated to be optimum is decided in accordance with a predetermined algorithm.

Here, the compositions in this instance are determined by the individual image pickup visual fields in pan, tilt and zoom operations. Accordingly, depending upon a decision process regarding whether or not the composition is optimum, information of control amounts for pan, tilt and zoom operations for obtaining an optimum image pickup visual field in response to the image pickup detection result, that is, to the mode of an image pickup object in the picture range, is obtained as a decision result of the decision process.

Then, if the composition is not in an optimum state, then pan-tilt control and zoom control are carried out in order to obtain an optimum composition state.

In particular, the control section 27, particularly the image pickup preparation processing section 82 and the image pickup visual field variation control section 83, issue an instruction for variation of the pan-tilt control amounts determined by the optimum composition decision process to the control section 51 of the camera platform 10 side as composition adjustment control.

In response to the instruction, the control section 51 of the camera platform 10 calculates movement amounts regarding the pan mechanism section 53 and the tilt mechanism section 56 in accordance with the instruction control amounts and supplies control signals to the pan driving section 55 and the tilt driving section 58 so that pan driving and tilt driving of the calculated movement amounts may be carried out.

Further, the control section 27, particularly the image pickup preparation processing section 82 and the image pickup visual field variation control section 83, issue an instruction of information of the view angle regarding zoom operation calculated by the optimum composition decision process to the optical system section 21 so that zoom operation by the optical system section 21 is executed to obtain the instruction view angle.

It is to be noted that, if it is decided by the composition process that the composition is not an optimum composition and pan-tilt and zoom control is carried out as the composition adjustment, then the processing returns from step F3 to step F2 so that the image pickup detection process is carried out again. This is because an image pickup object may move out of the image pickup visual field by the pan, tilt or zoom operation or by a motion of the person.

If an optimum composition is obtained, then the control section 27, particularly the mode sequence control section 86, carries out a release timing decision process at step F4.

For example, a release operation may be carried out setting it as a condition that an image pickup object enters a predetermined state such as a smiling state.

It is to be noted that, although the release timing may not be decided OK by the release timing decision process at step F4, in this instance, the processing is carried out again beginning with the image pickup object detection at step F1. This is because an image pickup object may move out of the image pickup visual field or the composition may lose its shape as a result a motion of an image pickup object person or the like.

If it is decided by the release timing decision process that the release condition is satisfied, then automatic recording of the picked up image data is carried out as a release process at step F5. In particular, the control section 27, particularly the picked up image recording control section 81, carries out control of the encoding/decoding section 25 and the medium controller 26 to execute recording of the picked up image data or frame image obtained at the point of time into the memory card 40.

In the image pickup system described above, still picture image pickup in the automatic image pickup mode is implemented in such a manner as described above with reference to FIG. 11A based on the control and processing by the control section 27.

It is to be noted that processing illustrated in FIG. 11B is hereinafter described as a fourth embodiment of the present invention.

4. Image Pickup Operation of the First Embodiment

Operation of a first embodiment of the present invention implemented based on the configuration of the digital still camera 1 and the camera platform 10 described hereinabove with reference to FIGS. 8 and 9 and the functional configurations described hereinabove with reference to FIG. 10 is described with reference to FIG. 12.

Figure 12:
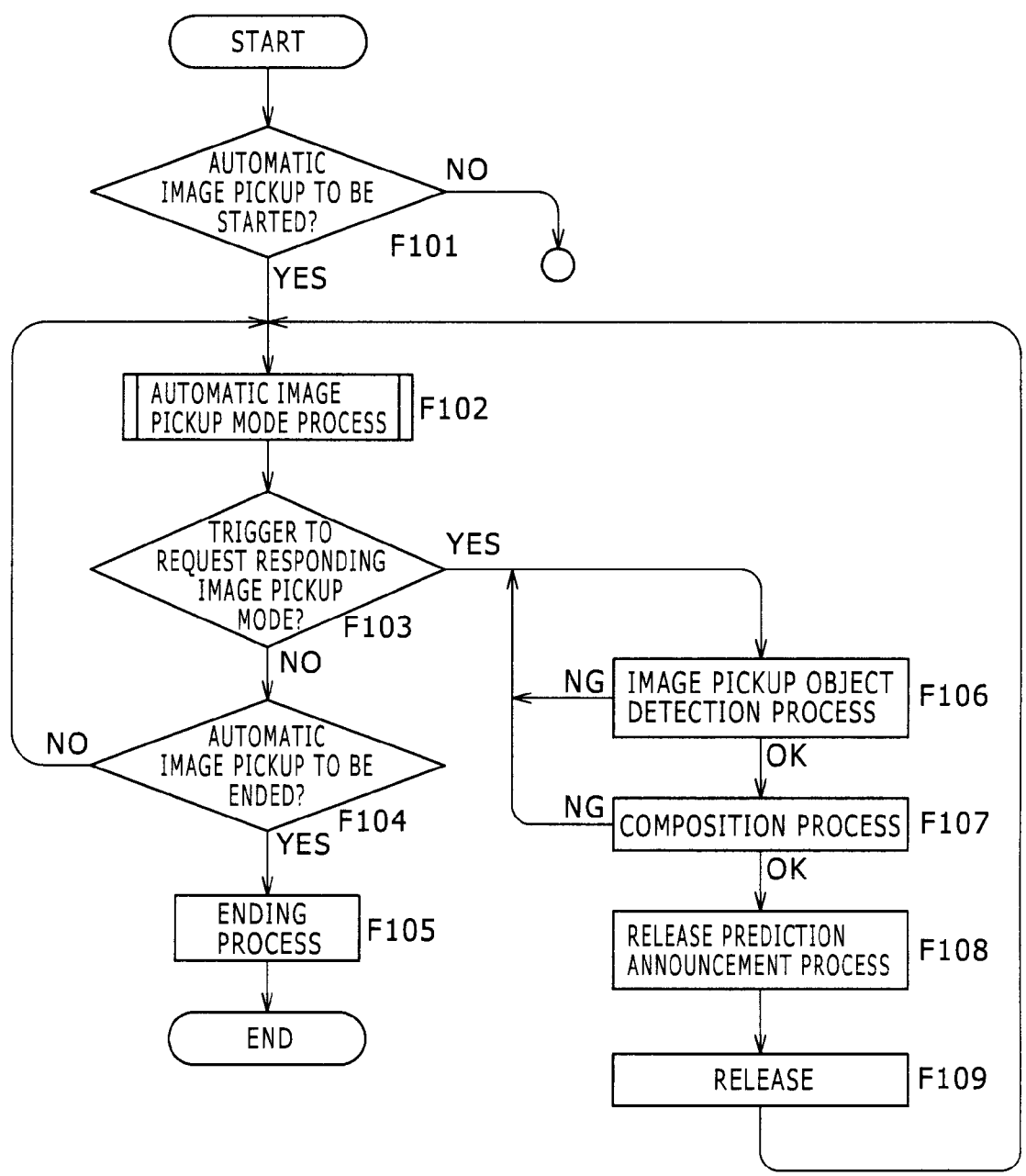
FIG. 12 is a flow chart illustrating an image pickup control process according to a first embodiment of the present invention.

It is to be noted that, where the functional configuration of FIG. 10 is presupposed, the processing of FIG. 12 can be considered as processing of the control section 27 of the digital still camera 1.

If an automatic image pickup instruction is generated by an operation by the user such as, for example, a power supply turn-on operation or an operation for an operation menu screen image on the display section 33, then operation of the present system in the automatic image pickup mode is started.

In response to such a starting operation of the automatic image pickup mode by the user, the control section 27, particularly the mode sequence control section 86, advances its processing from step F101 to step F102 in FIG. 12 to start processing of the automatic image pickup mode.

The control section 27, particularly the mode sequence control section 86, carries out the processing described hereinabove with reference to FIG. 11A so that automatic still picture image pickup is executed.

As a behavior of the image pickup system which actually looks to the user, the digital still camera 1 is driven by the camera platform 10 to automatically carry out pan-tilt operations and a zoom operation to search for an image pickup object, and still picture image pickup is carried out at an arbitrary point of time. In other words, it looks that, while no cameraman exists, the image pickup system uses its own initiative to determine an image pickup object and carry out still picture image pickup.

In this instance, since no cameraman exists, still picture image pickup in a natural atmosphere in which the user is not conscious of image pickup is likely to be carried out.

Here, within a period within which the control section 27, particularly the mode sequence control section 86, continues to execute the process in the automatic image pickup mode at step F102, it supervises the trigger input to the request responding image pickup mode at step F103.

Though not shown in FIG. 11A, whether or not there is a trigger input is confirmed within the period from stop F2 to step F4 of FIG. 11A.

In the present first embodiment, it is assumed that the touch region 60*b* is formed on the camera platform 10 as shown in FIG. 7A and a touching operation of the user with the touch region 60*b* is used as a trigger input to the request responding image pickup mode.

Further, if a trigger input is not detected particularly, then the still picture image pickup in the automatic image pickup mode at step F102 is continued until it is decided at step F104 that the automatic image pickup is to be ended. Within the period from step F2 to step F4 of FIG. 11A, also an ending operation of the user is supervised in addition to the confirmation of whether or not a trigger input exists.

If the user carries out a predetermined operation to input an automatic image pickup ending instruction, then the control section 27, particularly the mode sequence control section 86, advances the processing in FIG. 12 from step F104 to step F105, at which a predetermined ending process is carried out to end the series of operations.

If the user carries out a touching operation with the touch region 60*b* of the camera platform 10 in the automatic image pickup mode, then the control section 51, particularly the trigger detection section 73, in the camera platform 10 detects the touching operation and transmits a trigger detection signal to the control section 27, particularly to the trigger acceptance section 89 and the mode sequence control section 86.

Consequently, when the control section 27, particularly the mode sequence control section 86, recognizes that a trigger input is received and accepts the trigger input, it advances its processing of FIG. 12 from step F103 to step F106, at which it carries out operation control in the request responding image pickup mode.

At steps F106 to F109, processes in the request responding image pickup mode are carried out.

In particular, at step F106, the control section 27, particularly the image pickup preparation processing section 82 and the image pickup visual field variation control section 83, carry out the image pickup object detection process.

Then at step F107, the control section 27, particularly the image pickup preparation processing section 82 and the image pickup visual field variation control section 83, carry out the composition process.

The image pickup object detection process and the composition process determine an image pickup visual field in accordance with an image pickup request.

As an example, the image pickup object detection process at step F106 and the composition process at step F107 may be carried out in accordance with an algorism same as that used in the image pickup object detection process at step F2 and the composition process at step F3 of FIG. 11A in the automatic image pickup mode.

Here, the request responding image pickup mode is a mode in which still picture image pickup is carried out in accordance with a request of a user. Accordingly, to this end, it is necessary to grasp a user who issues an image pickup request, that is, a touching operation, as an image pickup object. This is considered to be a process of determining the image pickup visual field in accordance with an image pickup request.

Where the touch region 60*b* is set to the front face side of the main body portion 11 of the camera platform 10 as shown in FIG. 7A, it is considered that a user from which an image pickup request is issued by a touching operation is on the front face side of the image pickup system.

Accordingly, if the algorithm for image pickup object detection defines that the initial position is given by a pan state in the front face direction, that is, at the pan reference position in FIG. 4, and by the tilt reference position of FIGS. 5A and 5B, then if the image pickup object detection and composition processes are carried out in this state, then it is considered that, in almost all cases, the user can be caught in the image pickup visual field. From this, the image pickup object detection process at step F106 and the composition process at step F107 should be started in the initial state in accordance with an algorithm similar to that used in the automatic image pickup mode.

However, in order to carry out effective still picture image pickup in the request responding image pickup mode, it is sometimes appropriate to carry out the image pickup object detection and composition processes in accordance with an algorithm different from that used in the automatic image pickup mode. Various such examples are hereinafter described as modifications.

If an optimum composition is obtained by the processes at steps F106 and F107, then the control section 27, particularly the release prediction operation control section 84, carries out a release prediction process at step F108.

Where the release prediction execution section 36 is provided on the digital still camera 1 side as described hereinabove with reference to FIG. 8, the control section 27, particularly the release prediction operation control section 84, controls the release prediction execution section 36 to execute predetermined operation.

For example, the release prediction execution section 36 is controlled to execute LED flickering indication, cause the LED to emit light in a predetermined flickering period or in a predetermined flickering pattern, generate electronic sound or generate message sound such as "say 'cheese'."

Further, where a release prediction is to be represented by a behavior by pan-tilt movements such as, for example, such a behavior that the digital still camera 1 trembles or nods, the release prediction operation control section 84 instructs the image pickup visual field variation control section 83 to transmit a pan-tilt control signal for implementing such a behavior as described above to the camera platform 10 side.

Naturally, such operations as described above may be suitably combined to carry out a release prediction.

Based on the release prediction, the user can take a pose or make a look before the predicted release timing.

Then, after the release prediction, the control section 27, particularly the picked up image recording control section 81, carries out a release process and records still picture data into the memory card 40 at step F109.

Here, it is a possible idea to cause the control section 27, particularly the picked up image recording control section 81, to carry out, when a predetermined still picture image pickup condition is satisfied after execution of a release prediction operation or after starting of such execution, a release process to carry out a still picture image pickup operation.

For example, it is supposed that, when a particular sound input is received, when a particular image pickup object state is decided from a picked up image, when a predetermined period of time elapses after execution of a release prediction operation or after starting of such execution, or in some other case, it is decided that the still picture image pickup condition is satisfied.

As such a particular sound input as mentioned above, for example, a particular word uttered from the user, sound by clapping of hands, sound of a whistle or the like may be detected.

As a particular image pickup object state, a particular expression such as a smile of an image pickup object caught by the composition process, a particular gesture such as, for example, waving of a hand toward the image pickup system, raising of a hand, clapping of hands or a behavior such as making of a V-sign or winking or steady gazing at the image pickup system may be detected.

The lapse of a predetermined period of time may be, for example, lapse of a predetermined period of time such as, for example, several seconds after execution of the release prediction operation or from a point of time of starting of the execution.

The control section 27, particularly the mode sequence control section 86, may carry out a necessary detection process under such still picture image pickup conditions as described above and, when the still picture image pickup conditions are satisfied, carry out the release process, that is, recording of a still picture, under the control of the picked up image recording control section 81.

The control section 27, particularly the mode sequence control section 86, advances, after the still picture image pickup, the processing to step F102, at which it ends the request responding image pickup mode and then carries out processes as the automatic image pickup mode again.

Where the process of FIG. 12 is executed, when still picture image pickup is carried out in the automatic image pickup mode, the user may carry out a touching operation when it is intended to pick up an image of the user itself. Consequently, the operation in the request responding image pickup mode is carried out, and still picture image pickup is carried out in accordance with a request of the user. Since also a release prediction is carried out at this time, the user can pick up an image of the user itself in an expression, eyes, form and so forth in which the user wants to be imaged.

In short, with the present embodiment, by image pickup in the automatic image pickup mode, an image can be picked up in a natural expression, form, scene and so forth, and by image pickup in the request responding image pickup mode, an image complying with a desire of the user can be picked up. In other words, a still picture image intended by the user or a commemorative picture can be picked up.

Consequently, as automatic image pickup which does not demand a cameraman, a variety of still picture image pickup equivalent to that where image pickup is carried out by a cameraman can be carried out.

5. Modifications to the First Embodiment 5-1. Trigger to the Request Responding Image Pickup Mode In the following, several modifications to the first embodiment described are described. First, a trigger input to the request responding image pickup mode is described.

In the description given hereinabove, an example wherein a touching operation of the user with the camera platform 10 is recognized as a trigger operation is described. As regards the touching operation, a touch region may be provided on the housing of the digital still camera 1 such that, when the user touches the touch region of the digital still camera 1, the image pickup system recognizes this as a trigger operation. A functional configuration in this instance is hereinafter described with reference to FIG. 31.

Meanwhile, as regards an operation of the user for a trigger input, an operation button may be provided on the camera platform 10 or the digital still camera 1 such that an operation of the operation button is used as a trigger input.

Further, a configuration may be used wherein the user carries out a trigger operation through an operation of a remote controller of the wireless type which utilizes an infrared ray or an electromagnetic wave or of the wired type.

Meanwhile, the trigger detection section 73 may detect a particular sound input as a trigger input. For example, the sound inputting section 62 may be provided in the camera platform 10 as described hereinabove with reference to FIG. 9 such that a particular sound input is recognized by the control section 51, particularly by the trigger detection section 73.

The particular sound input may be a certain word or words such as, for example, words "take a photo of me!" uttered by the user, sound by clapping of hands or the like.

The sound inputting section 35 or the trigger detection section 73 carries out an analysis process of the input sound signal to decide whether or not the particular sound input is received. Then, if the particular sound input is found, then the sound inputting section 35 or the trigger detection section 73 recognizes that a trigger input is received.

For example, in response to detection of such various triggers as described above, the control section 27 on the digital still camera 1 side can control the trigger acceptance section 89 to accept the trigger to the request responding image pickup mode.

It is to be noted that, also where the control section 27 on the digital still camera 1 side includes a function as a trigger detection section in addition to the trigger acceptance section 89, since the sound inputting section 35 described hereinabove with reference to FIG. 8 is provided, detection of a trigger input by such a particular sound input as described above and acceptance of the trigger input as a trigger to the request responding image pickup mode can be carried out.

The trigger detection section 73 may possibly detect that a trigger input is received if a particular image pickup object state is decided from within a picked up image.

For example, the image pickup section 63 is provided in the camera platform 10 as described hereinabove with reference to FIG. 9, and the control section 51, particularly the trigger detection section 73, recognizes an image pickup object state detected from within a picked up image as a trigger input.

As the particular image pickup object state, a particular gesture such as, for example, waving of a hand toward the image pickup system, raising of a hand, clapping of hands or a behavior such as making of a V-sign or winking toward the image pickup system may be detected. Or the user may possibly gaze at the image pickup system.

The image pickup section 63 or the trigger detection section 73 carries out an image analysis process of a picked up image to decide a particular gesture of the user or the eyes of the user. Then, if a particular image pickup object state is detected, then the image pickup section 63 or the trigger detection section 73 recognizes that a trigger input is received.

It is to be noted that, where the control section 27 on the digital still camera 1 side includes a function as the trigger detection section in response to the trigger acceptance section 89, since a behavior, the eyes or the like as such a particular image pickup object state as described above can be recognized in the procedure of the image analysis, that is, the image pickup object detection process, by the signal processing section 24, detection of a trigger input based on the particular image pickup object state and acceptance of the trigger input as a trigger to the request responding image pickup mode can be carried out.

5-2. Pan-Tilt to the Requested Direction

Now, an example of the image pickup preparation process where the automatic image pickup mode is established is described.

Figure 13:
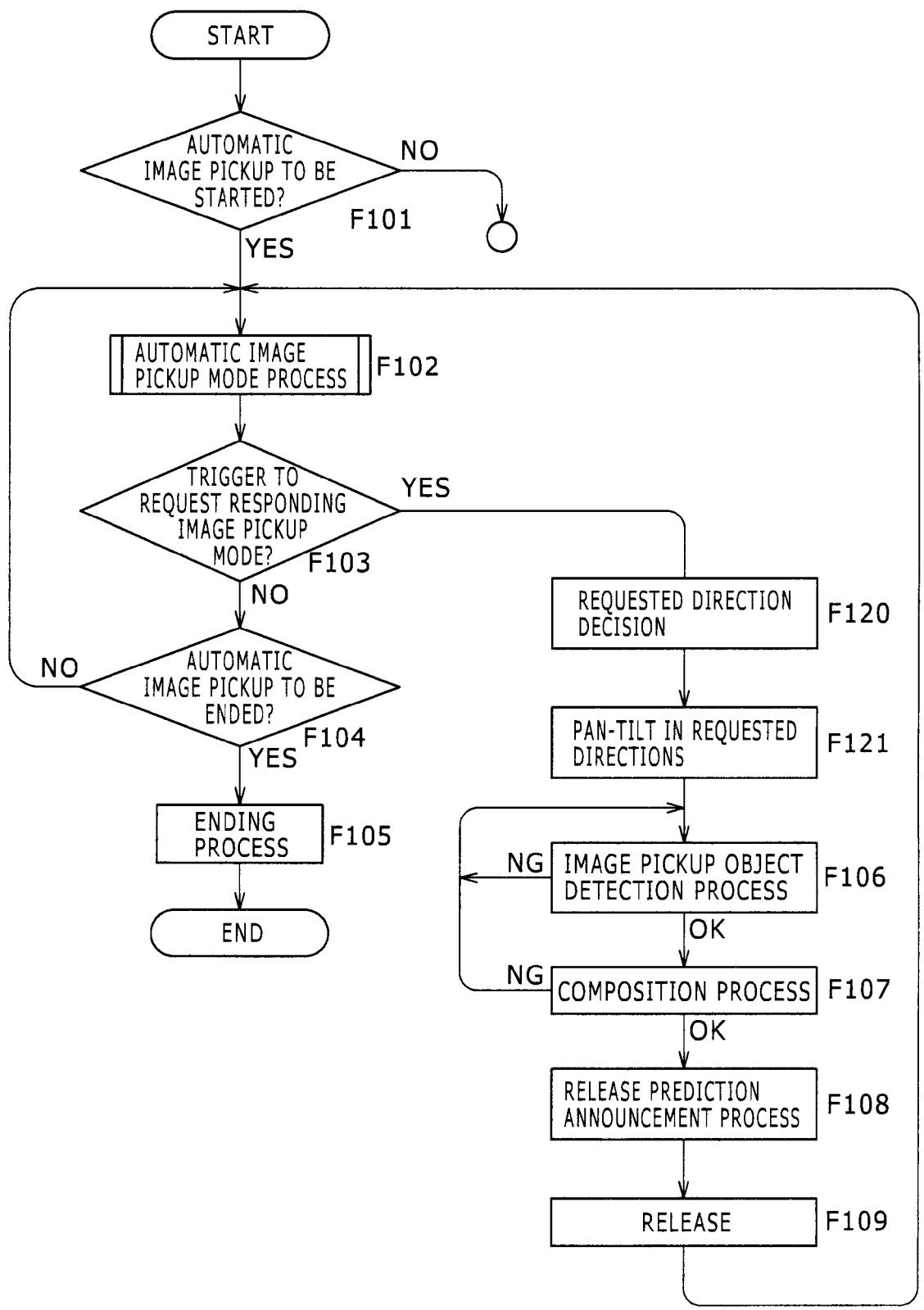
FIG. 13 is a flow chart illustrating a modification to the image pickup control process wherein pan-tilt operations in requested directions are carried out.

FIG. 13 illustrates an example of processing of the image pickup preparation process. The processing of FIG. 13 includes steps F101 to F109 similar to those of the processing of FIG. 12 described hereinabove, and overlapping description of the processes at the common steps is omitted herein to avoid redundancy.

Referring to FIG. 13, in the processing illustrated, when a trigger to the request responding image pickup mode is detected at step F103, processes at steps F120 and F121 are executed prior to starting of the image pickup object detection process at step F106.

In particular, at step F120, the control section 27 decides a requested direction. The requested direction is a direction to which a user who carries out trigger inputting exists with reference to the position of the image pickup system, that is, a direction of the trigger input.

At step F121, the control section 27 carries out pan-tilt control in the requested direction so that the image pickup direction of the digital still camera 1 may be directed to the requested direction.

A particular example is described.

For example, where a touching operation is used as a trigger input, a plurality of touch regions 60b to 60d are provided toward different directions as described hereinabove with reference to FIG. 7B.

When the control section 51, particularly the trigger detection section 73, of the camera platform 10 detects a touching operation, it transmits not only a trigger detection signal but also information regarding which one of the touch regions 60b to 60d the user touches, or information of the trigger input direction, to the control section 27, particularly to the trigger acceptance section 89 and the mode sequence control section 86, of the digital still camera 1. Consequently, the control section 27 carries out the requested direction decision at step F120.

If the trigger input direction is decided, then the control section 27, particularly the image pickup preparation processing section 82 and the image pickup visual field variation control section 83, output a pan-tilt control signal at step F121 so that the image pickup direction of the digital still camera 1 is directed toward the trigger input direction, that is, toward the requested direction. Consequently, pan-tilt operations are carried out on the camera platform 10 side and the digital still camera 1 is directed toward the direction in which the user exists.

In short, the image pickup preparation process is carried out such that the digital still camera 1 is first directed to the requested direction so as to satisfy the request of the user.

In this state, the control section 27, particularly the image pickup preparation processing section 82 and the image pickup visual field variation control section 83, carry out the image pickup object detection and composition processes at steps F106 and F107.

Consequently, the user which issues an image pickup request can be grasped readily and a still picture image intended by the user can be obtained readily.

Also where the trigger input is given as a sound input, such a process as described above is possible.

For example, the sound inputting section 35 or 62 includes a plurality of microphones such that the direction from which a particular sound input is issued is decided from a time difference between sound signals obtained from the different microphones.

The control section 27 decides the direction in which the user who issues the request exists from the sound input at step F120 so that the pan-tilt control in the requested direction at step F121 can be carried out.

As an actual behavior, the image pickup system reacts with a call of the user and turns to the user, and by the later processes at steps F106 to F109, still picture image pickup including the user is carried out.

Figure 14:
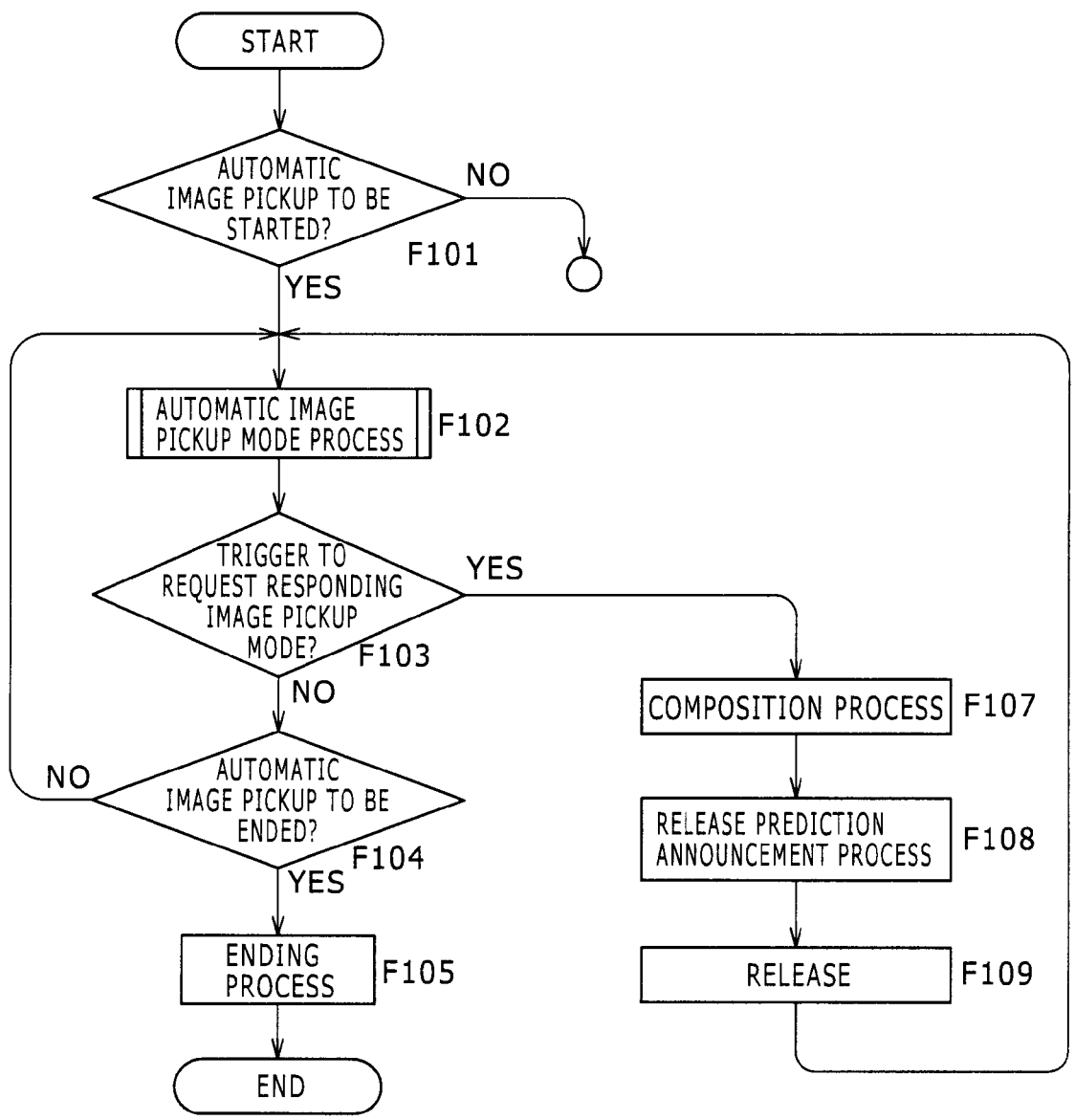
FIG. 14 is a flow chart illustrating another modification to the image pickup control process wherein image pickup object detection is not carried out.
Figure 15:
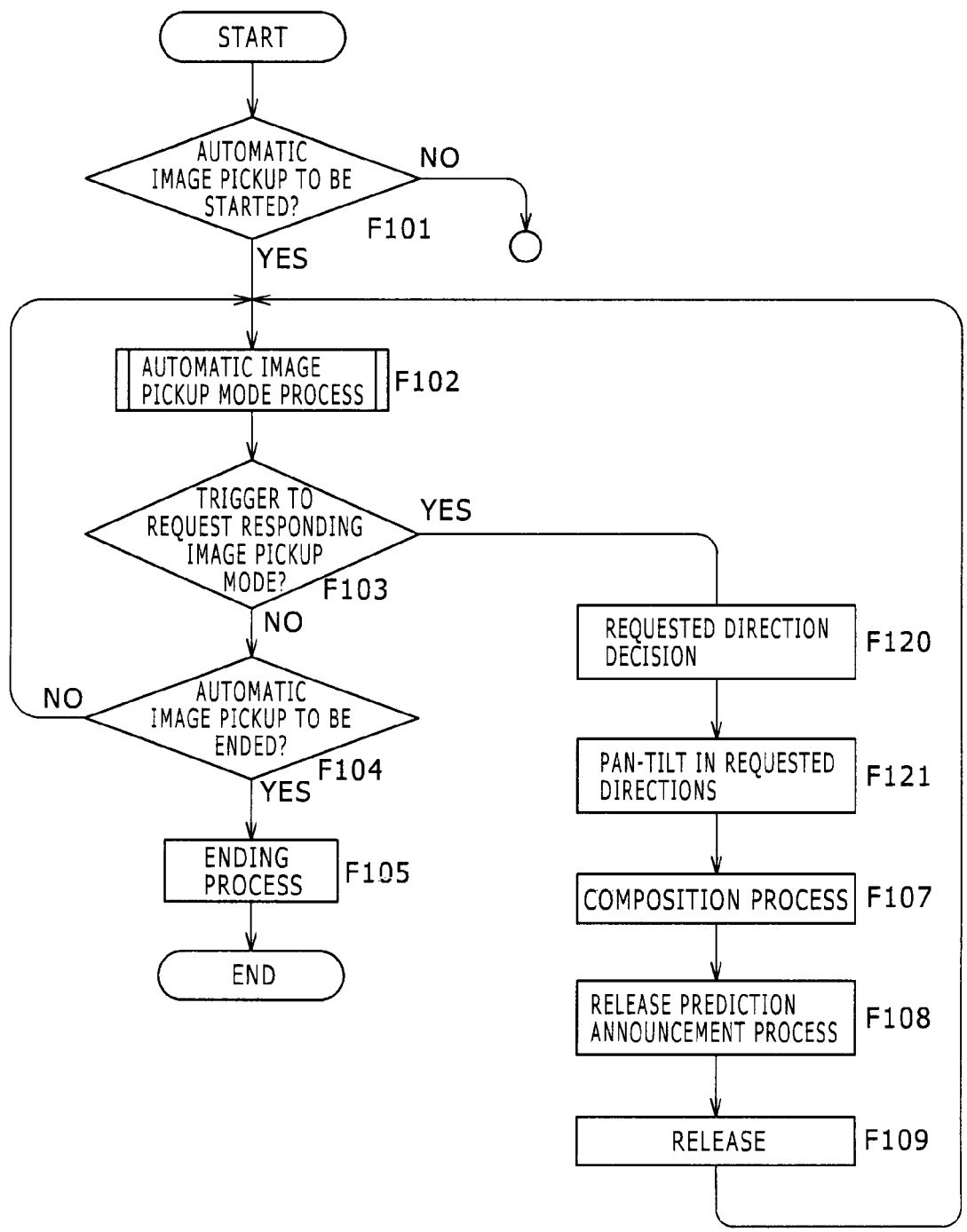
FIGS. 15 and 16 are flow charts illustrating further modifications to the image pickup control process wherein a composition process is not carried out.

5-3. Example Wherein Image Pickup Object Detection is Not Executed in the Request Responding Image Pickup Mode Examples of a process wherein image pickup object detection is not carried out in the request responding image pickup mode are illustrated in FIGS. 14 and 15. Also the process examples of FIGS. 14 and 15 include steps F101 to F105 and F107 to F109 similar to those of FIG. 12, and overlapping description of such common steps is omitted herein to avoid redundancy.

Referring first to FIG. 14, in the process example illustrated, when a trigger input is accepted at step F103, the control section 27 does not carry out image pickup object detection but carries out the composition process at step S107 in the state of the image pickup visual field at the point of time.

As the composition process at step F107, for example, only zoom control is carried out. Then, still picture image pickup is carried out by the processes at steps F108 and F109.

The process example described is applied assuming such a case that, when the digital still camera 1 is directed to a certain direction in the automatic image pickup mode, the user carries out trigger inputting intending to pick up an image in the certain direction.

For example, the present process example is useful in such a case that, when the user who looks at a through-picture on the display screen section 33a on the rear face of the digital still camera 1 in the automatic image pickup mode takes notice that an object which is not regarded as an image pickup object in the image pickup object detection process enters the image pickup visual field of the user, the user immediately comes to want to pick up an image of the object. It is to be noted that, where such an application as just described is considered, it is preferable to stop carrying out of the release prediction process at step F108.

The process example of FIG. 15 includes a combination of the pan-tilt control toward the requested direction described hereinabove with reference to FIG. 13.

After a trigger input is accepted at step F103, the control section 27 decides the requested direction at step F120. Then at step F121, the control section 27 carries out pan-tilt control toward the requested direction so that the image pickup direction of the digital still camera 1 may be directed to the requested direction.

Thereafter, the control section 27 carries out the composition process at step F107 and then carries out the still picture image pickup by the processes at steps F108 and F109.

In the case of the present process example, since the digital still camera 1 is directed to the requested direction, only the composition such as, for example, only the zoom angle is adjusted in this state to carry out image pickup.

Figure 16:
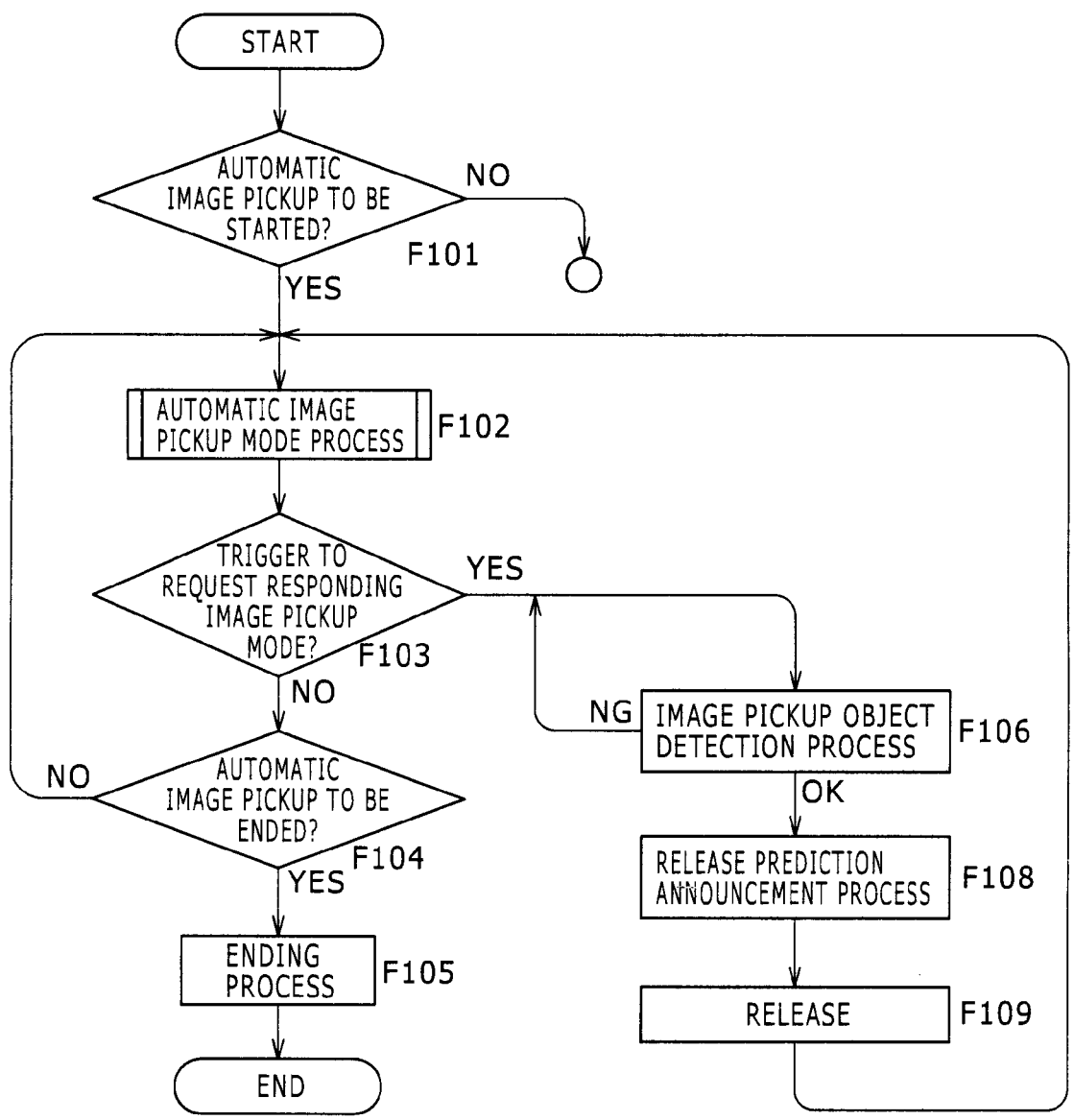

5-4. Example Wherein a Composition Process is not Executed in the Request Responding Image Pickup Mode An example of a process wherein the composition process is not executed in the request responding image pickup mode is illustrated in FIG. 16. Also the process example of FIG. 16 includes the steps F101 to F106 and F108 to F109 similar to those of FIG. 12. However, the process example of FIG. 16 does not include the step F107 of FIG. 12.

Thus, in the process example of FIG. 16, when a trigger input is accepted at step F103, the control section 27 carries out image pickup object detection. Then, for example, if the face of the user comes into the image pickup visual field and a result of image pickup object detection is determined OK, then the processing skips the composition process and advances to step F108, at which the release prediction process is carried out. Then, the still picture image pickup process is carried out at step F109.

This is a process in a case in which it is assumed that, in the automatic image pickup mode, the user wants to carry out still picture image pickup regardless of the composition.

This process can be applied as operation when the user wants to carry out image pickup immediately particularly when it is decided that a result of image pickup object detection is OK, that is, for example, when a person is caught into the image pickup visual field.

It is to be noted that, where such an application as just described is intended, also it is preferable not to carry out the release prediction process at step F108.

5-5. Picked Up Image Presentation in the Request Responding Image Pickup Mode

Figure 17:
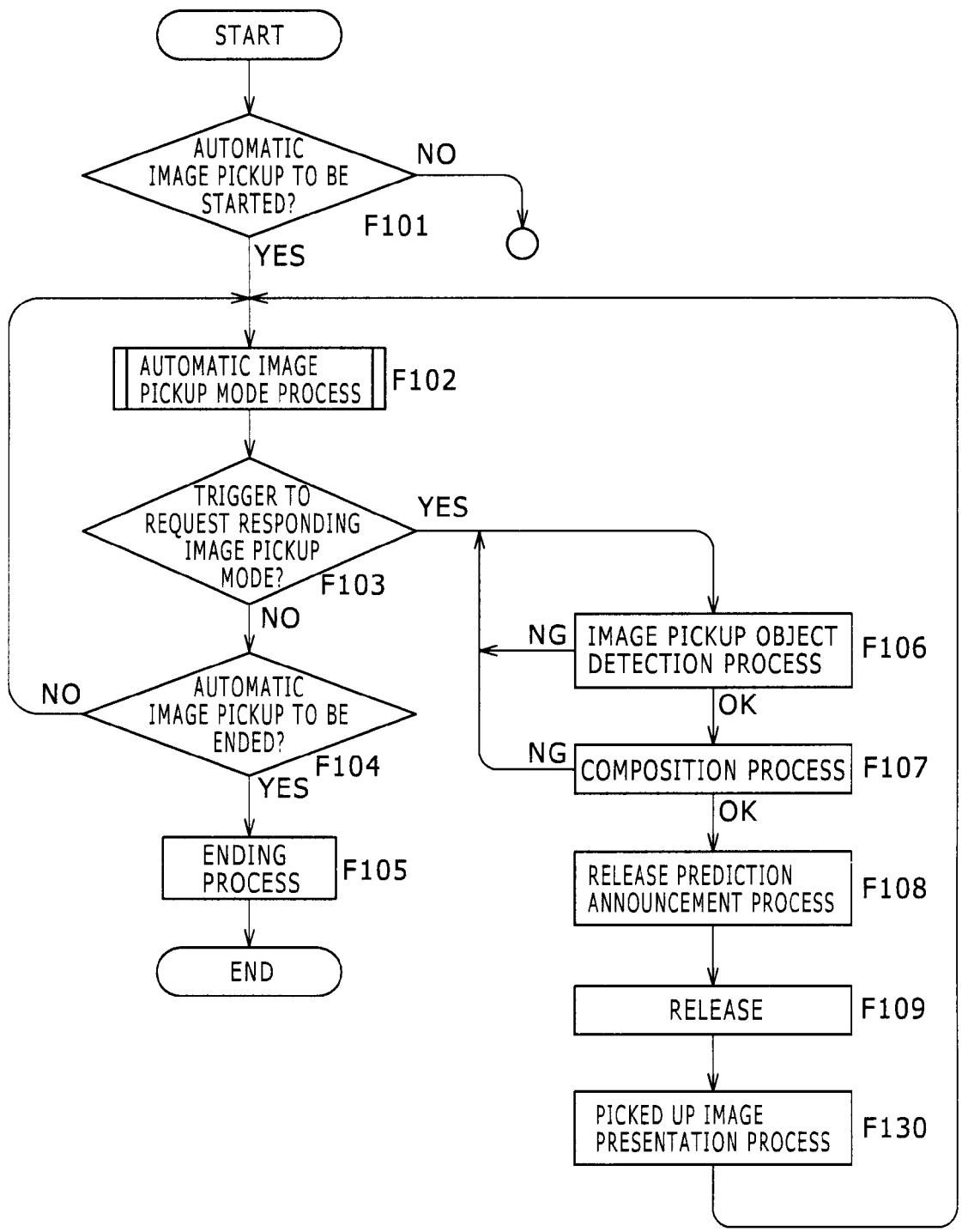
FIG. 17 is a flow chart illustrating a still further modification to the image pickup control process wherein a picked up image presentation process is carried out.

An example of a process wherein the presentation of a picked up image to the user is carried out when still picture image pickup is carried out in the request responding image pickup mode is illustrated in FIG. 17. Also the process example of FIG. 17 includes steps F101 to F109 similar to those of FIG. 12.

Referring to FIG. 17, in the process example illustrated, after the release process is carried out and still picture data are recorded into the memory card 40 at step F109, the control section 27 carries out a picked up image presentation process at step F130.

In particular, at step F130, the control section 27, particularly the mode sequence control section 86 and the picked up image recording control section 81, control the display section 33 to display the still picture data recorded by the release process.

Then, the control section 27, particularly the image pickup visual field variation control section 83, transmits a pan-tilt control signal to the camera platform 10 side. In this instance, the control section 27, particularly the image pickup visual field variation control section 83, outputs an instruction at least to the camera platform 10 to carry out driving by 180 degrees in the pan direction. Simultaneously, the control section 27, particularly the image pickup visual field variation control section 83, may issue an instruction to carry out tilt driving by a predetermined angle in the elevation angle direction.

On the camera platform 10 side, the control section 51, particularly the pan-tilt control section 72, carries out pan-tilt driving control in response to the pan-tilt control signal.

Consequently, the digital still camera 1 on the camera platform 10 rotates by 180 degrees.

With the present process example, immediately after still picture image pickup of the user who has issued a request is carried out in the request responding image pickup mode, the display section 33, particularly the display screen section 33a, is directed to the user side. In other words, immediately after the release, the contents of the picked up image can be presented to the user.

Consequently, the user can confirm readily at the site what still picture is picked up.

It is to be noted that the process at step F130 of FIG. 17 may possibly be incorporated in the processes of FIGS. 13, 14, 15 and 16.

5-6. Tentative Composition Process

Now, an example is described wherein a tentative composition process is carried out in the composition process at step F107 in the request responding image pickup mode in the process examples of FIGS. 12 to 15 and 17.

First, a basic composition process executed in the automatic image pickup mode and the request responding image pickup mode is described.

It is assumed here that, in the procedure of the image pickup object detection process, picked up image data of such picture contents as shown, for example, in a picture range 300 of FIG. 18. The picture contents of the picked up image data here include one image pickup object as a person.

The picture range 300 in this instance corresponds to an image region corresponding to one frame of the picked up image data. Here, it is assumed that the frame image as the picture range 300 is configured such that, where the horizontal pixel number, that is, the horizontal picture size, is Cx and the vertical pixel number, that is, the vertical picture size is Cy, it has a picture size of Cx=320 and Cy=240.

Further, a position on the picture range 300 in this instance is represented by coordinates (X, Y), and the position of the left upper corner of the picture range 300 is defined as coordinates (0, 0).

Further, a vertical reference line Ld1 and a horizontal reference line Ld2 are defined virtually on the picture range 300.

The vertical reference line Ld1 is a straight line passing the middle point of the picture range 300 in the horizontal direction, and the horizontal reference line Ld2 is a straight line passing the middle point of the picture range 300 in the vertical direction. The vertical reference line Ld1 and the horizontal reference line Ld2 are used as reference lines when the position of an image pickup object on the picture range 300 is moved in the horizontal and vertical directions in composition control, respectively.

Meanwhile, the coordinates (160, −120) of a cross point of the vertical reference line Ld1 and the horizontal reference line Ld2 are treated as a reference point P in the composition control.

If image pickup object detection or face detection is carried out for the picked up image data of the picture contents illustrated in FIG. 18, then the face of the one image pickup object SBJ shown in FIG. 18 is detected as a detection image pickup object. In particular, detection of one face by the face detection process is regarded as detection of one image pickup object. Then, as a result of the detection of the image pickup object in this manner, information of, for example, the number, direction, position and size of image pickup objects is obtained.

As regards the number of image pickup objects, for example, the number of faces detected by the face detection may be determined. Since, in the case of FIG. 18, the number of faces to be detected is one, a result that the number of image pickup objects is one is obtained.

Further, when a technique of face detection is used to carry out image pickup object detection, as a result of the detection, a framework, that is, a face framework FR, is set to the detected face portion of the image pickup object.

In FIG. 18, it is shown that the face framework FR is disposed corresponding to the face portion of an image of the image pickup object SBJ. The face framework FR in this instance has a quadrangular shape corresponding to the image portion of the face of the detected image pickup object. It is to be noted that it is assumed that the face framework FR here has a square shape.

Further, the face framework FR is set to the image portion as the face on the picture range 300. Accordingly, also the position and size of the face framework FR on the picture range 300 are changeably set in response to the position, size and so forth of the face of the image pickup object on the picture range 300 detected by the face detection process at this time.

Further, as regards the position information of each image pickup object, at least a image pickup object gravity center G(X, Y) which is the center of gravity of the image pickup object SBJ in an image as picked up image data is determined.

Further, as regards how to set the image pickup object gravity center G, for example, any image pickup object gravity center detection method already known can be adopted. As an example, a cross point of diagonal lines of the quadrangle of the face framework FR detected corresponding to the image pickup object SBJ may be determined as the image pickup object gravity center.

Meanwhile, as regards the size of the image pickup object, it is assumed that it is represented by the size, that is, the number of pixels, of one side of the face framework FR in the vertical or horizontal direction.

In FIG. 18, a state in which a vertical size sizey of the face framework FR is detected as sizey=32 is illustrated as an example.

Further, it is assumed that, as regards the face direction for each image pickup object, it is detected as one of three directions including the leftward, forward and rightward directions.

It is assumed that it is detected from the image pickup object SBJ shown in FIG. 18 that the face direction is the forward direction.

Here, it is assumed that a result of decision that such a composition as shown in FIG. 19 should be used is obtained by the composition decision process based on image pickup object detection information of the image pickup object SBJ detected in such a manner as seen in FIG. 18.

Referring to FIG. 19, in the composition shown, the image pickup object size is set to the vertical size sizey=64 and the image pickup object gravity center G is positioned at G(160, −120+Δy).

Although the composition differs, for example, also depending upon the number of detected image pickup objects, in order to obtain a good composition, it is demanded to make the size of the image pickup object on the picture range 300 not excessively small or great but appropriate. The image pickup object size of the vertical size sizey=64 shown in FIG. 19 is decided as a value of an optimum size of the image pickup object SBJ on the picture range 300.

Meanwhile, the disposition position of the image pickup object gravity center G described above is determined, for example, based on the following grounds.

Where a single image pickup object SBJ is involved, the simplest and most basic position of the image pickup object SBJ is the center of the picture range 300. In other words, the image pickup object gravity center G is positioned at the reference point P.

However, such a composition that the image pickup object is positioned at the center of the screen is generally regarded as a typical one of undesirable compositions. It is generally considered that a good composition is obtained by displacing the position of an image pickup object from the center of the screen in accordance with a certain rule as represented, for example, by a three-division method or a golden rule method.

Thus, in this instance, the position of the image pickup object SBJ, that is, the image pickup object gravity center G, in the vertical direction of the picture range 300 is displaced by a fixed distance from the horizontal reference line Ld2.

The amount of displacement of the image pickup object gravity center G in the vertical direction with reference to the horizontal reference line Ld2 in this manner is defined as vertical offset amount Δy. This vertical offset amount Δy and a horizontal offset amount Δx hereinafter described can be represented, for example, by the quantity of pixels. In this instance, the Y coordinate of the image pickup object gravity center G in FIG. 19 is represented as (−120+Δy).

It is to be noted here that the vertical offset amount Δy is given as a positive value so that the image pickup object gravity center G is positioned in a region of the picture range 300 on the upper side of the horizontal reference line Ld2 as seen in FIG. 19.

Meanwhile, the position of an image pickup object in the horizontal direction is based on the face direction detected from the image pickup object.

As described hereinabove with reference to FIG. 18, the face direction of the image pickup object SBJ in this instance is detected as the forward direction from among the three rightward, forward and left directions.

Here, where the face direction of the one image pickup object SBJ is detected as the forward direction, the image pickup object is positioned at the center in the horizontal direction. In other words, the X coordinate of the image pickup object gravity center G is set to the middle point in the horizontal direction, that is, to the X coordinate (160) same as that of the vertical reference line Ld1, that is, the reference point P.

In this instance, the horizontal offset amount Δx defined as the amount of movement of the image pickup object gravity center G in the horizontal direction with reference to the vertical reference line Ld1 is set to 0.

FIG. 19 illustrates the image pickup object gravity center G (160, −120+Δy) set in accordance with such rules and algorithm of the composition decision as described above.

After all, the process of adjusting the composition from the state of FIG. 18 to the state of FIG. 19 is a process of moving the center of gravity of the face of an image pickup object into a predetermined target range by pan-tilt operations and setting the size of the image pickup object to an appropriate size by a zoom operation. Then, the target range is set in response to the size, number, direction of the face and so forth of such image pickup objects SBJ.

Figure 20A:
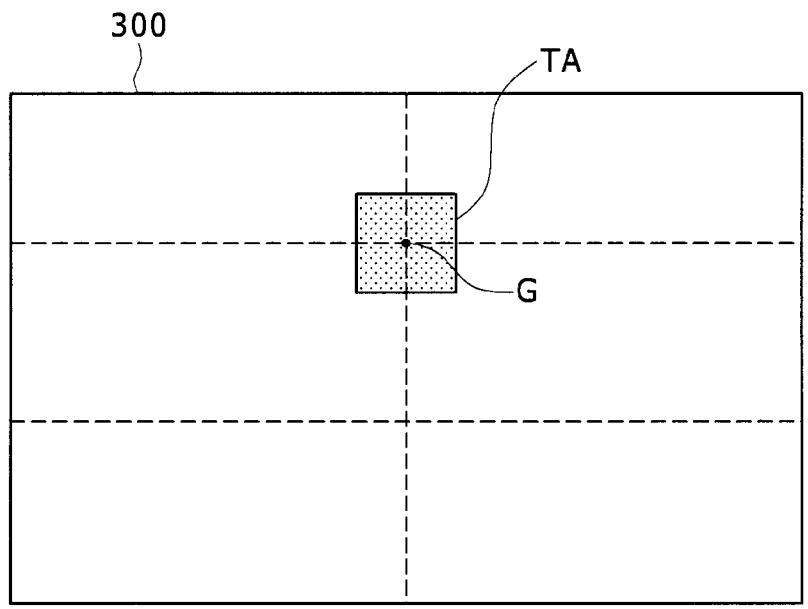
FIGS. 20A and 20B are diagrammatic views illustrating a target range in the composition process.

For example, in the case of FIG. 19, since the face is directed forwardly, a target range TA is set as seen in FIG. 20A, and the image pickup object gravity center G is included in the target range TA.

In response to the setting of the target range TA, the horizontal offset amount Δx and the vertical offset amount Δy are determined, and the composition adjustment is carried out so that the image pickup object gravity center G is finally included in the target range TA.

While FIG. 20A shows the target range TA where the face direction of the image pickup object SBJ is the forward direction, depending upon the direction of the face, the target range TA is set in a different manner.

For example, it is assumed that the detected face direction of the image pickup object is the leftward direction. It is to be noted here that the leftward face direction here signifies a direction of the face in a state in which, where the picture contents of the picture range 300 are viewed actually, to a person who watches the picture range 300, the face of the image pickup object SBJ looks directed to the left side on the picture range 300. Incidentally, actually the person itself of the image pickup object SBJ is directed to the right side where the direction in which the person opposes to the image pickup apparatus by which the image of the person was picked up is the forward direction.

In this instance, as regards the position of the image pickup object gravity center G in the horizontal direction, it is positioned, from between two left and right image regions or divisional regions into which the region of the picture range 300 is divided by the vertical reference line Ld1, in the "right" image region on the opposite side to the "left" indicated by the face direction. Consequently, in the picture range 300, a space is obtained on the left side toward which the face of the image pickup object SBJ is directed.

Figure 20B:
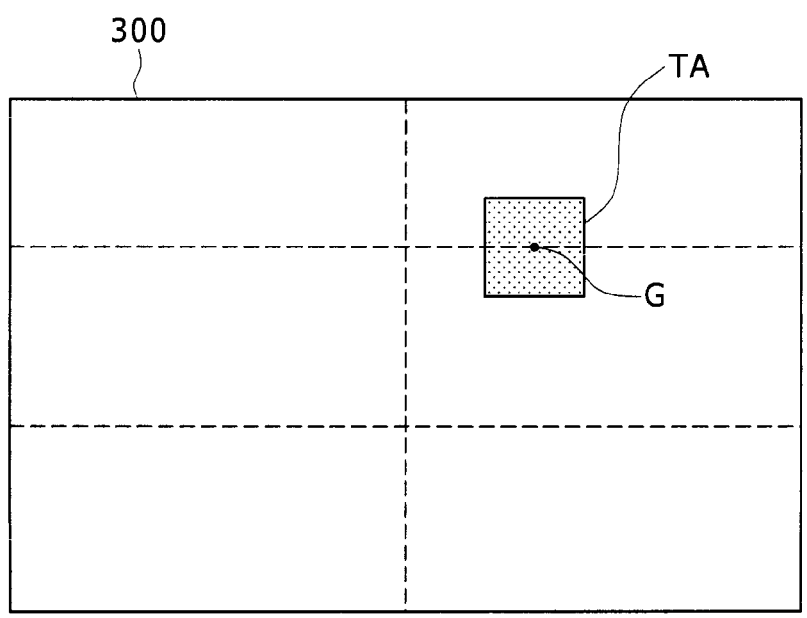

In short, the target range TA is set to the right side image region with respect to the vertical reference line Ld1 as seen in FIG. 20B. Then, the image pickup object gravity center G is moved into the target range TA.

By setting the composition in such a manner as described above, a better result is obtained, for example, in comparison with another composition wherein the image pickup object is positioned such that the image pickup object gravity center G of the image pickup object SBJ whose face direction is the leftward direction corresponds to or coincides with the center of the screen in the leftward and rightward direction or a further composition wherein the target range TA is set to the left side image region with respect to the vertical reference line Ld1.

On the other hand, where the detected face direction of the image pickup object is the rightward direction, the image pickup object gravity center G is set to the left side image region from between the two left and right divisional image regions split by the vertical reference line Ld1 conversely to that in the case in which the detected face direction is the leftward direction.

Further, where a plurality of image pickup objects are detected, an image region including the plural detected image pickup objects are regarded as a single integrated image pickup object, and a single image pickup object gravity center GG, that is, a single integrated image pickup gravity center GG, is determined from the integrated image pickup object.

Figure 21A:
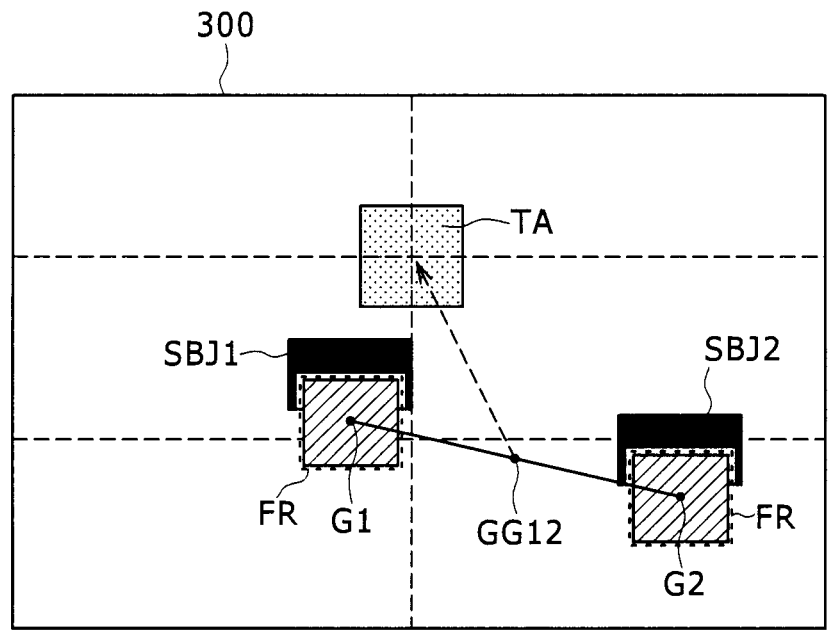
FIGS. 21A and 21B are diagrammatic views illustrating arrangement of the center of gravity in the target range in the composition process.

For example, FIG. 21A illustrates an example wherein two image pickup objects SBJ1 and SBJ2 are detected. The center of gravity of the gravity centers G1 and G2 of the image pickup objects SBJ1 and SBJ2 becomes an integrated image pickup object gravity center GG12.

It is assumed that the target range TA is set to a position shown in FIG. 21A from the number, direction of the face and size of the image pickup objects.

In this instance, the composition adjustment is carried out in such a manner that the integrated image pickup object gravity center GG12 is included in the target range TA as indicated by an arrow mark.

Figure 21B:
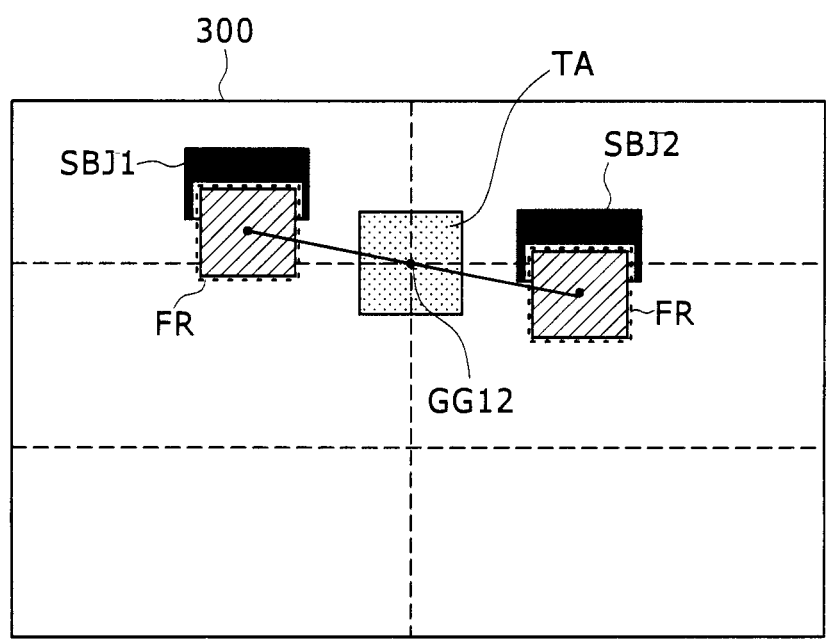

As a result, such a composition as shown in FIG. 21B is obtained.

The image pickup object gravity center G can be set in several different manners. FIGS. 21A and 21B illustrate the simplest example of such setting wherein the middle point of a line segment interconnecting the centers (G1 and G2) of gravity of those ones of a plurality of detected image pickup objects which are positioned on the most left side and the most right side within the picture range 300 is set as the integrated image pickup object gravity center GG12.

Where a plurality of image pickup objects are involved, the face directions individually detected from the individual image pickup objects are sometimes different from each other. In this instance, one face direction of the integrated image pickup object may be determined based on the relationship of the face directions detected for the individual image pickup objects. As the relationship of the face directions detected for the individual image pickup objects, where the number of same face directions occupies more than a predetermined rate in the total number of image pickup objects, the same face direction is determined as the face direction of the integrated image pickup object and is used for the composition setting and the setting of the target range TA.

As can be recognized from the foregoing description, the target range TA in which the image pickup object gravity center or the integrated image pickup object gravity center is to be disposed is determined from the size, number and direction of image pickup objects. Then, whether or not the composition is optimum is decided depending upon whether or not the image pickup object gravity center or the integrated image pickup object gravity center is included in the target range TA. Also, whether or not the image pickup object size is optimum is determined.

Then, if it is decided that the composition is not optimum, then as a process for the composition adjustment, the position of the image pickup object gravity center G is changed so that the image pickup object gravity center or the integrated image pickup object gravity center may be included in the target range TA, or the image pickup object size is varied so as to be appropriate.

The variation of the position of the image pickup object gravity center G or the integrated image pickup object gravity center GG is carried out, in regard to the horizontal direction, by pan control for the pan mechanism of the camera platform 10. On the other hand, in regard to the vertical direction, the variation is carried out by tilt control for the tilt mechanism of the camera platform 10.

The variation of the image pickup object size is carried out by control for moving the zoom lens of the optical system section 21 of the digital still camera 1, that is, by zoom control. Alternatively, the variation may be carried out by such an image signal process as image cutting out for picked up image data.

The basic composition process is such as described above. For example, in the case of the process of FIG. 12, such processes as described above are carried out by the composition process at step F3 of FIG. 11A in the automatic image pickup mode at step F102.

However, when control of moving the image pickup object gravity center G into the target range TA described above is carried out, even if an optimum composition is obtained within the image pickup visual field at the point of time, actually there is a case in which a more appropriate composition exists.

For example, although a plurality of persons exist in the neighborhood, a composition is adjusted with a smaller number of persons and may possibly be different from a composition for a maximum number of persons.

Figure 22:
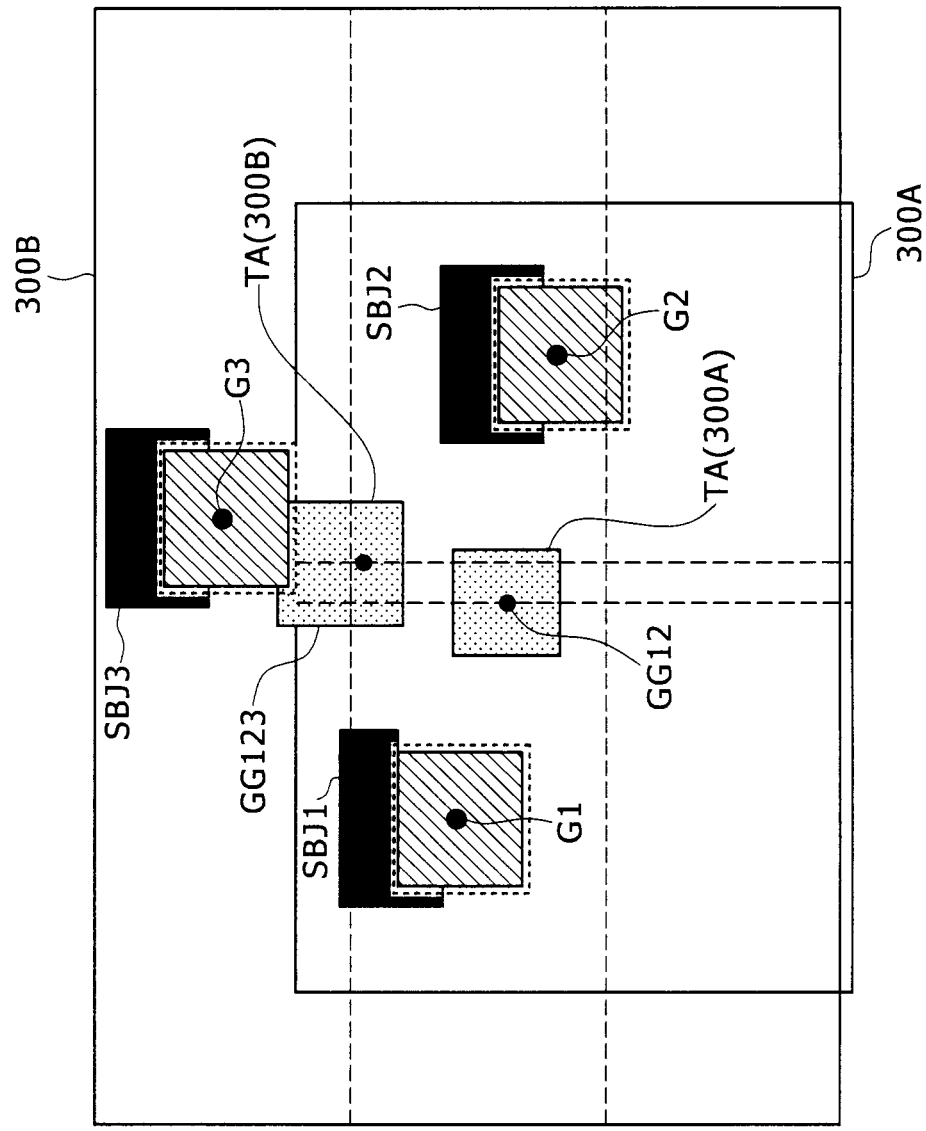
FIGS. 22, 23A and 23B are diagrammatic views illustrating a local solution and the best solution in the composition process.

An example is shown in FIG. 22.

Referring to FIG. 22, an image pickup visual field indicated by a picture range 300A is an optimum composition as a local solution. In particular, if two image pickup objects SBJ1 and SBJ2 are detected by the image pickup object detection process although three persons are positioned in the neighborhood, the integrated image pickup object gravity center GG12 of the two image pickup objects SBJ1 and SBJ2 is included in the target range TA, that is, in the picture range 300A.

However, in this instance, the image pickup visual field as the best solution is such as shown as a picture range 300B. In particular, the integrated image pickup object gravity center GG123 of the three persons of the image pickup objects SBJ1, SBJ2 and SBJ3 is included in the target range TA of the picture range 300B.

If such a search that tilting up is carried out from below in the procedure of the image pickup object detection process and two image pickup objects SBJ1 and SBJ2 are detected first, then a composition process is carried out only with the two image pickup objects SBJ1 and SBJ2 and still picture image pickup is carried out with the composition as the local solution.

Figure 23A:
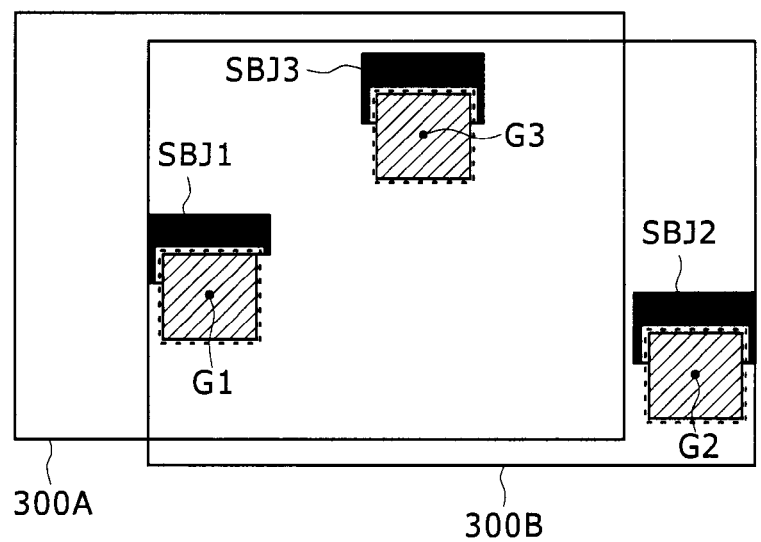

Also FIG. 23A similarly shows a picture range 300A where the composition is a local solution and another picture range 300B where the composition is the best solution.

If it is assumed that such a search that a pan operation proceeds from the left to the right in the procedure of the image pickup object detection process and two image pickup objects SBJ1 and SBJ3 are detected first, then a composition process is carried out only with the two image pickup objects SBJ1 and SBJ3. Therefore, still picture image pickup is carried out with the composition as a local solution.

For example, in the case of image pickup in the automatic image pickup mode, even if still picture image pickup is carried out with the composition as the local solution, there is no serious trouble. This is because the user carries out image pickup without being conscious of it.

However, in the request responding image pickup mode, the composition as the local solution is likely to be different from a demand of the user.

For example, it is assumed that three users gather so as to have a photograph of them taken and carry out trigger inputting. In this instance, although a commemorative photograph of the three persons is demanded, in the state of the local solution, a situation occurs that one of the three persons is not included in the photograph. Where it is intended to include a number of persons as great as possible in a photograph, it is necessary to look around once.

Thus, as an example, the composition process in the request responding image pickup mode includes a process of moving, when one or more image pickup objects in accordance with an image pickup request are detected within an image pickup visual field, the image pickup visual field to confirm presence of some other image pickup object in accordance with the image pickup request.

As a particular example, as the composition adjustment process, two stages of processing including tentative composition adjustment and regular composition adjustment are carried out.

The tentative composition adjustment is a process for searching whether or not there exists some other image pickup object before pan-tilt operations to a composition which is a target as a regular composition are carried out upon composition adjustment. For example, the tentative composition adjustment is a process of carrying out pan-tilt operations so that the pan-tilt amounts intentionally exceed the target range TA of the regular composition to search whether or not there exists some other image pickup object.

An actual process is carried out by changing the target range TA between the tentative composition adjustment and the regular composition adjustment.

The tentative composition adjustment is described with reference FIGS. 24A and 24B.

Figure 24A:
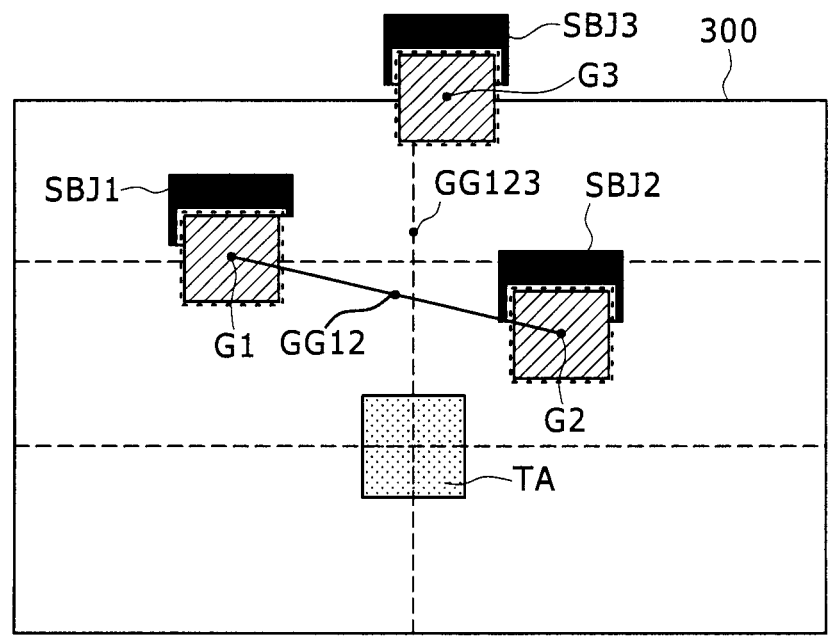
FIGS. 24A and 24B are diagrammatic views illustrating tentative composition adjustment.

FIG. 24A shows an example wherein three image pickup objects SBJ1, SBJ2 and SBJ3 of persons exist. Here, it is assumed that the image pickup objects SBJ1 and SBJ2 of two persons are detected in a procedure of tilting from below to above in the image pickup object detection process.

Here, the composition process is entered, and first, the tentative composition adjustment is carried out.

In this instance, the target range TA is set to a lower position in comparison with that in the case of normal composition adjustment described hereinabove in the picture range 300 as shown in FIG. 24A.

First, since the image pickup objects SBJ1 and SBJ2 are detected already, in the composition adjustment, pan-tilt control is carried out such that the integrated image pickup object gravity center GG12 of the image pickup objects SBJ1 and SBJ2 is included in the target range TA. In the case of the present example, tilt up is carried out in order that the integrated image pickup object gravity center GG12 may be included in the target range TA.

However, in this instance, since the target range TA is set to a lower position in comparison with that in the case of normal setting, the tilt up amount is greater than that in the case of the normal composition adjustment and tilt up is carried out further upwardly.

Then, the image pickup object SBJ3 is newly detected in the procedure.

In this instance, the composition process is carried out again in response to the detection of the image pickup objects SBJ1, SBJ2 and SBJ3. In this case, tentative composition process is carried out first. Now, tilt up is carried out so that the integrated image pickup object gravity center GG123 of the image pickup objects SBJ1, SBJ2 and SBJ3 is included in the target range TA.

Figure 24B:
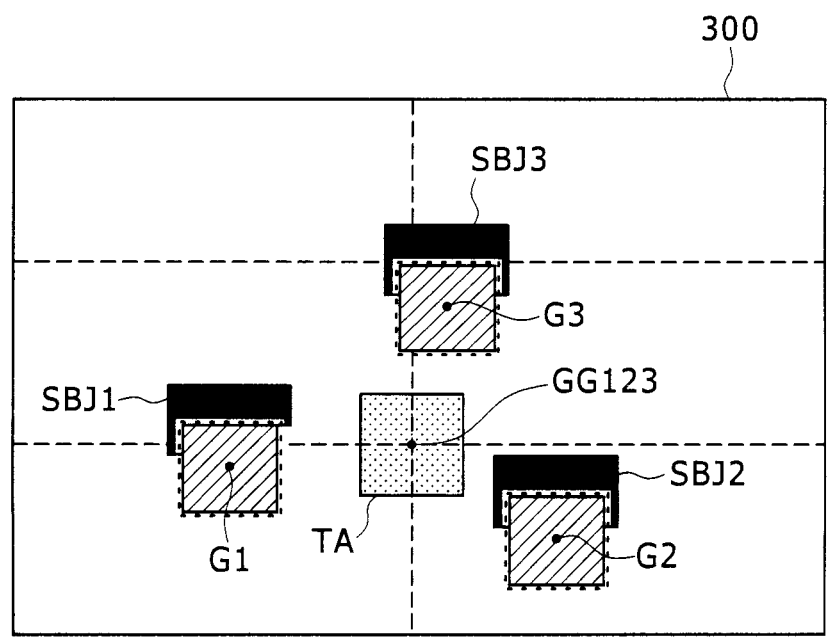

Then, if no other image pickup object exists above the image pickup object SBJ3, then the tentative composition adjustment is completed after all as seen in FIG. 24B.

If the tentative composition adjustment is completed, then the regular composition adjustment is carried out subsequently. The regular composition adjustment here signifies the normal composition adjustment described hereinabove.

Figure 25A:
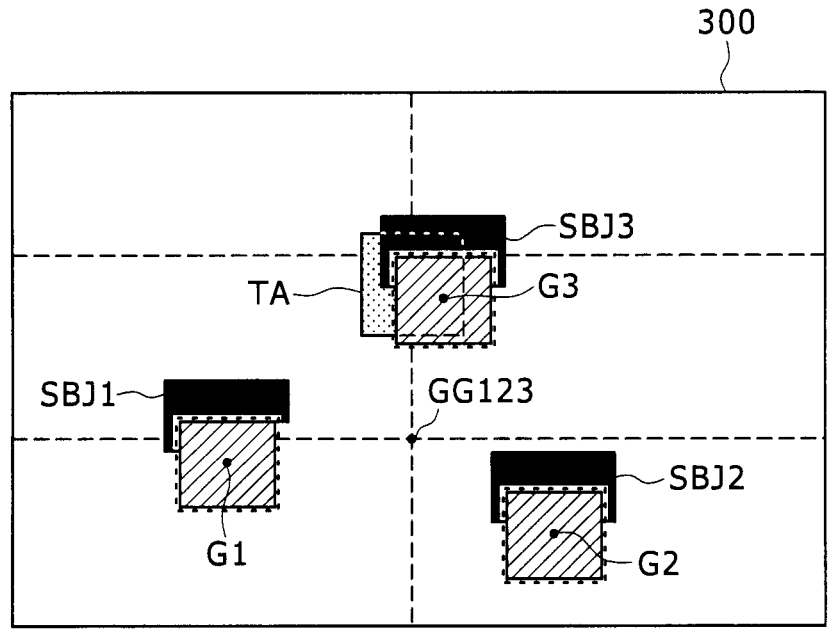
FIGS. 25A and 25B are diagrammatic views illustrating regular composition adjustment after the tentative composition adjustment.

FIG. 25A illustrates the picture range 300 in a state in which the tentative composition adjustment is completed. When the regular composition adjustment is to be carried out, the target range TA is set to a normal position shown in FIG. 25A. In particular, in this instance, the target range TA used in the tentative composition adjustment is re-set to an upper portion in the picture range 300.

Then, pan-tilt control is carried out so that the integrated image pickup object gravity center GG123 is included in the target range TA. In this instance, tilt down control is carried out.

Figure 25B:
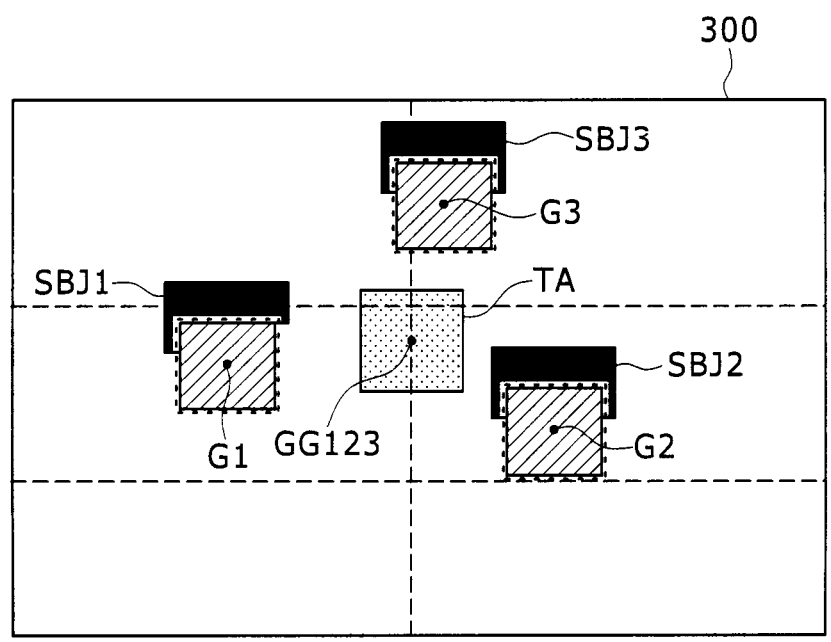

Then, a state illustrated in FIG. 25B is established, and since the integrated image pickup object gravity center GG123 is included in the target range TA, the regular composition adjustment is completed.

After all, an optimum composition including the image pickup objects SBJ1, SBJ2 and SBJ3 of three persons is obtained at the time of completion of the regular composition adjustment.

For example, in the tentative composition adjustment, the target range TA is set to a position different from a normal position in accordance with a searching direction upon the regular composition adjustment, particularly to a position within the picture range 300 on this side with respect to the variation direction of image pickup visual field as described above. Consequently, the target range TA is positioned once at a position a little beyond the position of the composition to which it should be adjusted finally. It is confirmed thereby whether or not there exists some other image pickup object within a range in the searching direction.

Since, in the examples shown in FIGS. 24A to 25B, tilt up is successively carried out upon tentative composition adjustment, the target range TA upon tentative composition adjustment is set lower in comparison with the normal position.

Figure 26A:
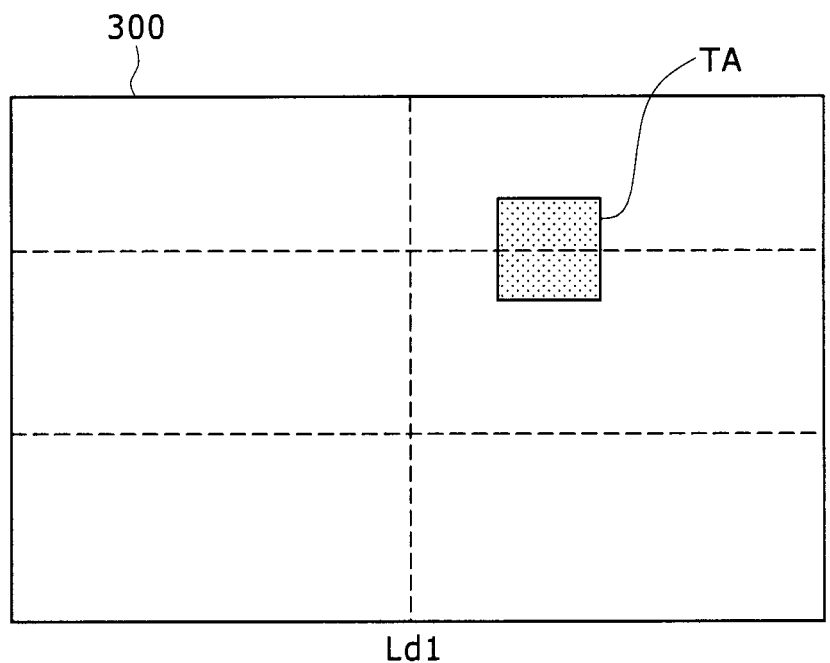
FIGS. 26A and 26B are diagrammatic views illustrating target ranges in the tentative composition adjustment.

If it is assumed that a pan operation is carried out from the right to the left upon tentative composition adjustment and the target range TA in the regular composition is placed on the vertical reference line Ld1, then the target range TA upon tentative composition adjustment is placed on the right side with respect to the vertical reference line Ld1 as shown in FIG. 26A. Consequently, it can be confirmed whether or not there exists some image pickup object on the further left side.

Figure 26B:
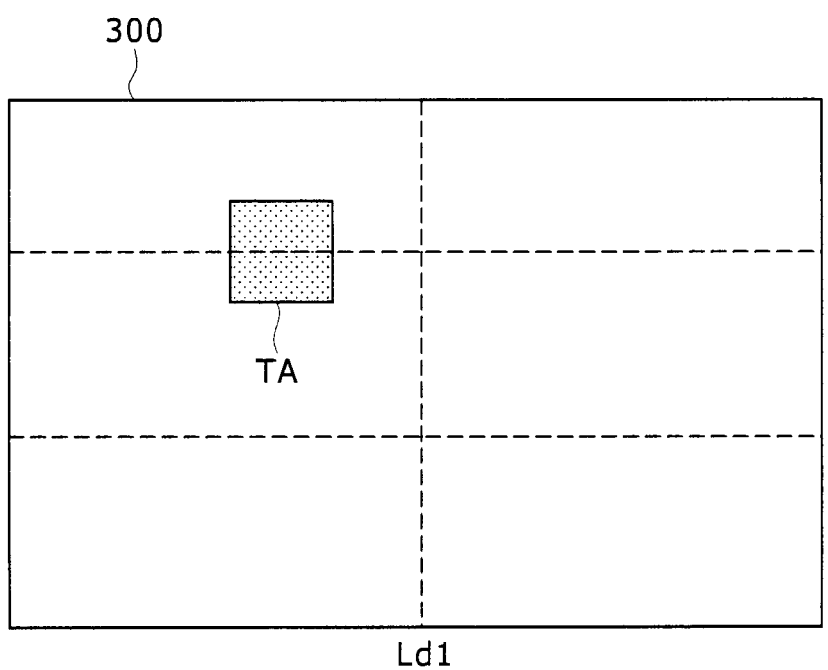

Further, if it is assumed that panning is carried out from the left to the right upon tentative composition adjustment and the target range TA in the regular composition is placed on the vertical reference line Ld1, then the target range TA upon tentative composition adjustment is placed on the left side with respect to the vertical reference line Ld1 as shown in FIG. 26B. Consequently, it can be confirmed whether or not there exists some image pickup object on the further right side.

In this manner, by setting the target range TA different from that in the regular composition adjustment to carry out the tentative composition adjustment and thereafter carrying out the regular composition adjustment, pickup of a still picture image can be carried out without missing of an image pickup object. In other words, pickup of a still picture wherein a maximum number of image pickup objects are targeted can be carried out.

It is to be noted that, where the detected face of a certain image pickup object overlaps with an end region of the picture region in the procedure of pan-tilt operations in the tentative composition adjustment, also a process that no further pan-tilt process is carried out can be used.

Further, even if the center of gravity varies depending upon the direction of the face upon regular composition adjustment, also it seems a possible idea to ignore the direction of the face upon tentative composition adjustment.

Figure 23B:
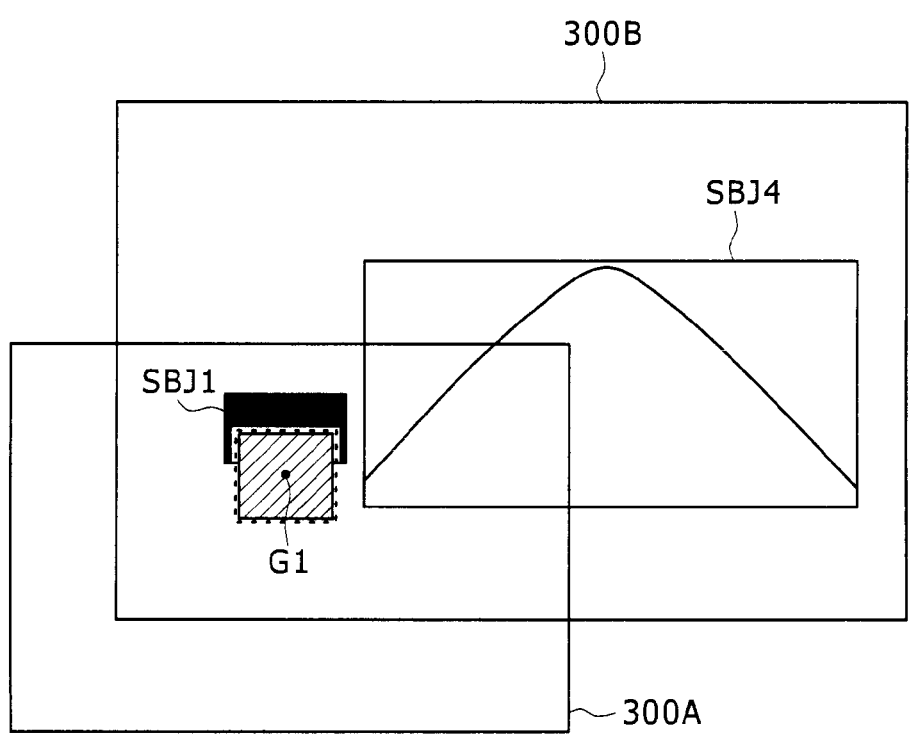

Further, while a representative example of an image pickup object is the face of a person, where a noticed region other than the face of a person such as an image pickup object SJB4 in FIG. 23B can be extracted, also it seems a possible idea to combine the face of a person and such a noticed region as just described to carry out composition adjustment.

A process where the tentative composition adjustment is applied to the process in FIG. 12 is described with reference to FIGS. 27A to 28B.

Figure 27B:
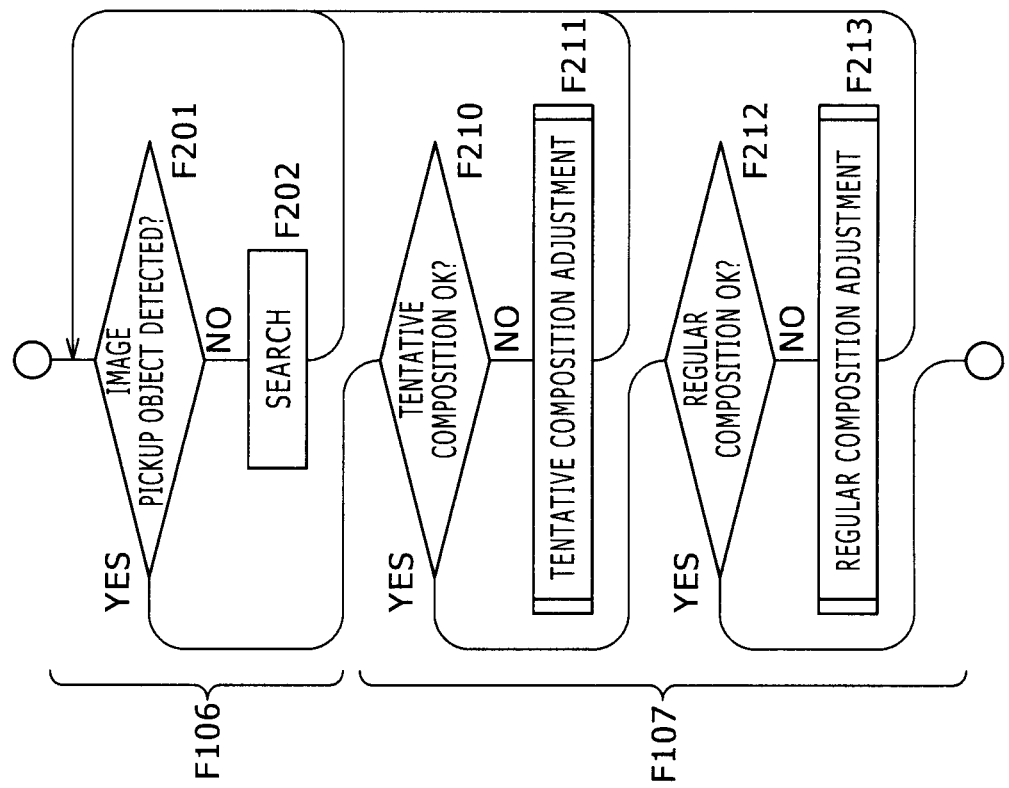
FIGS. 27A and 27B are flow charts illustrating composition processes in an automatic image pickup mode and a request responding image pickup mode, respectively.
Figure 27A:
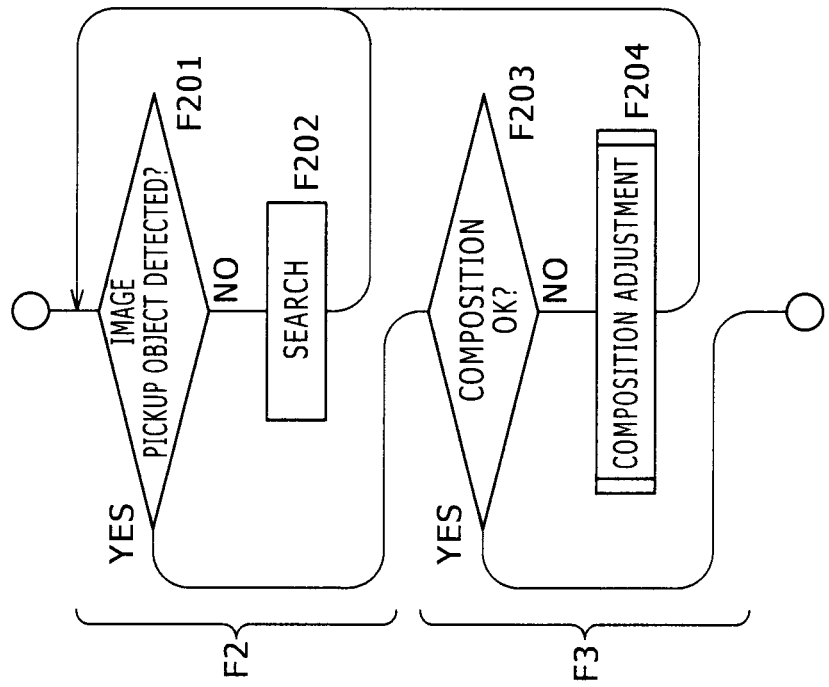

FIG. 27A illustrates an image pickup object detection process and a composition process carried out at steps F2 and F3 in FIG. 11A when operation of the automatic image pickup mode is carried out at step F102 in FIG. 12.

Here, while the tentative composition adjustment is not carried out in the composition process in the automatic image pickup mode, an example of a process wherein the tentative composition adjustment is carried out is described as an example wherein an algorithm different from that of the composition process of the automatic image pickup mode is adopted in the request responding image pickup mode.

First, as the image pickup object detection process at step F2 in the automatic image pickup mode described with reference to FIG. 11A, the control section 27, particularly the image pickup preparation processing section 82, confirms whether or not an image pickup object is detected at step F201 in FIG. 27A.

If an image pickup object is not detected, then the control section 27, particularly the image pickup preparation processing section 82, executes a searching process at step F202. Then, the control section 27 confirms whether or not an image pickup object is detected at step F201.

In particular, in the processes at step F201 and F202, the control section 27, particularly the image pickup preparation processing section 82 and the image pickup view field variation control section 83, carry out pan-tilt control for the camera platform 10 and carry out zoom control for the optical system section 21 to confirm whether or not image pickup object detection by image analysis by the signal processing section 24 or the control section 27 is carried out while varying the image pickup visual field.

If an image pickup object is detected, then the control section 27, particularly the image pickup preparation processing section 82, carries out, as the composition process at step F3 in FIG. 11A, confirmation regarding whether or not an optimum composition is obtained at step F203 and a process of composition adjustment at step F204 in FIG. 27A.

This is the normal composition process described above, and is the process described, for example, with reference to FIGS. 18 to 21B.

In particular, decision of a picture structure, particularly decision of the number of image pickup objects in the picture range, the image pickup object size and the direction of the face and so forth, based on a result of the image pickup object detection is carried out. Then, it is decided in accordance with a predetermined algorithm whether or not an optimum composition is obtained based on the information of the picture structure decided by the picture structure decision. On the other hand, if an optimum composition is not obtained, then, as the composition adjustment, the image pickup visual field is varied by pan, tilt and zoom control.

It is to be noted that, as described hereinabove with reference to FIG. 11A, where pan-tilt and zoom control is carried out in the composition adjustment, the processing is carried out again beginning with the image pickup object detection process at step F2 from step F3. In an example of FIG. 27A, where the composition adjustment is carried out at step F204, the process is carried out again from step F201.

The composition adjustment at step F204 is carried out similarly to the normal composition adjustment process.

Figure 28A:
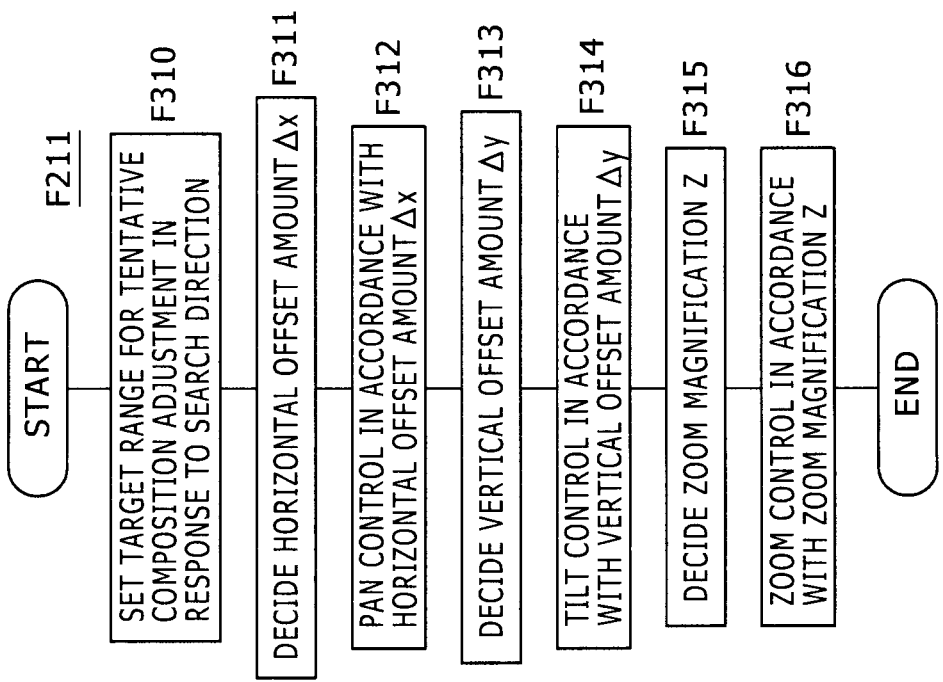
FIGS. 28A and 28B are flow charts illustrating processes for the tentative composition adjustment and the regular composition adjustment, respectively.

An example of a procedure of normal composition adjustment is illustrated in FIG. 28A.

Referring to FIG. 28A, first at step F300, the control section 27 sets the target range TA for obtaining an optimum composition. For example, the target range TA is set as shown in FIG. 20A or 20B.

Then at step F301, the control section 27 decides a horizontal offset amount $\Delta x$ in response to the set target range TA.

Then at step F302, the control section 27 executes pan control so that the image pickup object gravity center G or the integrated image pickup object gravity center GG is positioned at an X-coordinate corresponding to the decided horizontal offset amount $\Delta x$.

Then, at step F303, the control section 27 decides a vertical offset amount $\Delta y$ for the target range TA. Then, at step F304, the control section 27 executes tilt control so that the image pickup object gravity center G or the integrated image pickup object gravity center GG is positioned on a Y-coordinate corresponding to the decided vertical offset amount $\Delta y$.

Then, at step F305, the control section 27 decides a zoom magnification Z.

As described above, size variation of the image pickup object SBJ in the picture range 300 is carried out by varying the picture angle by zoom control. Here, the zoom magnification signifies a magnification of the picture angle necessary for obtaining an image pickup object size decided in response to an optimum composition from an image pickup object size when an image pickup object is detected by the image pickup object detection process.

Therefore, the control section 27 first decides a target image pickup object size, that is, a zoom control target value, necessary for an optimum composition in accordance with a predetermined rule in response to a condition of the detected image pickup object.

Then, the ratio between the target image pickup object size size_trg determined as described above and the image pickup object size size_org, which is a size or a number of pixels of one side in the vertical direction or in the horizontal direction of a face framework FR, is calculated and then the calculated ratio is determined as the zoom magnification Z. Particularly, the zoom magnification Z is calculated by the following expression:

$$Z = size\_trg/size\_org$$

Then, at step F306, the control section 27 executes zoom control with the zoom magnification Z.

The procedure of the composition adjustment illustrated in FIG. 28A is an example to the end. For example, after zoom control is carried out first, pan-tilt control may be carried out. Further, the horizontal offset amount $\Delta x$ and vertical offset amount $\Delta y$ can be calculated also taking size variation of an image pickup object by the zoom magnification into consideration.

In the automatic image pickup mode, the composition process is carried out as described with reference to FIGS. 27A and 28A.

On the other hand, the composition process executed at step F107 in FIG. 12 in the request responding image pickup mode is carried out in the following manner.

FIG. 27B illustrates the image pickup object detection process and the composition process to be carried out at steps F106 and F107 in FIG. 12 in the request responding image pickup mode.

First, as the image pickup object detection process at step F106, the control section 27, particularly the image pickup preparation processing section 82, confirms at step F201 whether or not an image pickup object is detected.

If an image pickup object is not detected, then the control section 27, particularly the image pickup preparation processing section 82, executes a search process at step F202. Then, the control section 27 confirms whether or not an image pickup object is detected at step F201.

The processes as steps F201 and F202 are similar to those at steps F201 and F202 in FIG. 27A, respectively.

If an image pickup object is detected, then the control section 27, particularly the image pickup preparation processing section 82, carries out a process of a tentative composition first as the composition process at step F107 of FIG. 12. In particular, at step F210, processes of confirmation regarding whether or not an optimum composition state as a tentative composition is obtained and tentative composition adjustment are carried out at step F211. The processes just described are similar, for example, to those described hereinabove with reference to FIGS. 24A to 26B.

In particular, decision of a picture structure, that is, decision of the number, size, the direction of the face and so forth of image pickup objects, based on a result of the image pickup object detection, is carried out, and then a target range TA for a tentative composition is determined. Then, it is decided whether or not an optimum composition as a tentative composition is obtained, and, if an optimum composition is not obtained, then the image pickup visual field is varied by pan-tilt and zoom control as tentative composition adjustment.

It is to be noted that, also where pan-tilt and zoom control is carried out as the tentative composition adjustment, the processing returns to step F201 and then image pickup object detection is carried out again. This is because there is the possibility that an image pickup object may disappear by variation of the image pickup visual field or movement of the user.

Further, since, in such tentative composition adjustment as described above, the image pickup visual field is moved by a greater amount than that in the normal composition adjustment, there is the possibility that a new image pickup object may be detected. In this instance, the tentative composition adjustment is carried out again based on the image pickup object gravity center G or the integrated image pickup object gravity center GG including the new image pickup object.

Figure 28B:
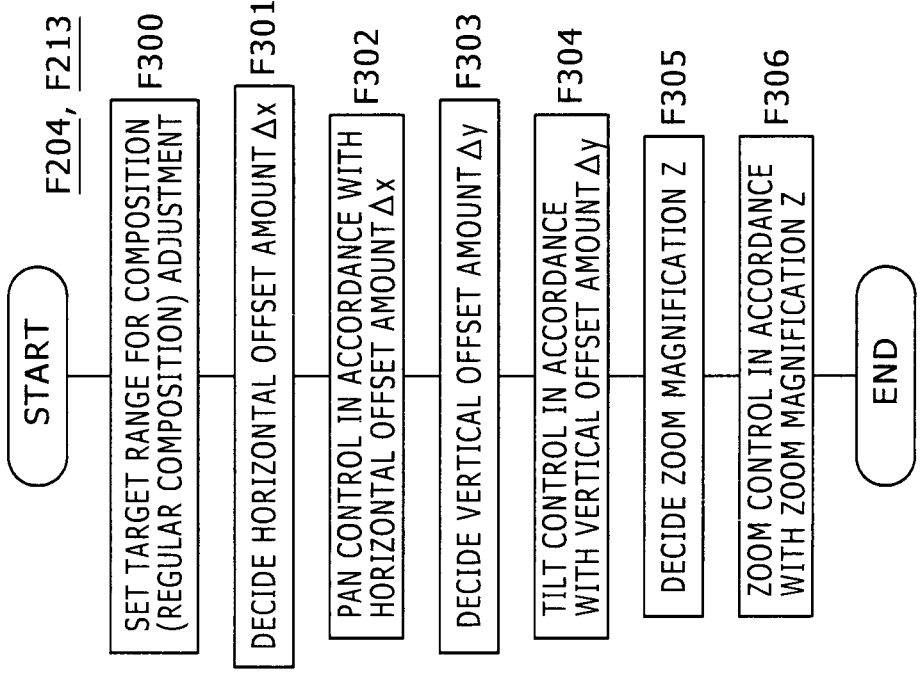

An example of a procedure of the tentative composition adjustment at step F211 is illustrated in FIG. 28B.

Referring to FIG. 28B, the control section 27 sets a target range TA for obtaining a tentative composition at step F310. For example, as described with reference to FIGS. 24A and 24B and 26A and 26B, a target range TA different from an original target range TA is set in response to a search direction.

Processes at steps F311 to F316 after step F310 are similar to those at steps F301 to F306 of FIG. 28A for the normal composition adjustment.

In particular, at step F311, the horizontal offset amount $\Delta x$ is decided in response to the set target range TA for the tentative composition.

Then, at step F312, the control section 27 executes pan control so that the image pickup object gravity center G or the integrated image pickup object gravity center GG may be positioned on the X-coordinate corresponding to the horizontal offset amount Δx.

Then, at step F313, the control section 27 decides the vertical offset amount Δy with respect to the target range TA for the tentative composition. Then, at step F314, the control section 27 executes tilt control so that the image pickup object gravity center G or the integrated image pickup object gravity center GG may be positioned on the Y-coordinate corresponding to the vertical offset amount Δy.

Then, at step F315, the control section 27 decides the zoom magnification Z.

Then, at step F316, the control section 27 executes zoom control with the zoom magnification Z.

Also the procedure of the tentative composition adjustment in FIG. 28B is an example to the end. For example, pan-tilt control may be carried out after zoom control is carried out. Further, the horizontal offset amount Δx and the vertical offset amount Δy can be calculated taking also the size variation of the image pickup object by the zoom magnification into consideration.

If such tentative composition adjustment as described above is carried out and OK decision is obtained with regard to the tentative composition at step F210 in FIG. 27B, or in other words, if the image pickup object gravity center G or the integrated image pickup object gravity center GG is positioned within the target range TA for the tentative composition, then processes of the actual composition at steps F212 and F213 are carried out. In particular, the normal composition adjustment is carried out.

The processes of the regular composition at steps F213 and F213 are similar to those at steps F203 and F204 in FIG. 27A, respectively. Further, the procedure of the regular composition adjustment at step F213 is carried out, for example, in such a manner as illustrated in FIG. 28A.

As described above, in the request responding image pickup mode, two stages of the composition process including the tentative composition adjustment and the regular composition adjustment are carried out.

Consequently, an image wherein a maximum number of persons are set as image pickup objects within the range of the view angle and which is demanded by the user can be automatically picked up as a still picture picked up image demanded by the user.

It is to be noted that, while, as the method of the tentative composition adjustment, an example wherein the target range TA is set on the near side as viewed from the searching direction is described, some other particular method may be applied.

For example, it seems a possible idea to carry out, when an image pickup object is detected, tentative composition adjustment based on the image pickup object and then carry out search around the image pickup object to confirm whether or not some other image pickup object exists. Or, an example may be used that, when an image pickup object is detected, search around the image pickup object is carried out simply.

5-7. Control Method in a Different Request Responding Image Pickup Mode

While various examples are described above as the modifications to the first embodiment, they are directed to the image pickup preparation process or the image pickup object detection process in the image pickup preparation process and the composition process which are carried out, particularly in the request responding image pickup mode, by control methods different from those used in the automatic image pickup mode.

In addition to the examples described above, in the request responding image pickup mode, various control methods based on a processing procedure, an algorithm, setting of a control parameter and so forth which are different from those in the automatic image pickup mode are available.

In the request responding image pickup mode, for example, also a situation in which a plurality of users gather and request image pickup of a still picture of them can be assumed. In this instance, in order to pick up an image of users as many as possible, it may occur that the zoom control range in the composition processing procedure must be limited. In particular, an upper limit parameter for zoom control is changed.

Also it may possibly occur to set the decision condition for an optimum composition tolerant. For example, in the request responding image pickup mode, the range of the framework of the target range TA is expanded.

Or, the period of time within which the image pickup object gravity center G exists within the target range TA may be set short. For example, while it is decided at steps F203, F210 and F212 in FIGS. 27A and 27B that, if the image pickup object gravity center G exists within the target range TA for a period of time longer than a predetermined period of time, then the composition is OK, where the processes at steps F210 and F212 are carried out in the request responding image pickup mode, the predetermined time period is set shorter.

The foregoing arises from the fact that, since the processes described above are carried out in accordance with image pickup based on the request by the user, it is anticipated that the user side moves only a little.

Further, it seems a possible idea to limit, in the image pickup object detection process at step F106 in FIG. 12 in the request responding image pickup mode, the panning range and the tilting range in order to make it easy to detect the requested user. This is a technique for preventing that, where the position of the requesting user is known by some degree, for example, where the direction of the request described above can be recognized, a different user from the user who issued the request is determined as an image pickup object.

6. Image Pickup Operation of the Second Embodiment

Figure 29:
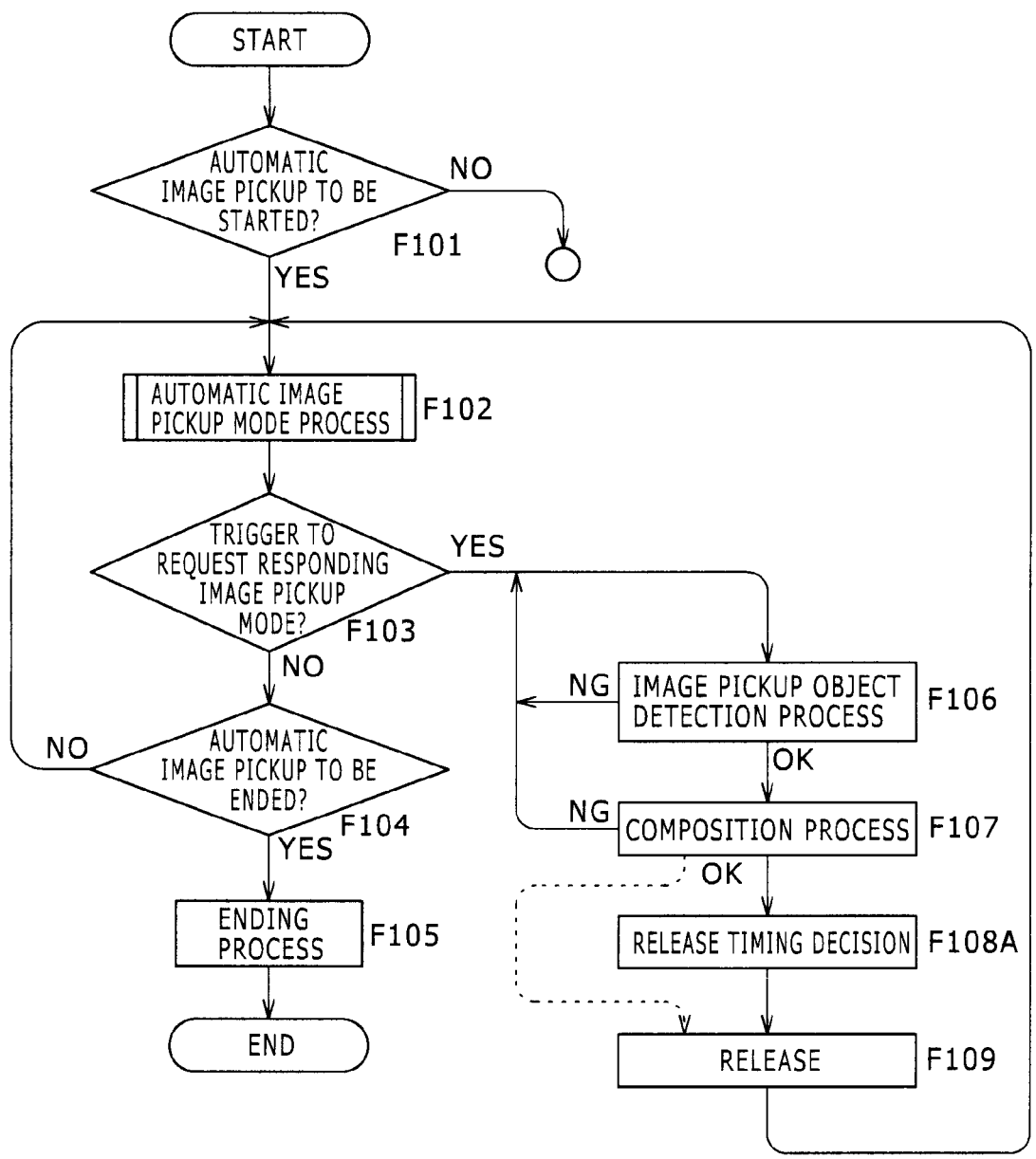
FIG. 29 is a flow chart of an image pickup control process according to a second embodiment of the present invention.

Image pickup operation control of a second embodiment is illustrated in FIG. 29.

Referring to FIG. 29, the image pickup operation control illustrated includes steps F101 to F107 and F109 similar to those described hereinabove with reference to FIG. 12, and overlapping description of the processes at the common steps is omitted herein to avoid redundancy.

In the present second embodiment, where the request responding image pickup mode is entered, after the control section 27 carries out the image pickup object detection process at step F106 and the composition process at step F107, it carries out a release operation without issuing a release prediction.

For example, if OK decision regarding the composition process is obtained at step F107, then the control section 27, particularly the mode sequence control section 86, carries out a release timing decision process as step F108A as indicated by a solid line in the flow chart of FIG. 29.

Then, when arrival of a release timing is decided, the processing advances to step F109, at which a release process is carried out. After the release process, the processing returns to the automatic image pickup mode process at step F102.

The release timing decision process is a process for deciding whether or not a predetermined still picture image pickup condition is satisfied, and various examples can be applied.

For example, release timing decision based on time is applicable. For example, lapse of predetermined period of time such as, for example, two or three seconds from a point of time at which OK decision regarding the composition process is obtained is determined as a still picture image pickup condition. In this instance, the control section 27, particularly the mode sequence control section 86, carries out counting of a predetermined period of time at step F108A. Then, if the predetermined period of time elapses, then the control section 27 executes the release process under the control of the picked up image recording control section 81 at step F109.

Further, when a particular sound input is detected, it may be decided that the still picture image pickup condition is satisfied.

For example, a particular word uttered from a user, sound by clapping of hands, sound of a whistle or the like may be used as the particular sound as the still picture image pickup condition.

The control section 27, particularly the mode sequence control section 86, carries out input detection of such particular sounds at step F108A.

Then, if any of such particular sounds is confirmed from a result of the input sound signal analysis from the sound inputting section 35, then it is decided that a release timing is reached, and a release process is executed under the control of the picked up image recording control section 81 at step F109.

Or, when a particular image pickup object state is detected from a picked up image, it may be decided that the still picture image pickup condition is satisfied.

The control section 27, particularly the mode sequence control section 86, supervises presence/absence of the particular image pickup object state detected by the analysis of the picked up image at step F108A.

The particular image pickup object state may be a particular expression such as a smile of an image pickup object caught by the composition process, a particular gesture such as, for example, waving of a hand toward the image pickup system, raising of a hand, clapping of hands or a behavior such as making of a V-sign or winking at the image pickup system. Or, the particular image pickup object state may be gazing of a user of an image pickup object at the image pickup system.

The control section 27 decides any of the particular states of the user by an image analysis process of the picked up image. Then, if a particular image pickup object state is detected, then it is decided that the release timing comes, and a release process is executed under the control of the picked up image recording control section 81 at step F109.

It is to be noted that, while, in the present second embodiment, the release prediction process is not carried out, when the release timing decision is carried out at step F108A, preferably the release prediction operation is executed to urge the user to carry out an action corresponding to the still picture image pickup condition such as, for example, a smile or generation of voice.

Further, as another process example, the processing may advance immediately to step F109 after the composition process as indicated by a broken line in FIG. 29 to carry out the release process.

It is to be noted that, also to the present second embodiment, the various examples described as the modifications to the first embodiment can be applied as modifications.

7. Image Pickup Operation of the Third Embodiment

Figure 30:
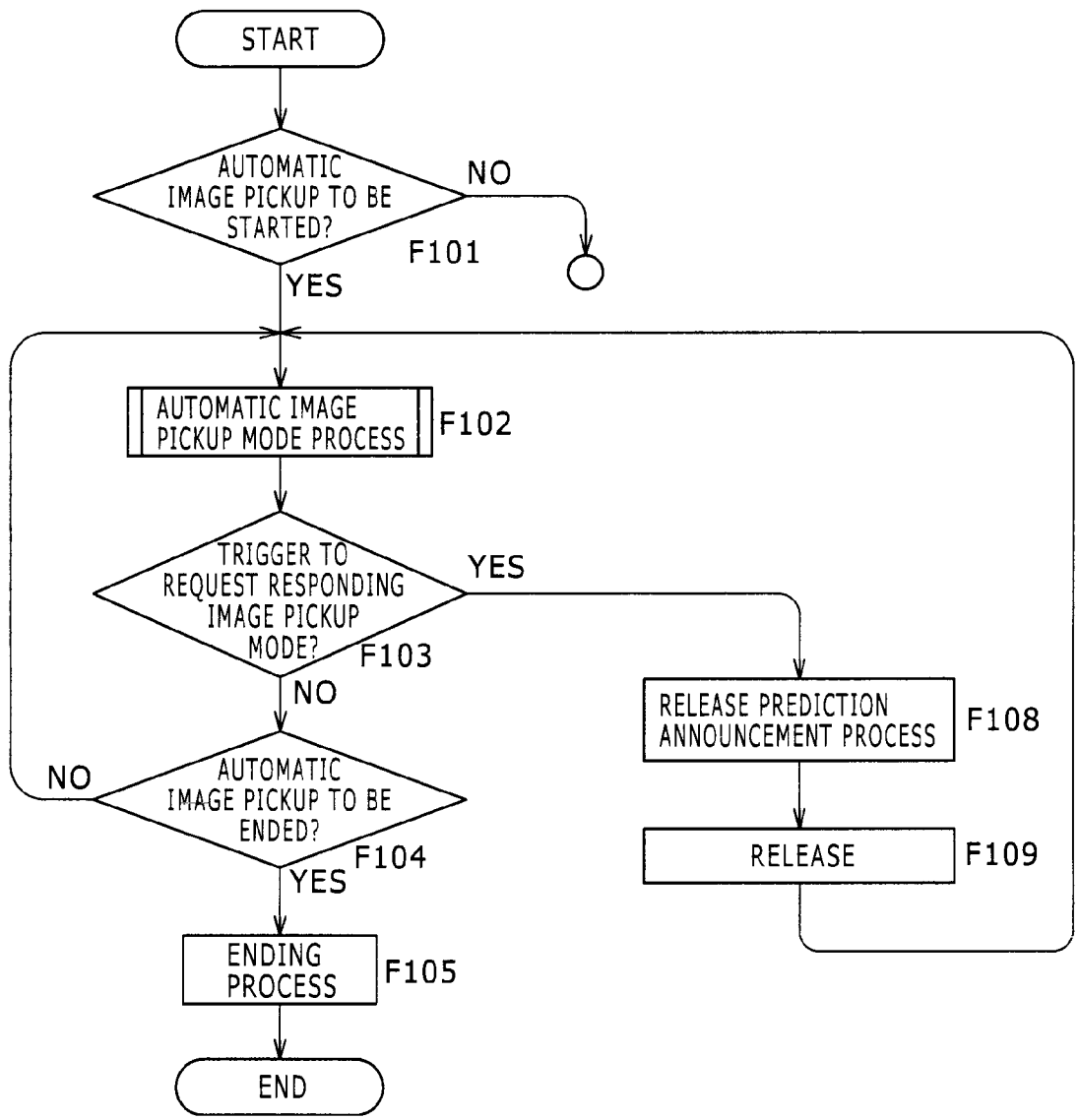
FIG. 30 is a flow chart of an image pickup control process according to a third embodiment of the present invention.

An example of processing of a third embodiment is illustrated in FIG. 30.

Also the process example of FIG. 30 includes steps F101 to F105 and F108 to F109 similar to those of FIG. 12, and overlapping description of them is omitted herein to avoid redundancy.

In the present third embodiment, when the request responding image pickup mode is entered in response to a trigger input, the image pickup object detection process and the composition process as the image pickup preparation process are not carried out, but release prediction is carried out immediately at step F108. Thereafter, release operation is carried out at step F109.

The process of steps F108 and F109 is similar to that of FIG. 12.

As one of cases in which the user wants to establish the request responding image pickup mode, the user may intend to carry out still picture image pickup in a state of the image pickup visual field of the digital still camera 1 at this time.

In such an instance, particularly the image pickup object detection process and the composition process may be unnecessary.

For example, when the image pickup visual field of the digital still camera 1 is automatically varying in the automatic image pickup mode, the user carries out trigger inputting at a timing at which the digital still camera 1 is directed to the user itself. Then, in this state, a release prediction operation is carried out to carry out still picture image pickup.

Also by such processing, still picture image pickup satisfying the request of the user is implemented.

It is to be noted that, also to the third embodiment, the various examples described as the modifications to the first embodiment, that is, the examples, for example, of the trigger input other than the image pickup object detection process and the composition process, can be applied as modifications.

Particularly in the case of the present third embodiment, also it is preferable to combine the operations described hereinabove with reference to FIG. 13 as a modification to the first embodiment, that is, the requested direction decision at step F120 and the pan-tilt control in the requested direction at step F121 of FIG. 13.

In this instance, when the user carries out trigger inputting, the digital still camera 1 is turned to the direction of the user first, and in this state, the release prediction and release processes are carried out.

8. Image Pickup Operation of the Fourth Embodiment

A fourth embodiment is described as an example of processing in the automatic image pickup mode.

FIG. 11B illustrates the example of processing of the fourth embodiment.

Referring to FIG. 11B, the process example includes steps F1 to F3 similar to those of FIG. 11A. In this instance, if a composition process is decided OK at step F3, then a release prediction process is carried out at step F4A. The release prediction process in this instance is similar to that described hereinabove in connection with the process at step F108 of FIG. 12.

In short, the present fourth embodiment is a process example wherein, also upon still picture image pickup in the automatic image pickup mode, a release prediction process is carried out and the user is notified that still picture image pickup is carried out.

This process can be applied also to an image pickup system which does not include the request responding image pickup mode, and the process of FIG. 11B can be applied as the automatic image pickup mode at step F102 of FIG. 12.

Also in the automatic image pickup mode, if a release prediction process is carried out, then the user may take notice of this and can take a pose while being conscious of the still picture image pickup.

9. Modifications to the Functional Configuration

While process examples of several embodiments have been described, they are control processes basically based on the functional configuration described hereinabove with reference to FIG. 10.

For example, the image pickup system including the digital still camera 1 and the camera platform 10 can have various other functional configurations. In the following, several examples are described.

FIG. 31 shows an example of an image pickup system which includes a function as a trigger detection/acceptance section 87 provided on the control section 27 side of the digital still camera 1 as can be recognized from comparison with FIG. 10. In particular, detection of a trigger input is carried out by the control section 27 side, and if a trigger input is detected, then it is accepted as a trigger to the request responding image pickup mode.

In the modifications to the first embodiment, various examples of the trigger input are described. For example, in a case in which a touch sensor is provided on the housing of the digital still camera 1, in another case in which trigger inputting is carried out as an operation to the digital still camera 1 or in some other case, the trigger detection/acceptance section 87 of the control section 27 functions to recognize the trigger input as seen from FIG. 31.

Also where the sound inputting section 35 shown in FIG. 8 is provided and a particular sound input is recognized as a trigger input, the trigger detection/acceptance section 87 shown in FIG. 31 carries out a recognition process of the particular sound input.

Further, where the control section 27 on the digital still camera 1 side includes a function as the trigger detection/acceptance section 87, the function recognizes, in the procedure of image analysis by the signal processing section 24, that is, of the image pickup object detection process, a behavior, the eyes and so forth as the particular image pickup object state described hereinabove to carry out detection of a trigger input.

From the foregoing, such a functional configuration as shown in FIG. 31 may be adopted.

Naturally, both of the trigger detection section 73 on the camera platform 10 side shown in FIG. 10 and the trigger detection/acceptance section 87 on the digital still camera 1 side shown in FIG. 31 may be provided as functional configuration elements so that various trigger inputs may be accepted.

As another example of the functional configuration, through not shown, the release prediction operation control section 84 shown in FIG. 10 or 31 may be provided on the camera platform 10 side.

In other words, the release prediction execution section 64 may be provided on the camera platform 10 side as shown in FIG. 9 or an operation as a prediction may be executed by pan-tilt operations of the camera platform 10.

In this instance, the mode sequence control section 86 provides an instruction for a release prediction operation to the release prediction operation control section on the camera platform 10 side by communication. In response to the instruction, the release prediction operation control section controls execution of operation of the release prediction execution section 64 or controls execution of a predetermined behavior by pan-tilt operations.

Figure 32:
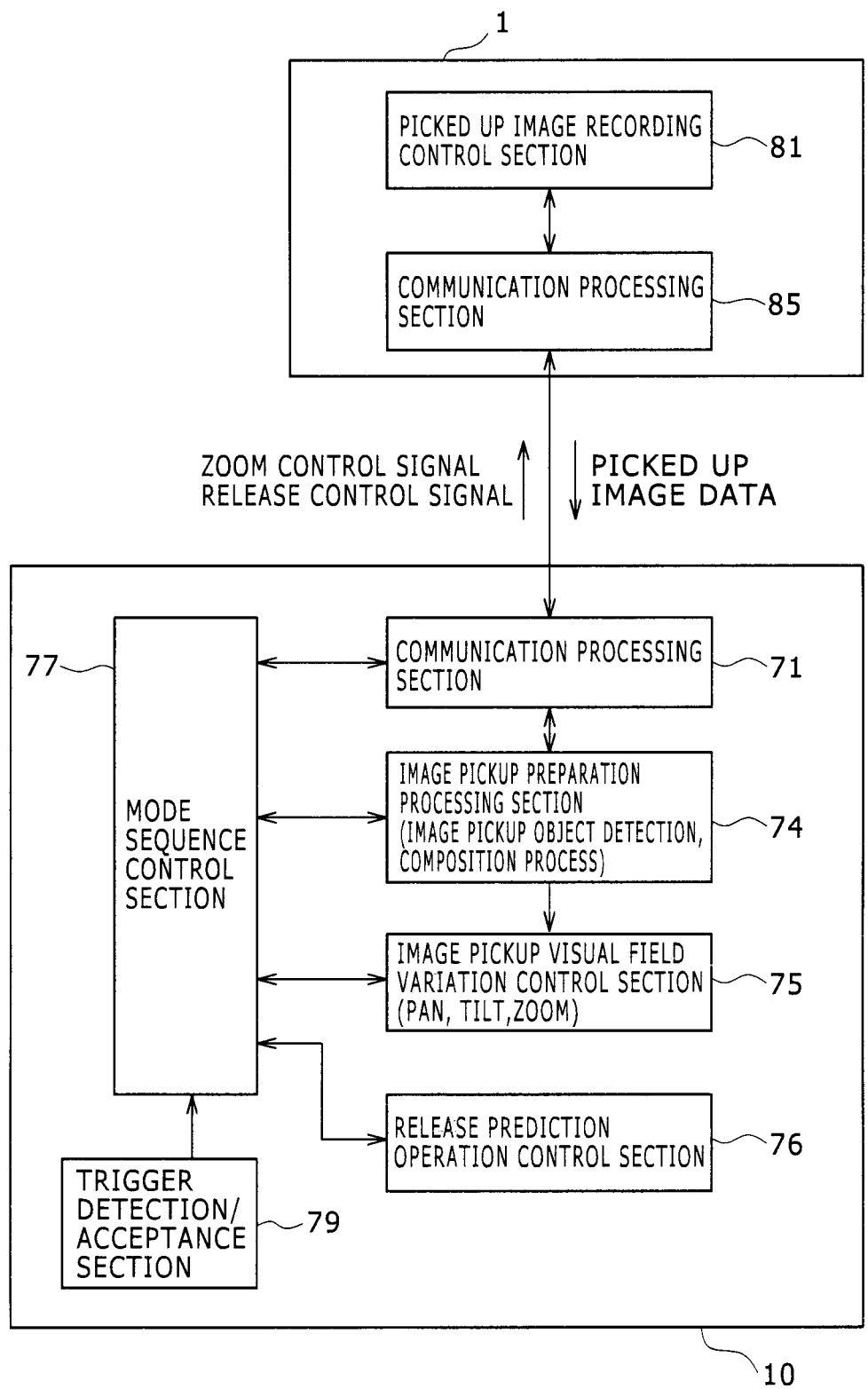

FIG. 32 shows an example wherein the digital still camera 1 includes only the picked up image recording control section 81 and the communication processing section 85. Meanwhile, the camera platform 10 side, particularly the control section 51, includes the communication processing section 71, trigger detection/acceptance section 79, image pickup preparation processing section 74, image pickup visual field variation control section 75, release prediction operation control section 76 and mode sequence control section 77.

While the functional sections described carry out control processes basically similar to those described hereinabove with reference to FIG. 10, the control processes are different in the following points.

The image pickup preparation processing section 74 receives supply of picked up image data as frame images from the signal processing section 24 of the digital still camera 1 in order to carry out an image pickup object detection process and a composition process. Then, the image pickup preparation processing section 74 carries out image analysis and then carries out an image pickup object detection process and a composition process similar to those described hereinabove.

The image pickup visual field variation control section 75 controls the pan driving section 55 and the tilt driving section 58 to execute pan-tilt operations for image pickup object detection and composition adjustment in accordance with an instruction from the image pickup preparation processing section 74.

Further, for zoom control, the image pickup preparation processing section 74 outputs a control signal to the control section 27, particularly to the picked up image recording control section 81, on the digital still camera 1 side through the communication processing section 71. The picked up image recording control section 81 executes a zoom process for composition adjustment in accordance with the zoom control signal.

The mode sequence control section 77 issues instructions to the associated functional sections in order to implement, for example, the operations in the automatic image pickup mode and the request responding image pickup mode illustrated in FIG. 12 or the like.

When a release process at step F109 of FIG. 12 or the like is to be carried out, the mode sequence control section 77 outputs a release control signal to the control section 27, particularly to the picked up image recording control section 81, of the digital still camera 1 side through the communication processing section 71. The picked up image recording control section 81 controls execution of still picture recording operation in response to the release control signal.

The trigger detection/acceptance section 79 detects a trigger input. Then, when a trigger input is detected, the trigger detection/acceptance section 79 accepts the trigger input as a trigger to the request responding image pickup mode.

Further, when a release prediction process is to be carried out, the mode sequence control section 86 issues an instruction for a release prediction operation to the release prediction operation control section 76. In response to the instruction, the release prediction operation control section 76 controls execution of operation of the release prediction execution section 64 on the camera platform 10 side or controls execution of a predetermined behavior by pan-tilt operations.

It is to be noted that, as a modification to the example of FIG. 32, though not shown, the release prediction operation control section may be provided on the digital still camera 1 or on both of the camera platform 10 and the digital still camera 1.

In other words, execution of trigger inputting or a release prediction operation is executed by the digital still camera 1 side, or by the camera platform 10 side or else by both of the digital still camera 1 side and the camera platform 10 side.

Figure 33:
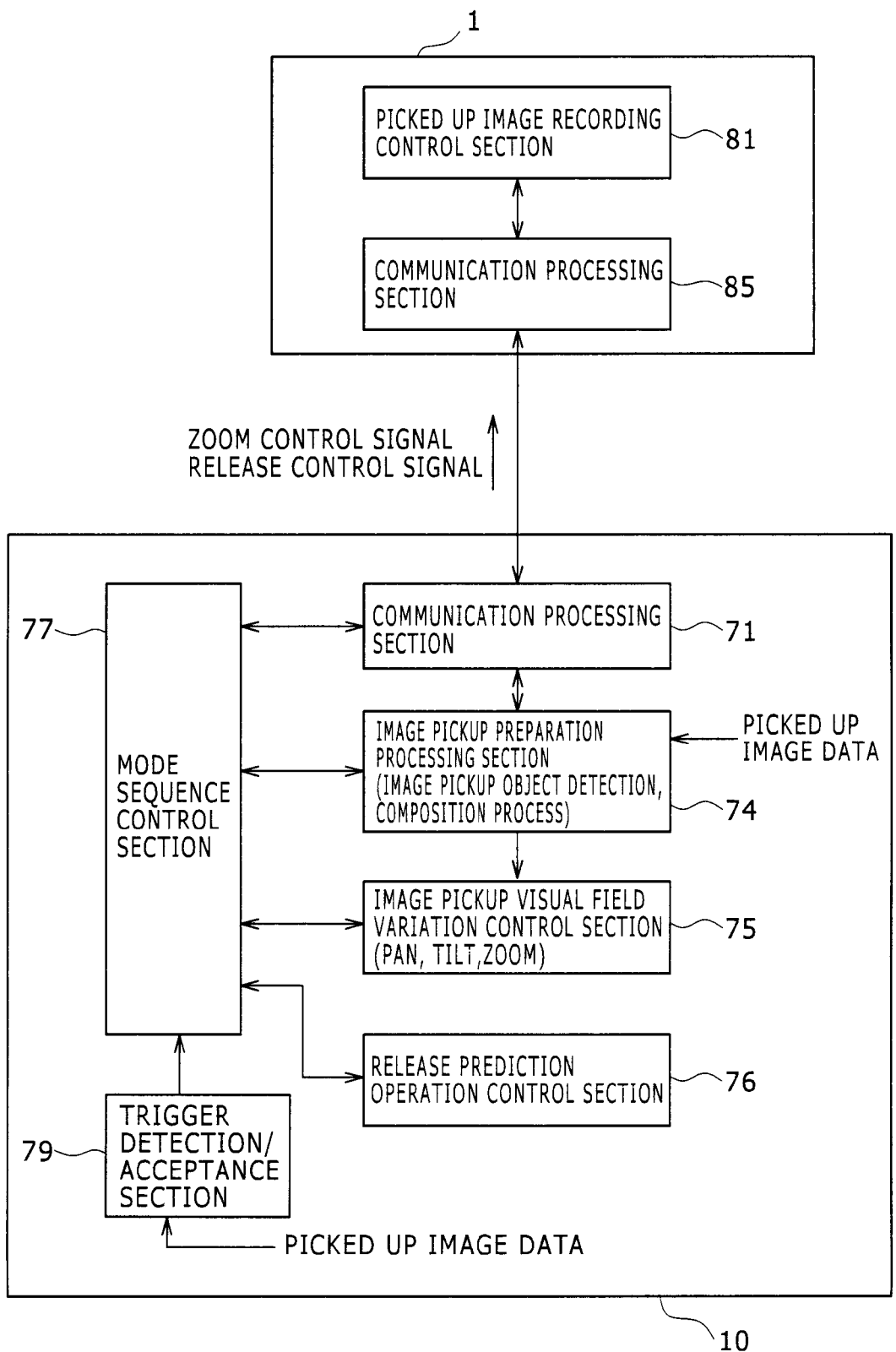

FIG. 33 shows a further modification to the example of FIG. 32. The present modification corresponds to the case in which the image pickup section 63 is provided on the camera platform 10 side as mentioned hereinabove with reference to FIG. 9.

The image pickup preparation processing section 74 inputs frame image data not from the digital still camera 1 side but from the image pickup section 63. Then, the image pickup preparation processing section 74 carries out image analysis and then carries out an image pickup object detection process and a composition process similar to those described hereinabove.

Also in this instance, the image pickup visual field variation control section 75 controls the pan driving section 55 and the tilt driving section 58 to execute pan-tilt operations for image pickup detection and composition adjustment in accordance with an instruction from the image pickup preparation processing section 74 similarly as in the example of FIG. 32. Further, for zoom control, the image pickup preparation processing section 74 outputs a zoom control signal to the control section 27, particularly to the picked up image recording control section 81, on the digital still camera 1 side through the communication processing section 71. The picked up image recording control section 81 controls execution of a zoom process for composition adjustment in accordance with the zoom control signal.

Further, since the image pickup section 63 is provided on the camera platform 10 side, the camera platform 10 can cope also with a particular image pickup object state, that is, also with a trigger input by a particular behavior, the eyes or the like of the user.

To this end, the trigger detection/acceptance section 79 analyzes picked up image data from the image pickup section 63 to detect a trigger input. Then, when a trigger input is detected, the trigger detection/acceptance section 79 accepts the detected trigger input as a trigger to the request responding image pickup mode.

It is to be noted that, also in the modification of FIG. 33, the trigger detection section or the release prediction operation control section may be provided on the digital still camera 1 or on both of the camera platform 10 and the digital still camera 1.

Or, the trigger detection section may be provided on the digital still camera 1 side while the trigger acceptance section is provided on the camera platform 10 side.

Figure 34:
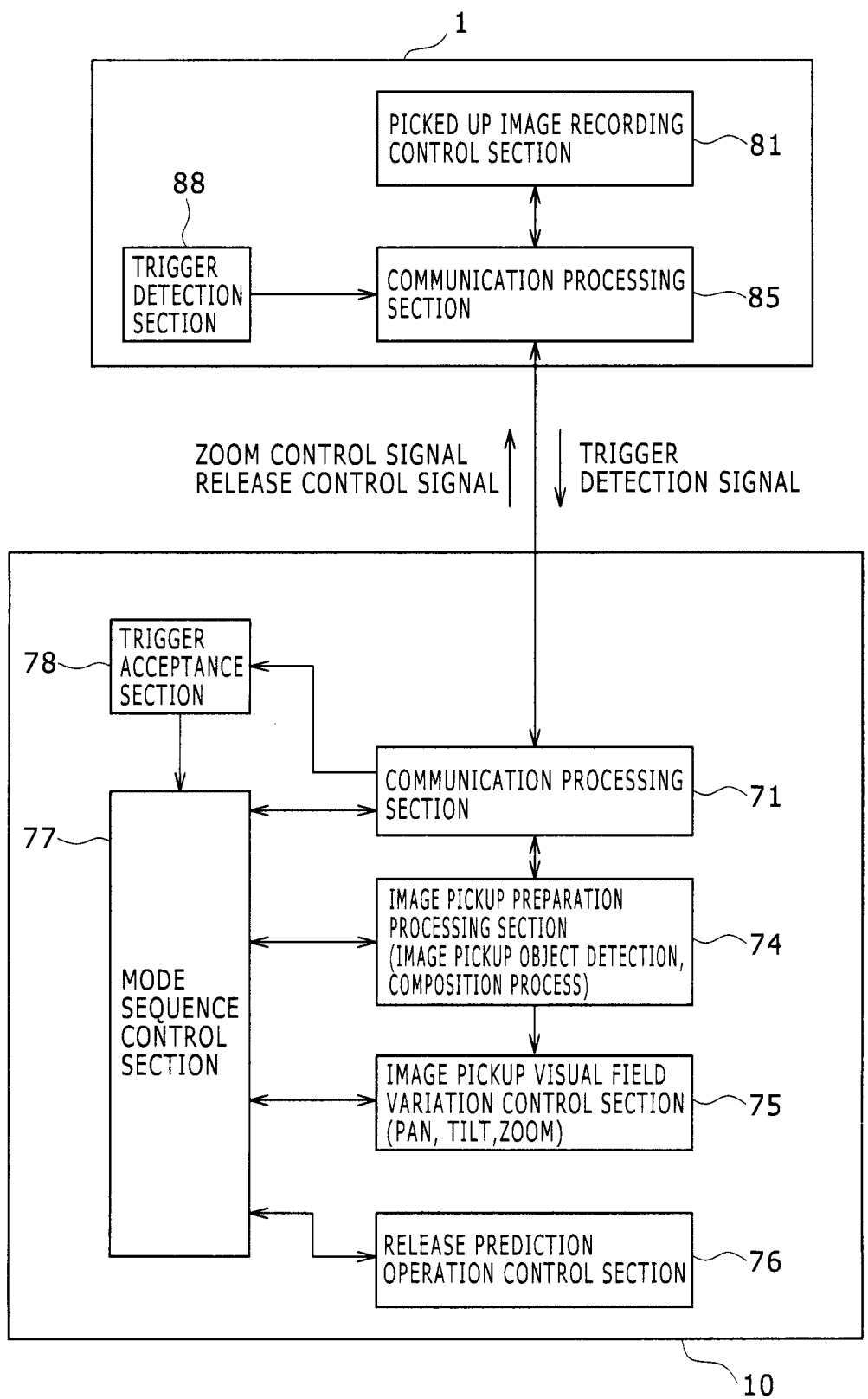

An example is shown in FIG. 34. Referring to FIG. 34, the digital still camera 1, particularly the control section 27, includes the picked up image recording control section 81, the communication processing section 85 and a trigger detection section 88. Meanwhile, the camera platform 10, particularly the control section 51, includes the communication processing section 71, a trigger acceptance section 78, the image pickup preparation processing section 74, the image pickup visual field variation control section 75, the release prediction operation control section 76 and the mode sequence control section 77.

For example, where a touch sensor is provided on the housing of the digital still camera 1, where the sound inputting section 35 is provided or in a like case, a user operation or a particular sound input on the digital still camera 1 side is detected by the trigger detection section 88. Then, a trigger detection is transmitted to the trigger acceptance section 78 on the camera platform 10 side through the communication processing sections 85 and 71. The trigger acceptance section 78 carries out acceptance of the trigger input through the communication and notifies the mode sequence control section 77 that a trigger input is received. The mode sequence control section 77 issues instructions to the associated functional sections to implement, for example, operations in the automatic image pickup mode and the request responding image pickup mode described hereinabove with reference to FIG. 12 or the like.

While several configuration examples of the control functions are described, naturally further various configurations of the control functions are possible.

Figure 35A:
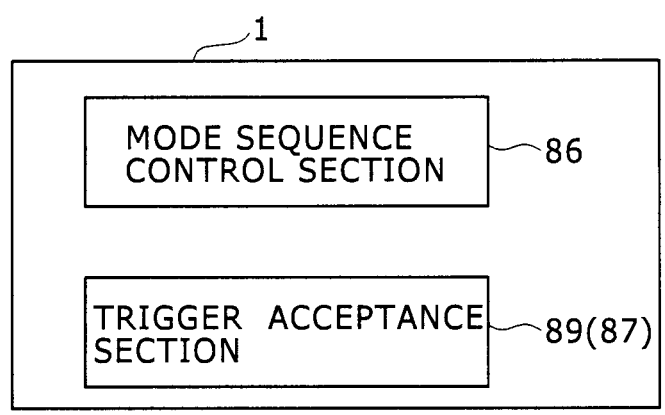
FIGS. 35A and 35B are block diagrams showing a basic configuration of control functions of the digital still camera and the camera platform, respectively.
Figure 35B:
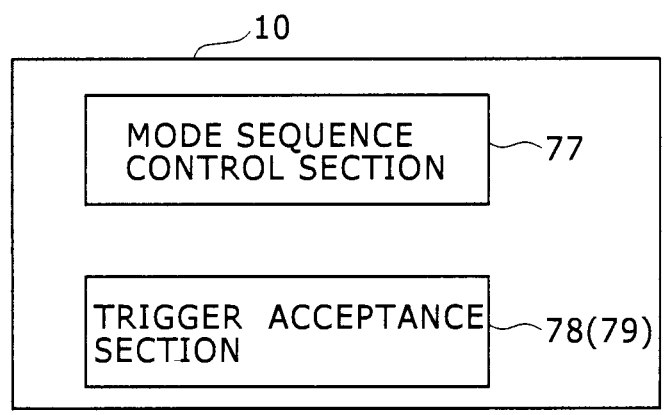

The most basic functional configuration according the present embodiment is such as shown in FIG. 35A or 35B.

FIG. 35A shows a configuration wherein at least the mode sequence control section 86 and the trigger acceptance section 89 or the trigger detection/acceptance section 87 are provided on the digital still camera 1 side. Various examples are possible wherein the other functional sections are provided on the digital still camera 1 side or the camera platform 10 side. For example, such a configuration as shown in FIG. 10 or 31 is one of such examples.

FIG. 35B shows a configuration wherein at least the mode sequence control section 86 and the trigger acceptance section 78 or the trigger detection/acceptance section 79 are provided on the camera platform 10 side. Various examples are possible wherein the other functional sections are provided on the digital still camera 1 side or the camera platform 10 side. For example, such a configuration as shown in FIG. 32, 33 or 34 is one of such examples.

As can be recognized from the foregoing, the image pickup control apparatus of the present embodiment can be implemented also as a control function configuration as the digital still camera 1 and can be implemented also as a control function configuration of the camera platform 10. Further, the image pickup control apparatus can be implemented also as a control function configuration of an image pickup system including the digital still camera 1 and the camera platform 10. In other words, the digital still camera 1, the camera platform 10 and the image pickup system including the digital still camera 1 and the camera platform 10 can each be applied as an image pickup control apparatus or a production for carrying out an image pickup control method of the present embodiment.

It is to be noted that, while the control function sections are individually shown as blocks in FIGS. 10, 31 to 34 and 35A and 35B, they need not be formed as individually independent program modules or hardware components. In fact, only it is necessary for the control function sections to implement such processing operations as described hereinabove with reference to FIG. 12 and so forth as general processes of the control function sections.

10. Program

A program according to the present embodiment causes a processor such as a CPU to execute the processes in the automatic image pickup mode and the request responding image pickup mode as processing operations of the embodiments and the modifications described hereinabove. Particularly, the program implements the processes described hereinabove with reference to FIG. 12 and so forth by being started up by the control section 27 or 51.

The program can be recorded in advance in a HDD (Hard Disk Drive) as a recording medium built in such an apparatus as a personal computer, the digital still camera 1 or the camera platform 10, a ROM in a microcomputer having a CPU and so forth.

Or, the program may be stored or recorded temporarily or permanently on or in a removable recording medium such as a flexible disk, a CD-ROM (Compact Disc Read Only Memory), an MO (Magnet-Optical) disk, a DVD (Digital Versatile Disc), a blu ray disk, a magnetic disk, a semiconductor memory or a memory card. Such a removable recording medium as just mentioned can be provided as package software.

Or, the program may be installed from a removable recording medium into a personal computer or the like or may be downloaded from a download site through a network such as a LAN (Local Area Network) or the Internet.

The program of the present embodiment is suitable for implementation and wide-range provision of an image pickup apparatus and an image pickup system which implement the processes of the embodiments described hereinabove.

The present application contains subject matter related to that disclosed in Japanese Priority Patent Application JP 2009-297171 filed in the Japan Patent Office on Dec. 28, 2009, and Japanese Priority Patent Application JP 2009-297173 filed in the Japan Patent Office on Dec. 28, 2009, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup control apparatus, comprising:
a trigger acceptance section configured to accept a predetermined trigger input as an input to change from an automatic image pickup mode to a request responding image pickup mode; and
a request responding image pickup control section configured to operate, upon determination that the trigger input is accepted by said trigger acceptance section while an image pickup apparatus performs a still picture image pickup operation with an image pickup visual field of the image pickup apparatus changed in the automatic image pickup mode, the image pickup control apparatus in the request responding image pickup mode in which the image pickup apparatus is controlled to execute a process for determining an image pickup visual field in accordance with an image pickup request from a user and subsequently execute a still picture image pickup operation in the request responding image pickup mode after the determination of the image pickup visual field, wherein
in the automatic image pickup mode, the image pickup apparatus automatically performs the still picture image pickup operation regardless of the image pickup request from the user.

2. The image pickup control apparatus according to claim 1, further comprising:
a picked up image recording control section configured to control the still picture image pickup operation of the image pickup apparatus which carries out image pickup of an image pickup object and recording of picked up image data into a recording medium;
an image pickup visual field variation section configured to change the image pickup visual field of the image pickup apparatus;
an image pickup visual field variation control section configured to control the image pickup visual field variation section; and
an image pickup preparation processing section configured to carry out a process of determining an image pickup visual field for still picture image pickup;
said request responding image pickup control section being operable to control, upon determination that the trigger input is accepted by said trigger acceptance section while the image pickup apparatus is carrying out still picture image pickup under the control of said picked up image recording control section while said image pickup visual field variation control section controls the image pickup visual field variation section in the automatic image pickup mode, said image pickup preparation processing section to execute a process of determining an image pickup visual field in accordance with the image pickup request in the request responding image pickup mode and cause a still picture image pickup operation to be executed under the control of said picked up image recording control section after the determination of the image pickup visual field.

3. The image pickup control apparatus according to claim 2, further comprising:
an image pickup prediction operation control section configured to control execution of a prediction operation for predicting that still picture image pickup will be carried out,
said request responding image pickup control section being operable to control said image pickup preparation processing section to execute a process for determining an image pickup visual field for a request responding image pickup operation in the request responding image pickup mode, control, after the determination of the image pickup visual field, the prediction operation to be executed under the control of said image pickup prediction operation control section and then cause the still picture image pickup operation to be executed under the control of said picked up image recording control section.

4. The image pickup control apparatus according to claim 1, wherein said trigger acceptance section accepts a predetermined operation input by a user as the trigger input.

5. The image pickup control apparatus according to claim 1, wherein said trigger acceptance section accepts a predetermined sound input as the trigger input.

6. The image pickup control apparatus according to claim 1, wherein said trigger acceptance section determines that a particular image pickup object state is decided from a picked up image as the trigger input.

7. The image pickup control apparatus according to claim 2, wherein, in the request responding image pickup mode, said image pickup preparation processing section carries out an image pickup object detection process for moving an image pickup object in accordance with the image pickup request into the image pickup visual field while said image pickup visual field variation control section controls the image pickup visual field variation section.

8. The image pickup control apparatus according to claim 2, wherein, in the request responding image pickup mode, said image pickup preparation processing section carries out a composition process of adjusting the arrangement of an image pickup object image in the image pickup visual field while said image pickup visual field variation control section controls the image pickup visual field variation section.

9. The image pickup control apparatus according to claim 8, wherein the composition process includes a process of further moving, upon determination that one or more image pickup objects are detected in the image pickup visual field, the image pickup visual field to confirm presence of another image pickup object in accordance with the image pickup request.

10. The image pickup control apparatus according to claim 8, wherein said image pickup preparation processing section carries out the composition process in the automatic image pickup mode and carries out, in the request responding image pickup mode, the composition process in a processing procedure or with a processing parameter different from that in the automatic image pickup mode.

11. The image pickup control apparatus according to claim 2, wherein said trigger acceptance section detects an inputting direction of the trigger input, and said image pickup preparation processing section causes said image pickup visual field variation control section to control the image pickup visual field variation section in the inputting direction.

12. The image pickup control apparatus according to claim 1, wherein said request responding image pickup control section causes a process of determining an image pickup visual field for a request responding image pickup operation to be executed in the request responding image pickup mode and causes a still picture image pickup operation to be executed upon determination that a predetermined still picture image pickup condition is satisfied after the determination of the image pickup visual field.

13. The image pickup control apparatus according to claim 12, wherein said request responding image pickup control section decides that the still picture image pickup condition is satisfied upon determination that a particular sound input is received.

14. The image pickup control apparatus according to claim 12, wherein said request responding image pickup control section decides that the still picture image pickup condition is satisfied upon determination that a particular image pickup object state is decided from a picked up image.

15. The image pickup control apparatus according to claim 1, wherein said request responding image pickup control section controls, after said request responding image pickup control section causes the image pickup apparatus to execute a still picture image pickup operation, a still picture picked up image to be displayed on a display section of the image pickup apparatus and causes the image pickup visual field variation section of the image pickup apparatus to be controlled so as to direct the display section toward an image pickup direction.

16. The image pickup control apparatus according to claim 1, wherein said request responding image pickup control section returns to operation of the automatic image pickup mode after execution of the still picture image pickup operation in the request responding image pickup mode.

17. The image pickup control apparatus according to claim 3, wherein said image pickup prediction operation control section carries out control of causing sound outputting or indication outputting to be executed as a prediction operation for predicting that still picture image pickup will be carried out.

18. The image pickup control apparatus according to claim 3, wherein said image pickup prediction operation control section carries out control of controlling the image pickup visual field variation section to cause the image pickup apparatus to execute a predetermined operation as a prediction operation regarding for predicting that still picture image pickup will be carried out.

19. An image pickup control method for an image pickup system, the method comprising the steps of:
   causing, by a processor of the image pickup system, execution of a still picture image pickup operation while an image pickup visual field is changed in an automatic image pickup mode;
   accepting, in the automatic image pickup mode, a predetermined trigger input as an input to change the automatic image pickup mode to a request responding image pickup mode;
   determining an image pickup visual field in accordance with an image pickup request from a user in the request responding image pickup mode; and
   causing, by the processor of the image pickup system, execution of a still picture image pickup operation after the determination of the image pickup visual field in the request responding image pickup mode, wherein
   in the automatic image pickup mode, the image pickup system automatically performs the still picture image pickup operation regardless of the image pickup request from the user.

20. A non-transitory computer readable medium having instructions stored therein, which when executed by a processor to control an image pickup apparatus, causes the image pickup apparatus to execute a method comprising the steps of:
   causing, by the processor, execution of a still picture image pickup operation while an image pickup visual field is changed in an automatic image pickup mode;
   accepting, in the automatic image pickup mode, a predetermined trigger input as an input to change the automatic image pickup mode to a request responding image pickup mode;
   determining an image pickup visual field in accordance with an image pickup request from a user in the request responding image pickup mode; and
   causing, by the processor, execution of a still picture image pickup operation after the determination of the image pickup visual field in the request image pickup mode, wherein
   in the automatic image pickup mode, the image pickup apparatus automatically performs the still picture image pickup operation regardless of the image pickup request from the user.

* * * * *